(12) United States Patent
Miyake et al.

(10) Patent No.: US 11,938,558 B2
(45) Date of Patent: Mar. 26, 2024

(54) DOUBLE-ACTION FRICTION-STIR JOINING SYSTEM AND METHOD UTILIZING A CLEANING MECHANISM

(71) Applicant: KAWASAKI JUKOGYO KABUSHIKI KAISHA, Kobe (JP)

(72) Inventors: Masahiro Miyake, Kobe (JP); Kengo Maeda, Kobe (JP); Masato Fukushima, Akashi (JP); Yohei Ishido, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 76 days.

(21) Appl. No.: 17/270,751

(22) PCT Filed: Aug. 23, 2019

(86) PCT No.: PCT/JP2019/033071
§ 371 (c)(1),
(2) Date: Feb. 23, 2021

(87) PCT Pub. No.: WO2020/040299
PCT Pub. Date: Feb. 27, 2020

(65) Prior Publication Data
US 2021/0316391 A1    Oct. 14, 2021

(30) Foreign Application Priority Data

Aug. 23, 2018 (JP) .................................. 2018-156332
Feb. 28, 2019 (JP) .................................. 2019-036970
Apr. 5, 2019 (JP) .................................. 2019-072856

(51) Int. Cl.
*B23K 20/12* (2006.01)
*B23K 20/26* (2006.01)

(52) U.S. Cl.
CPC .......... *B23K 20/125* (2013.01); *B23K 20/123* (2013.01); *B23K 20/1255* (2013.01); *B23K 20/126* (2013.01); *B23K 20/26* (2013.01)

(58) Field of Classification Search
None
See application file for complete search history.

(56) References Cited

U.S. PATENT DOCUMENTS 4,583,257 A * 4/1986 Bridges .................. B23K 9/328
                                                            15/93.1
5,070,568 A * 12/1991 Wilcox .................. B08B 9/021
                                                            15/93.1

(Continued)

FOREIGN PATENT DOCUMENTS

AT            501021 B1    11/2006
CN         107107253 A     8/2017

(Continued)

*Primary Examiner* — Erin B Saad
*Assistant Examiner* — Carlos J Gamino
(74) *Attorney, Agent, or Firm* — Oliff PLC

(57) ABSTRACT

A double-action friction stir joining system, which includes a double-action friction stir joining device, a cleaning mechanism having a dressing member, a robot, and a control device. The double-action friction stir joining device includes a first rotary driver configured to rotate a pin member and a shoulder member, and a tool driver configured to reciprocate the pin member and the shoulder member. The control device is adapted to (A) operate the tool driver so that the pin member is thrusted into the shoulder member, (B) operate the first rotary driver so that the shoulder member rotates, and (C) operate the robot so that the robot holds the double-action friction stir joining device and the dressing member contacts an inner circumferential surface of the shoulder member.

22 Claims, 33 Drawing Sheets

(56) References Cited

U.S. PATENT DOCUMENTS

| | | | | |
|---|---|---|---|---|
| 5,221,826 A | * | 6/1993 | Lee | B23K 9/32 |
| | | | | 15/93.1 |
| 5,845,357 A | * | 12/1998 | Anderson | B23D 79/02 |
| | | | | 15/93.1 |
| 8,112,838 B2 | * | 2/2012 | Matlack | B23K 20/1225 |
| | | | | 15/93.1 |
| 8,321,986 B2 | * | 12/2012 | Nakazima | B23K 9/328 |
| | | | | 15/93.1 |
| 9,248,522 B2 | * | 2/2016 | Saitou | B23K 20/126 |
| 2007/0000892 A1 | * | 1/2007 | Binder | B23K 9/32 |
| | | | | 219/137.43 |
| 2014/0183246 A1 | | 7/2014 | Saitou et al. | |
| 2017/0304935 A1 | | 10/2017 | Okada et al. | |
| 2021/0086291 A1 | * | 3/2021 | Okada | B23K 20/1245 |
| 2022/0379410 A1 | * | 12/2022 | Müller | H04N 5/247 |

FOREIGN PATENT DOCUMENTS

| | | |
|---|---|---|
| DE | 102013022055 B4 | 12/2016 |
| JP | H11-239876 A | 9/1999 |
| JP | 2007-216286 A | 8/2007 |
| JP | 4853865 B2 | 1/2012 |

\* cited by examiner

DOUBLE-ACTION FRICTION-STIR JOINING SYSTEM AND METHOD UTILIZING A CLEANING MECHANISM

TECHNICAL FIELD

The present disclosure relates to a double-action friction stir joining system and a method of operating the same.

BACKGROUND ART

A cleaning method of a joining tool of FSW is known (for example, see Patent Document 1) in which operation of a center pin may be correctly performed during stir joining by making it easier to mechanically eliminate particles adhered between a shoulder pin and the center pin.

In the cleaning method of the joining tool of FSW disclosed in Patent Document 1, a protrusion stroke of the center pin with respect to the shoulder pin and a thrust stroke of the center pin into the shoulder pin are both made larger than those during a joining operation of an object to be joined, and while rotating the joining tool, the surface of the center pin is cleaned when the center pin projects, and a hole inner surface of the shoulder pin is cleaned when the center pin is thrusted into the shoulder pin.

REFERENCE DOCUMENT OF CONVENTIONAL ART

Patent Document

[Patent Document 1] JP2007-216286A

DESCRIPTION OF THE DISCLOSURE

Problem to be Solved by the Disclosure

The present inventors have been conceive of a double-action friction stir joining system and a method of operating the same, which is capable of cleaning a double-action friction stir joining device by a different method from the cleaning method of the joining tool of FSW disclosed in Patent Document 1 described above.

One purpose of the present disclosure is to provide a double-action friction stir joining system and a method of operating the same, capable of cleaning a double-action friction stir joining device by a novel configuration.

Summary of the Disclosure

In order to solve the above problem, a double-action friction stir joining system according to one aspect of the present disclosure includes a double-action friction stir joining device, a cleaning mechanism having a dressing member, a robot, and a control device. The double-action friction stir joining device includes a pin member formed in a cylindrical shape and configured to be rotatable on an axis and reciprocatable in a direction along the axis, a shoulder member formed in a cylindrical shape, into which the pin member is inserted, and configured to be rotatable on the axis and reciprocatable in a direction along the axis, a first rotary driver configured to rotate the pin member and the shoulder member on the axis, and a tool driver configured to reciprocate the pin member and the shoulder member along the axis, respectively. The control device is adapted to (A) operate the tool driver so that the pin member is thrusted into the shoulder member, (B) operate the first rotary driver so that the shoulder member rotates, and (C) operate the robot so that the robot holds the double-action friction stir joining device and the dressing member contacts an inner circumferential surface of the shoulder member.

Therefore, a material of an object to be joined adhered (agglutinated) on the inner circumferential surface of the shoulder member can be removed (cleaned).

Moreover, a double-action friction stir joining system according to another aspect of the present disclosure includes a double-action friction stir joining device, a cleaning mechanism having a dressing member and a second rotary driver configured to rotate the dressing member, a robot, a stock mechanism, and a control device. The double-action friction stir joining device includes a pin member formed in a cylindrical shape and configured to be rotatable on an axis and reciprocatable in a direction along the axis, a shoulder member formed in a cylindrical shape, into which the pin member is inserted, and configured to be rotatable on the axis and reciprocatable in a direction along the axis, a first rotary driver configured to rotate the pin member and the shoulder member on the axis, and a tool driver configured to reciprocate the pin member and the shoulder member along the axis, respectively. The control device is adapted to (H) operate the robot so that the robot removes the pin member and/or the shoulder member, and the pin member and/or the shoulder member is disposed at the stock mechanism so that the axis is oriented in a vertical direction, (I) operate the second rotary driver so that the dressing member rotates, and (J) operate the robot so that the robot holds the cleaning mechanism, and the cleaning mechanism contacts at least one of an outer circumferential surface of the pin member, an inner circumferential surface of the shoulder member, and an outer circumferential surface of the shoulder member.

Therefore, the material of the to-be-joined object adhered (agglutinated) on at least one of the outer circumferential surface of the pin member, the inner circumferential surface of the shoulder member, and the outer circumferential surface of the shoulder member can be removed (cleaned).

Moreover, a method of operating a double-action friction stir joining system according to another aspect of the present disclosure is provided, the system provided with a double-action friction stir joining device, a cleaning mechanism having a dressing member, and a robot. The double-action friction stir joining device includes a pin member formed in a cylindrical shape and configured to be rotatable on an axis and reciprocatable in a direction along the axis, a shoulder member formed in a cylindrical shape, into which the pin member is inserted, and configured to be rotatable on the axis and reciprocatable in a direction along the axis, a first rotary driver configured to rotate the pin member and the shoulder member on the axis, and a tool driver configured to reciprocate the pin member and the shoulder member along the axis, respectively. The method includes the steps of (A) operating the tool driver so that the pin member is thrusted into the shoulder member, (B) operating the first rotary driver so that the shoulder member rotates, and (C) operating the robot so that the robot holds the double-action friction stir joining device and the dressing member contacts an inner circumferential surface of the shoulder member.

Therefore, the material of the to-be-joined object adhered (agglutinated) on the inner circumferential surface of the shoulder member can be removed (cleaned).

Moreover, a method of operating a double-action friction stir joining system according to another aspect of the present disclosure is provided, the system provided with a double-action friction stir joining device, a cleaning mechanism having a dressing member and a second rotary driver configured to rotate the dressing member, a robot, and a stock mechanism. The double-action friction stir joining device includes a pin member formed in a cylindrical shape and configured to be rotatable on an axis and reciprocatable in a direction along the axis, a shoulder member formed in a cylindrical shape, into which the pin member is inserted, and configured to be rotatable on the axis and reciprocatable in a direction along the axis, a first rotary driver configured to rotate the pin member and the shoulder member on the axis, and a tool driver configured to reciprocate the pin member and the shoulder member along the axis, respectively. The method includes the steps of (H) operating the robot so that the robot removes the pin member and/or the shoulder member, and the pin member and/or the shoulder member is disposed at the stock mechanism so that the axis is oriented in a vertical direction, (I) operating the second rotary driver so that the dressing member rotates, and (J) operating the robot so that the robot holds the cleaning mechanism, and the cleaning mechanism contacts at least one of an outer circumferential surface of the pin member, an inner circumferential surface of the shoulder member, and an outer circumferential surface of the shoulder member.

Therefore, the material of the to-be-joined object adhered (agglutinated) on at least one of the outer circumferential surface of the pin member, the inner circumferential surface of the shoulder member, and the outer circumferential surface of the shoulder member can be removed (cleaned).

The above purpose, other purposes, features, and advantages of the present disclosure will be made clear from the following detailed description of suitable embodiments with reference to the accompanying drawings.

Effect of the Disclosure

According to the double-action friction stir joining device system and the method of operating the same of the present disclosure, the double-action friction stir joining device can be cleaned with a simple configuration.

MODES FOR CARRYING OUT THE DISCLOSURE

Figure 1:
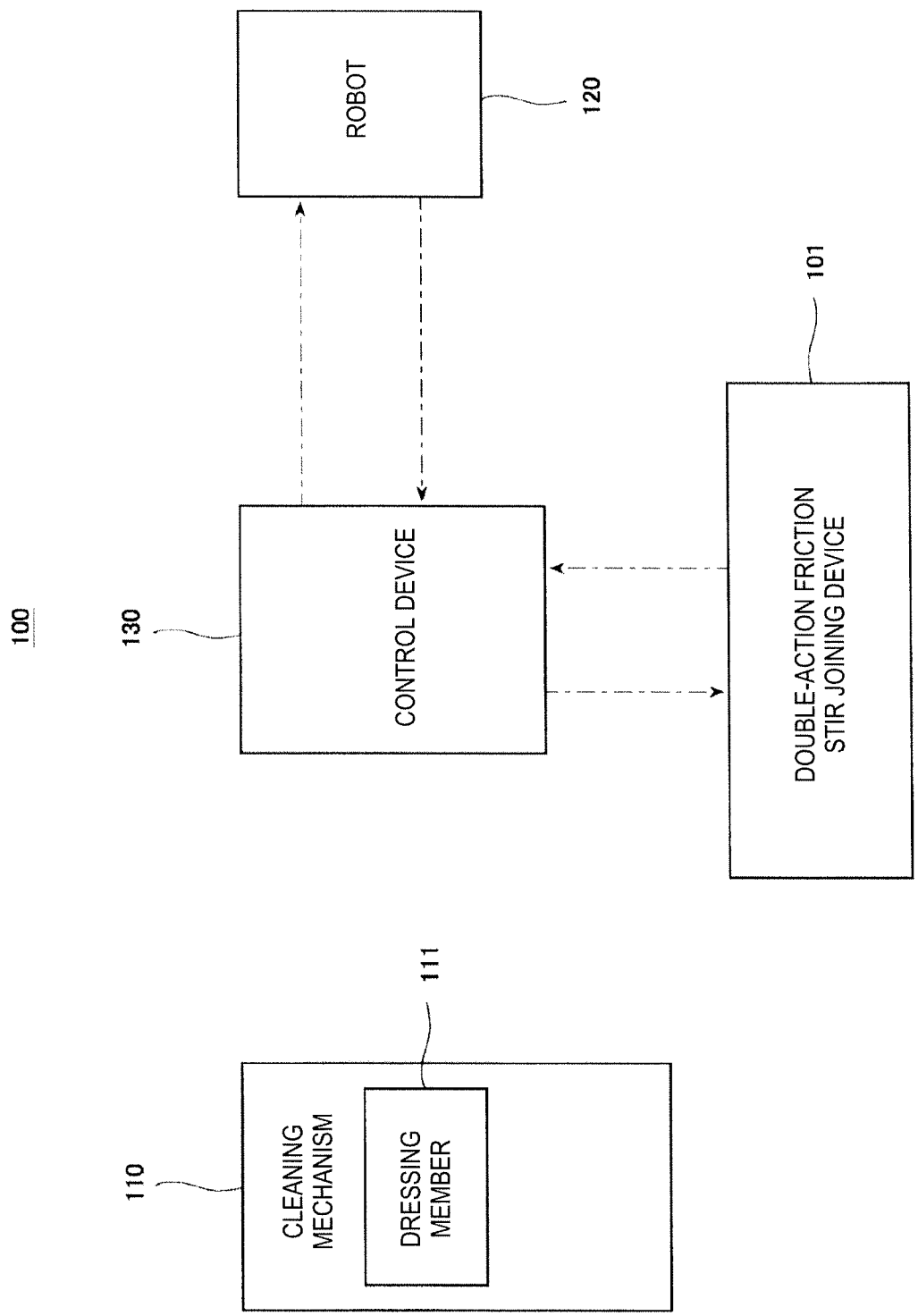
FIG. 1 is a block diagram illustrating an outline configuration of a double-action friction stir joining system according to Embodiment 1.

Hereinafter, desirable embodiments of the present disclosure will be described with reference to the drawings. Note that, below, the same reference characters are assigned to the same or corresponding elements throughout the drawings to omit redundant description. Moreover, throughout the drawings, components necessary to describe the present disclosure are selectively illustrated, and other components may be omitted. Moreover, the present disclosure is not limited to the following embodiments.

Embodiment 1

A double-action friction stir joining system according to Embodiment 1 includes a double-action friction stir joining device, a cleaning mechanism having a dressing member, a robot, and a control device. The double-action friction stir joining device includes a pin member which is formed in a cylindrical shape and is configured to be rotatable on its axis and reciprocatable in a direction along the axis, a shoulder member which is formed in a cylindrical shape, into which the pin member is inserted, and is configured to be rotatable on its axis and reciprocatable in a direction along the axis, a first rotary driver which rotates the pin member and the shoulder member on the axis, and a tool driver which reciprocates the pin member and the shoulder member along the axis. The control device is adapted to (A) operate the tool driver so that the pin member is thrusted into the shoulder member, (B) operate the first rotary driver so that the shoulder member rotates, and (C) operate the robot so that the robot holds the double-action friction stir joining device and the dressing member contacts an inner circumferential surface of the shoulder member.

Below, one example of the double-action friction stir joining system according to Embodiment 1 is described in detail with reference to FIGS. 1 to 4.

[Configuration of Double-Action Friction Stir Joining System]

FIG. 1 is a block diagram illustrating an outline configuration of the double-action friction stir joining system according to Embodiment 1.

As illustrated in FIG. 1, a double-action friction stir joining system 100 according to Embodiment 1 includes a double-action friction stir joining device 101, a cleaning mechanism 110, a robot 120, and a control device 130. The system 100 is configured so that the control device 130 controls the double-action friction stir joining device 101 to friction stir join an object 60 to be joined (to-be-joined object 60). Note that configurations of the double-action friction stir joining device 101 and the control device 130 will be described later.

The cleaning mechanism 110 has a dressing member 111. The dressing member 111 removes the material of the to-be-joined object 60 adhered to an inner circumferential surface of a shoulder member 12 of the double-action friction stir joining device 101 (described later). Note that the dressing member 111 may be grasped by the robot 120 or may be provided so as to stand from a pedestal etc., as will be described later.

As the dressing member 111, a cutting tool and/or a wire brush may be used, for example. The cutting tool may be made of material harder than the material of the to-be-joined object 60. Moreover, as the cutting tool, a carbide cutter, a ceramic grindstone, a cutting fiber, a precision reamer, an endmill, a carbide bar, etc. may be used, for example. Moreover, the cutting tool may suppress adhesion (agglutination) of the material of the to-be-joined object 60 by DLC coating etc.

Note that, if the dressing member 111 is comprised of a plurality of members, after using a certain dressing member, another dressing member may then be used. For example, after using the carbide bar, the wire member may be used.

If the wire brush is used as the dressing member 111, the material of the brush (brush part) may be stainless steel, steel, tungsten, phosphor bronze, and nylon containing abrasive grain. Moreover, the dimension of the brush may be larger than the inner diameter of the shoulder member 12, and may be 0.2 to 0.5 mm larger than the inner diameter of the shoulder member 12.

Moreover, if the carbide cutter is used as the dressing member 111, a tip-end part thereof may be formed in a spherical shape.

Note that the cleaning mechanism 110 may further have an aspirator for suppressing that the removed material of the to-be-joined object 60 disperses. The aspirator may be comprised of a vacuum pump or CONVUM®, a suction member such as a nozzle, and piping which connects the suction member with the vacuum pump etc., for example. Moreover, the cleaning mechanism 110 may further have a heating device which heats the shoulder member 12. As the heating device, a heater may be used, for example.

As the robot 120, various robots, such as a horizontal articulated type and a vertical articulated type can be adopted. Note that, in the double-action friction stir joining system 100 according to Embodiment 1, a form provided with sole robot 120 may be adopted. In this case, a form in which the robot 120 grasps the cleaning mechanism and the double-action friction stir joining device 101 is fixed may be adopted. Moreover, in the double-action friction stir joining system 100 according to Embodiment 1, a form provided with a plurality of robots 120 may be adopted. In this case, a certain robot may grasp the cleaning mechanism, and another robot may grasp the double-action friction stir joining device 101.

[Configuration of Double-Action Friction Stir Joining Device]

Figure 2:
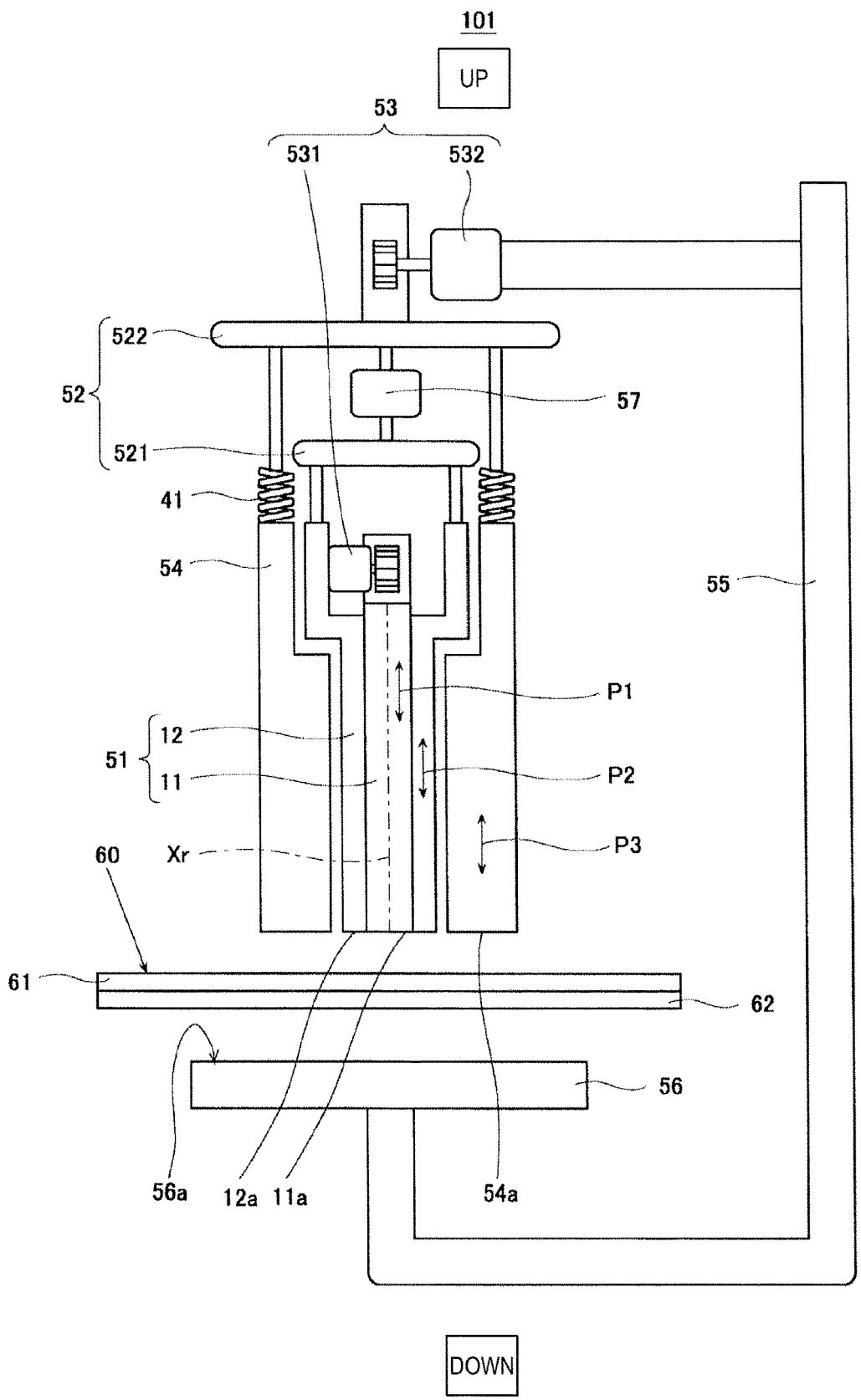
FIG. 2 is a schematic view illustrating an outline configuration of a double-action friction stir joining device illustrated in FIG. 1.

FIG. 2 is a schematic view illustrating an outline configuration of the double-action friction stir joining device illustrated in FIG. 1. Note that, in FIG. 2, an up-and-down direction in this drawing is expressed as an up-and-down direction of the double-action friction stir joining device.

As illustrated in FIG. 2, the double-action friction stir joining device 101 includes a joining tool 51 having a pin member 11 and the shoulder member 12, a joining tool fixing part 52, a tool driver 53, a clamp member 54, a C-shaped frame 55, and a backing member 56.

The pin member 11 and the shoulder member 12 are supported by the joining tool fixing part 52, and are reciprocated in the up-and-down direction by the tool driver 53. The pin member 11, the shoulder member 12, the joining tool fixing part 52, the tool driver 53, and the clamp member 54 are provided to an upper part of the C-shaped frame 55. Moreover, the backing member 56 is provided to a lower part of the C-shaped frame 55. The pin member 11 and the shoulder member 12, and the backing member 56, are attached to the C-shaped frame 55 at positions opposing to each other. Note that the to-be-joined object 60 is disposed between the pin member 11 and the shoulder member 12, and the backing member 56.

The joining tool fixing part 52 is comprised of a rotor 521 and a movable body 522. The tool driver 53 is comprised of a pin driver 531 and a shoulder driver 532. Moreover, the clamp member 54 is fixed to the movable body 522 through a clamp driver 41. Note that the clamp driver 41 is comprised of a spring.

The pin member 11 is formed in a substantially hollow cylindrical shape or substantially solid cylindrical shape, and although not illustrated in detail in FIG. 2, it is supported by the rotor 521. Moreover, the pin member 11 is configured to rotate on an axis Xr which is in agreement with the axial center (center axis) of the pin member 11, by a first rotary driver 57.

Moreover, the pin member 11 is configured to be reciprocatable relatively to the shoulder member 12 in an arrow P1 direction, i.e., an axis Xr direction (in FIG. 2, the up-and-down direction), by the pin driver 531. Note that the pin driver 531 may be comprised of a linear-movement actuator, for example. The linear-movement actuator may be comprised of a servomotor and a rack and a pinion, a servomotor and a ball screw, or an air cylinder, for example.

The shoulder member 12 is formed in a substantially hollow cylindrical shape, and is supported by the rotor 521. The pin member 11 is fitted into the hollow part of the shoulder member 12. In other words, the shoulder member 12 is disposed so as to surround an outer circumferential surface of the pin member 11. Moreover, the shoulder member 12 is configured to rotate on the same axis Xr as the pin member 11, by the first rotary driver 57. Moreover, the shoulder member 12 is configured to be reciprocatable in an arrow P2 direction (i.e., the axis Xr direction), by the shoulder driver 532.

Note that the shoulder driver 532 may be comprised of a linear-movement actuator, for example. The linear-movement actuator may be comprised of a servomotor and a rack and a pinion, a servomotor and a ball screw, or an air cylinder, for example.

Thus, in this embodiment, the pin member 11 and the shoulder member 12 are supported by the same rotor 521, and they rotate integrally on the axis Xr, by the first rotary driver 57. The first rotary driver 57 may be comprised of a servomotor, for example. Moreover, a sensor (not illustrated) such as a rotary encoder may detect a rotational speed (or a rotational angle) of the first rotary driver 57 and may output the detected rotational speed to the control device 130.

Note that, although in Embodiment 1 the pin member 11 and the shoulder member 12 are rotated by a single rotary driver (first rotary driver 57), it is not limited to this configuration. Two rotary drivers comprised of a rotary driver which rotates the pin member 11 and a rotary driver which rotates the shoulder member 12 may be provided.

Moreover, the rotor 521 is supported by the movable body 522 through the first rotary driver 57. Therefore, when the shoulder driver 532 drives, the pin member 11 and the movable body 522 reciprocate together with the shoulder member 12.

The clamp member 54 is formed in a hollow cylindrical shape and its axial center is provided so as to be in agreement with the axis Xr, similar to the shoulder member 12. The shoulder member 12 is fitted into a hollow of the clamp member 54.

That is, the substantially cylindrical shoulder member 12 is disposed so as to surround the outer circumferential surface of the pin member 11, and the substantially cylindrical clamp member 54 is disposed so as to surround an outer circumferential surface of the shoulder member 12. In other words, the clamp member 54, the shoulder member 12, and the pin member 11 have a coaxial telescopic structure.

Moreover, the clamp member 54 is configured to press the to-be-joined object 60 from one surface (front surface). In Embodiment 1, the clamp member 54 is supported by the movable body 522 through the clamp driver 41 as described above. The clamp driver 41 biases the clamp member 54 toward the backing member 56. The clamp member 54 (including the clamp driver 41 and the movable body 522) is configured to be reciprocatable in an arrow P3 direction (the same direction as the arrow P1 and the arrow P2), by the shoulder driver 532.

Note that, although in Embodiment 1 the clamp driver 41 is comprised of the spring, it is not limited to this configuration. The clamp driver 41 may suitably adopt a mechanism using gas pressure, oil pressure, a servomotor, etc. as long as it can give the biasing force or a pressure to the clamp member 54.

The pin member 11, the shoulder member 12, and the clamp member 54 are provided with a tip-end face 11a, a tip-end face 12a, and a tip-end face 54a, respectively. Moreover, the pin member 11, the shoulder member 12, and the clamp member 54 contact the front surface of the to-be-joined object 60 at the tip-end face 11a, the tip-end face 12a, and the tip-end face 54a, respectively, by being reciprocated by the tool driver 53.

In Embodiment 1, the backing member 56 is configured to support a back surface of the flat-plate-shaped to-be-joined object 60 by contacting on its flat surface (support surface 56a). The backing member 56 is not particularly limited in the configuration, as long as it can appropriately support the to-be-joined object 60 so that friction stir joining can be carried out. For example, as for the backing member 56, a plurality of backing members 56 having different types of shapes may be prepared separately, and one may be removed from the C-shaped frame 55 and replaced to another according to the type of the to-be-joined object 60.

The to-be-joined object 60 has two plate-shaped first member 61 and second member 62. The first member 61 and the second member 62 may be made of metallic material (e.g., aluminum, steel, etc.) or fiber-reinforced plastic (e.g., carbon fiber-reinforced plastic).

Note that, although in Embodiment 1 the to-be-joined object 60 is comprised of the plate-shaped first member 61 and the plate-shaped second member 62, it is not limited to this configuration. The shape of the to-be-joined object 60 (the first member 61 and the second member 62) is arbitrary, and, for example, it may be a rectangular parallelepiped shape or a circular shape. Moreover, the to-be-joined object 60 may have three or more members.

Note that, in Embodiment 1, the concrete configurations of the pin member 11, the shoulder member 12, the joining tool fixing part 52, the tool driver 53, the clamp member 54, the C-shaped frame 55, and the backing member 56 are not limited to the configurations described above, and widely-known configurations in the field of friction stir joining may suitably be used. For example, although in this embodiment the pin driver 531 and the shoulder driver 532 which constitute the tool driver 53 are comprised of a motor and gear mechanism known in the field of friction stir joining, they are not limited to this configuration.

Moreover, although in Embodiment 1 the clamp member 54 is provided, the present disclosure is not limited to this configuration. The clamp member 54 may not be provided. In this case, for example, the clamp member 54 may be configured to be attachable to and detachable from the C-shaped frame 55, if needed.

Moreover, the double-action friction stir joining device 101 according to Embodiment 1 is disposed at a robot device for friction stir joining (not illustrated). In detail, the C-shaped frame 55 is attached at a tip end of an arm of the robot.

Moreover, the double-action friction stir joining device 101 (including the C-shaped frame 55) is not limited to be applied to the robot device for friction stir joining, and for example, it can be suitably applied to known machining instruments, such as an NC machine, a large-sized C frame, and an auto riveter.

Moreover, the double-action friction stir joining device 101 according to Embodiment 1 may be configured so that two or more pairs of robots make a part of the double-action friction stir joining device 101 other than the backing member 56. Moreover, as long as the double-action friction stir joining device 101 can stably perform the friction stir joining of the to-be-joined object 60, the to-be-joined object 60 may be a handheld type, or the robot may be used as a positioner of the to-be-joined object 60.

[Control Configuration of Double-Action Friction Stir Joining System]

Figure 3:
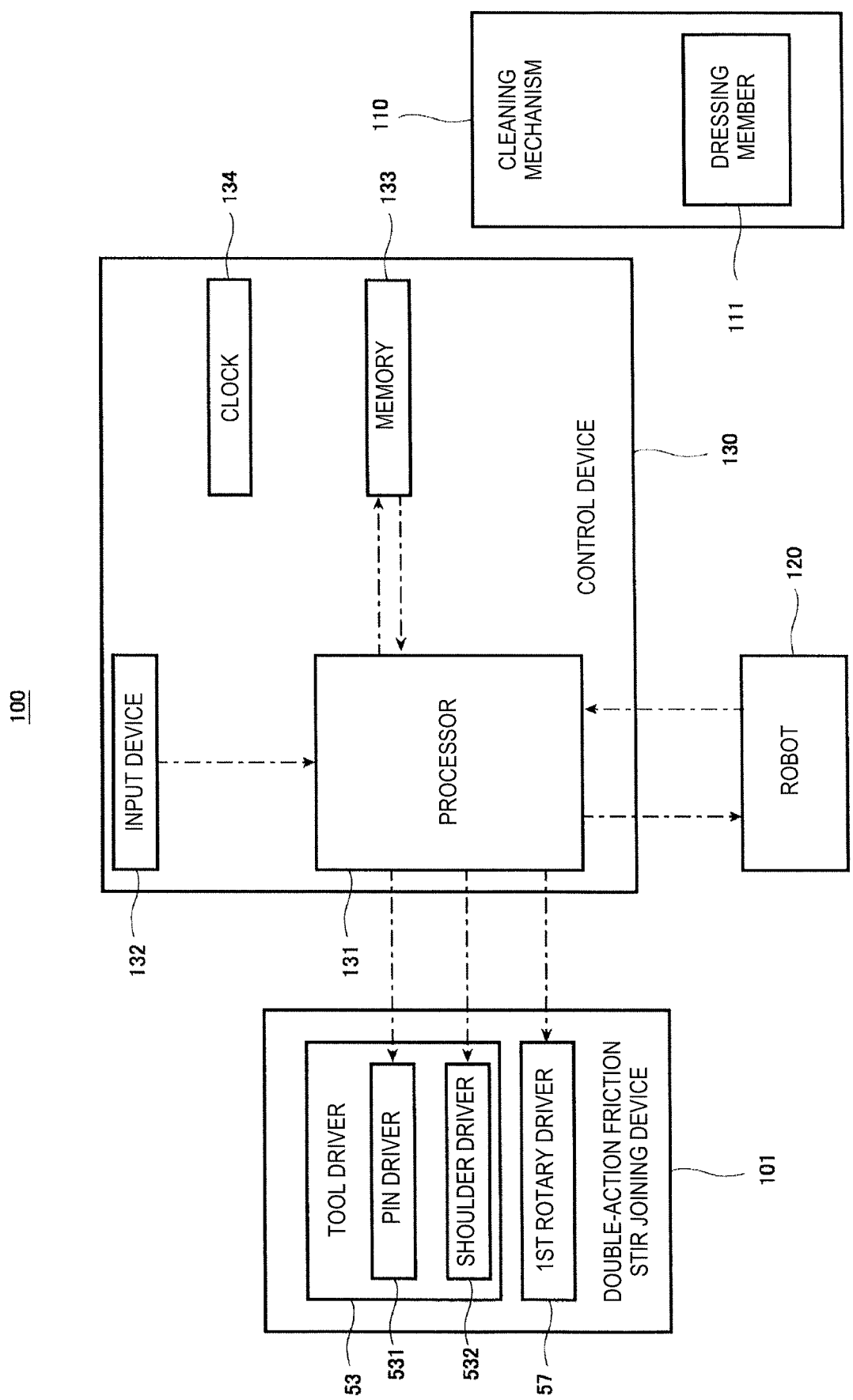
FIG. 3 is a block diagram schematically illustrating a control configuration of the double-action friction stir joining system illustrated in FIG. 1.

Next, a control configuration of the double-action friction stir system according to Embodiment 1 is described concretely with reference to FIG. 3.

FIG. 3 is a block diagram schematically illustrating the control configuration of the double-action friction stir joining system illustrated in FIG. 1.

As illustrated in FIG. 3, the control device 130 includes a processor 131, an input device 132, a memory 133, and a clock 134 having a calendar function. The processor 131 is comprised of a microprocessor, a CPU, etc.

The memory 133 stores information on a basic program, various fixed data, etc. The memory 133 does not need to be comprised of a single device, and may be comprised of a plurality of storages (e.g., a random-access memory and a hard disk drive). If the processor 131 etc. is comprised of a microcomputer, at least a part of the memory 133 may be configured as an internal memory of the microcomputer, or may be configured as an independent memory.

The processor 131 controls various operations of the double-action friction stir joining device 101 and the robot 120 by reading and executing software, such as the basic program stored in the memory 133.

Therefore, it can control switching between an advancing movement and a retreating movement of the pin member 11 and the shoulder member 12, and a tip-end position, a moving speed, and a moving direction of the pin member 11 and the shoulder member 12 during the advancing and retreating movements. Moreover, it can control a pressing force of the pin member 11, the shoulder member 12, and the clamp member 54 against the to-be-joined object 60. Moreover, it can control a rotational speed of the pin member 11 and the shoulder member 12.

The input device 132 accepts an input of various parameters related to the control of friction stir joining and other data into the processor 131, and is comprised of a known input device, such as a keyboard, a touch panel, and a button-switch group. In Embodiment 1, at least a joining condition of the to-be-joined object 60, for example, data such as a thickness and material of the to-be-joined object 60 can be input through the input device 132.

Note that the control device 130 may be comprised of a sole control device 130 which carries out a centralized control, or may be comprised of a plurality of control devices 130 which collaboratively carry out a distributed control. Moreover, the control device 130 may be comprised of a microcomputer, or may be comprised of an MPU, a PLC (Programmable Logic Controller), a logic circuit, etc.

[Operation and Effects of Double-Action Friction Stir Joining System]

Next, operation and effects of the double-action friction stir joining system according to Embodiment 1 are described with reference to FIGS. 1 to 4.

Figure 4:
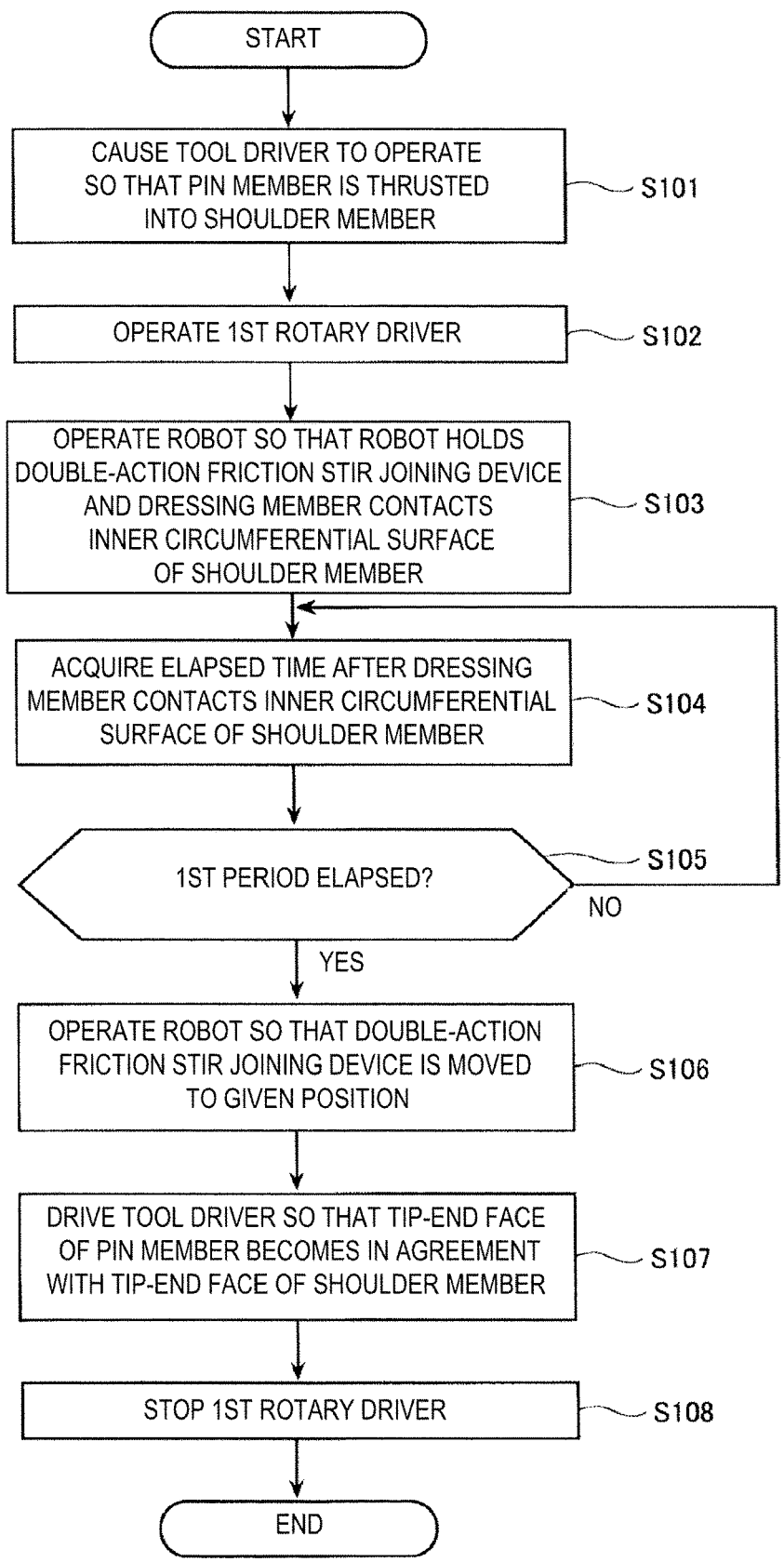
FIG. 4 is a flowchart illustrating one example of operation of the double-action friction stir joining system according to Embodiment 1.

FIG. 4 is a flowchart illustrating one example of the operation of the double-action friction stir joining system according to Embodiment 1.

First, when a worker (operator) operates the input device 132 to input instruction information into the processor 131 so that a cleaning (maintenance) of the shoulder member 12 is performed, or when the double-action friction stir joining device 101 carries out a given number of friction stir joinings set in advance, the processor 131 of the control device 130 performs the following operation (processing) by reading the program stored in the memory 133.

The control device 130 causes the tool driver 53 (pin driver 531) to drive (operate) so that the pin member 11 is thrusted into the shoulder member 12 (Step S101). At this time, the control device 130 may cause the tool driver 53 (pin driver 531) to drive until the position of the tip-end face 11a of the pin member 11 in the axis Xr direction reaches a first position or a second position set in advance.

Here, for example, the first position may be a position at which the tip-end face 11a of the pin member 11 is located innermost with respect to the shoulder member 12 (a position moved uppermost) during the joining of the to-be-joined object 60. Moreover, the second position may be a position which can be set in advance by an experiment etc., and for example, it may be a position at which the tip-end face 11a of the pin member 11 can be located innermost with respect to the shoulder member 12 (an uppermost position movable as the device)

Next, the control device 130 operates the first rotary driver 57 (Step S102) to rotate the shoulder member 12. Note that, in Embodiment 1, the pin member 11 also rotates with the rotation of the shoulder member 12.

Next, the control device 130 operates the robot 120 so that the robot 120 holds the double-action friction stir joining device 101 and the dressing member 111 of the cleaning mechanism 110 contacts the inner circumferential surface of the shoulder member 12 (Step S103).

At this time, the control device 130 may operate the robot 120 so that the dressing member 111 reciprocates in an inward space (interior space) of the shoulder member 12 along the axis Xr. In detail, the control device 130 operates the robot 120 so that the shoulder member 12 reciprocates along the axis Xr.

Note that, when the robot 120 has already held the double-action friction stir joining device 101, the control device 130 operates the robot 120 so that the dressing member 111 of the cleaning mechanism 110 contacts the inner circumferential surface of the shoulder member 12. Moreover, the control device 130 may operate the robot 120 so that the dressing member 111 contacts the inner circumferential surface of the shoulder member 12, while heating the shoulder member 12 by using a heating device.

Therefore, the material of the to-be-joined object 60 adhered to the inner circumferential surface of the shoulder member 12 can be removed (scraped) by the dressing member 111.

Next, the control device 130 acquires, from the clock 134, an elapsed time after the dressing member 111 contacts the inner circumferential surface of the shoulder member 12 (Step S104). Next, the control device 130 determines whether the time acquired at Step S104 reaches a first period set in advance (Step S105).

Here, the first period can be obtained in advance by an experiment etc., and for example, it may be a time required for fully removing the material of the to-be-joined object 60 adhered to the inner circumferential surface of the shoulder member 12. For example, the first period may be 30 seconds or longer in terms of fully removing the material of the to-be-joined object 60 adhered to the inner circumferential surface of the shoulder member 12, or may be 60 seconds or shorter in terms of shortening the cleaning time.

If the control device 130 determines that the time acquired at Step S104 does not reach the first period (No at Step S105), it repeats the processings of Steps S104 and S105 until the time acquired at Step S104 reaches the first period. On the other hand, if the control device 130 determines that the time acquired at Step S104 reaches the first period (Yes at Step S105), it performs processing of Step S106.

At Step S106, the control device 130 operates the robot 120 so that the double-action friction stir joining device 101 is moved to a given position set in advance (an initial position where the double-action friction stir joining device 101 is installed).

Next, the control device 130 drives the tool driver 53 (pin driver 531) so that the tip-end face 11a of the pin member 11 becomes in agreement with the tip-end face 12a of the shoulder member 12 (Step S107). Next, the control device 130 stops the first rotary driver 57 (Step S108), and ends this program.

In the double-action friction stir joining system 100 according to Embodiment 1 configured in this way, the control device 130 operates the robot 120 so that the dressing member 111 contacts the inner circumferential surface of the shoulder member 12, while rotating the shoulder member 12.

Therefore, the material of the to-be-joined object 60 adhered to the inner circumferential surface of the shoulder member 12 can be removed by the dressing member 111.

Note that, although the double-action friction stir joining system 100 according to Embodiment 1 is provided with the clamp member 54, it is not limited to this configuration and may not be provided with the clamp member 54.

[Modification 1]

Next, a modification of the double-action friction stir joining system 100 according to Embodiment 1 is described.

In a double-action friction stir joining system of Modification 1 of Embodiment 1, the control device operates the robot in (C) so that the robot holds the cleaning mechanism and the dressing member contacts the inner circumferential surface of the shoulder member.

Below, one example of the double-action friction stir joining system of Modification 1 of Embodiment 1 is described with reference to FIG. 5. Note that, since a configuration of the double-action friction stir joining system of Modification 1 of Embodiment 1 is the same as that of the double-action friction stir joining system according to Embodiment 1, the detailed description is omitted.

Figure 5:
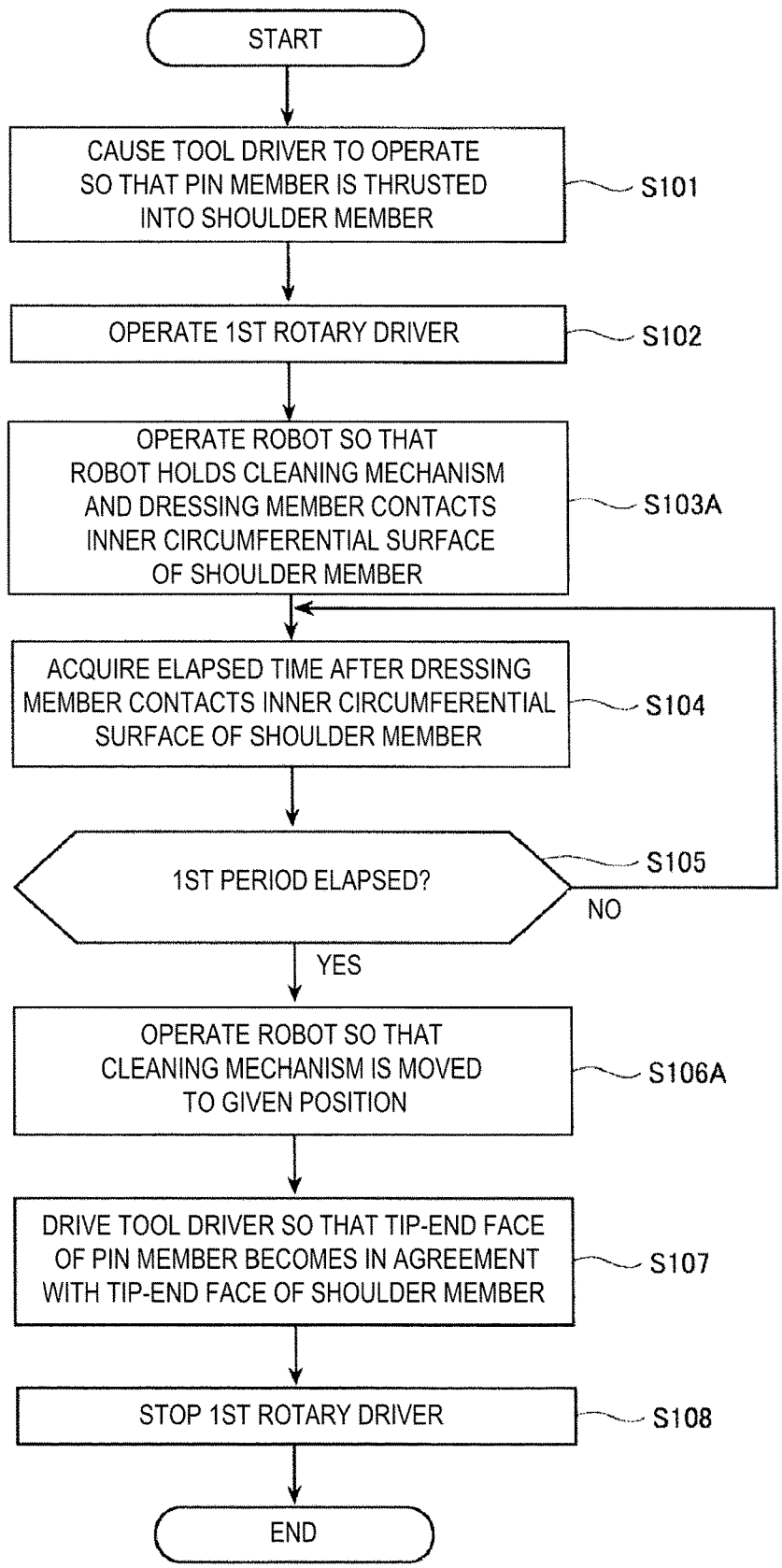
FIG. 5 is a flowchart illustrating one example of operation of a double-action friction stir joining system of Modification 1 of Embodiment 1.

FIG. 5 is a flowchart illustrating one example of operation of the double-action friction stir joining system of Modification 1 of Embodiment 1.

As illustrated in FIG. 5, although the operation of the double-action friction stir joining system 100 of Modification 1 of Embodiment 1 is fundamentally the same as that of the double-action friction stir joining system 100 according to Embodiment 1, it differs in that Steps S103A and S106A are performed, instead of Steps S103 and S106.

In detail, the control device 130 operates the robot 120 so that the robot 120 holds the cleaning mechanism 110 (dressing member 111) and the dressing member 111 of the cleaning mechanism 110 contacts the inner circumferential surface of the shoulder member 12 (Step S103A). At this time, the double-action friction stir joining device 101 may be fixedly installed, or may be grasped by a robot other than the robot 120.

Next, the control device 130 acquires, from the clock 134, the elapsed time after the dressing member 111 contacts the inner circumferential surface of the shoulder member 12 (Step S104). Next, the control device 130 determines whether the time acquired at Step S104 reaches the first period set in advance (Step S105).

Next, if the control device 130 determines that the time acquired at Step S104 reaches the first period (Yes at Step S105), it operates the robot 120 so that the cleaning mechanism 110 is moved to a given position set in advance (an initial position where the cleaning mechanism 110 is installed) (Step S106A).

Also according to the double-action friction stir joining system 100 of Modification 1 of Embodiment 1 configured in this way, similar operation and effects to the double-action friction stir joining system 100 according to Embodiment 1 can be acquired.

[Modification 2]

In a double-action friction stir joining system of Modification 2 of Embodiment 1, the robot is configured to be pivotable or rotatable on the axis while holding the double-action friction stir joining device. The control device operates the robot in (C) so that the robot holds the double-action friction stir joining device and the dressing member contacts the inner circumferential surface of the shoulder member while pivoting the double-action friction stir joining device.

Below, one example of the double-action friction stir joining system of Modification 2 of Embodiment 1 is described with reference to FIGS. 6 and 7. Note that, although the double-action friction stir joining system 100 of Modification 2 of Embodiment 1 is the same in the fundamental configuration as the double-action friction stir joining system 100 according to Embodiment 1, one example of a configuration of the robot 120 is described with reference to FIG. 6.

[Configuration of Robot]

Figure 6:
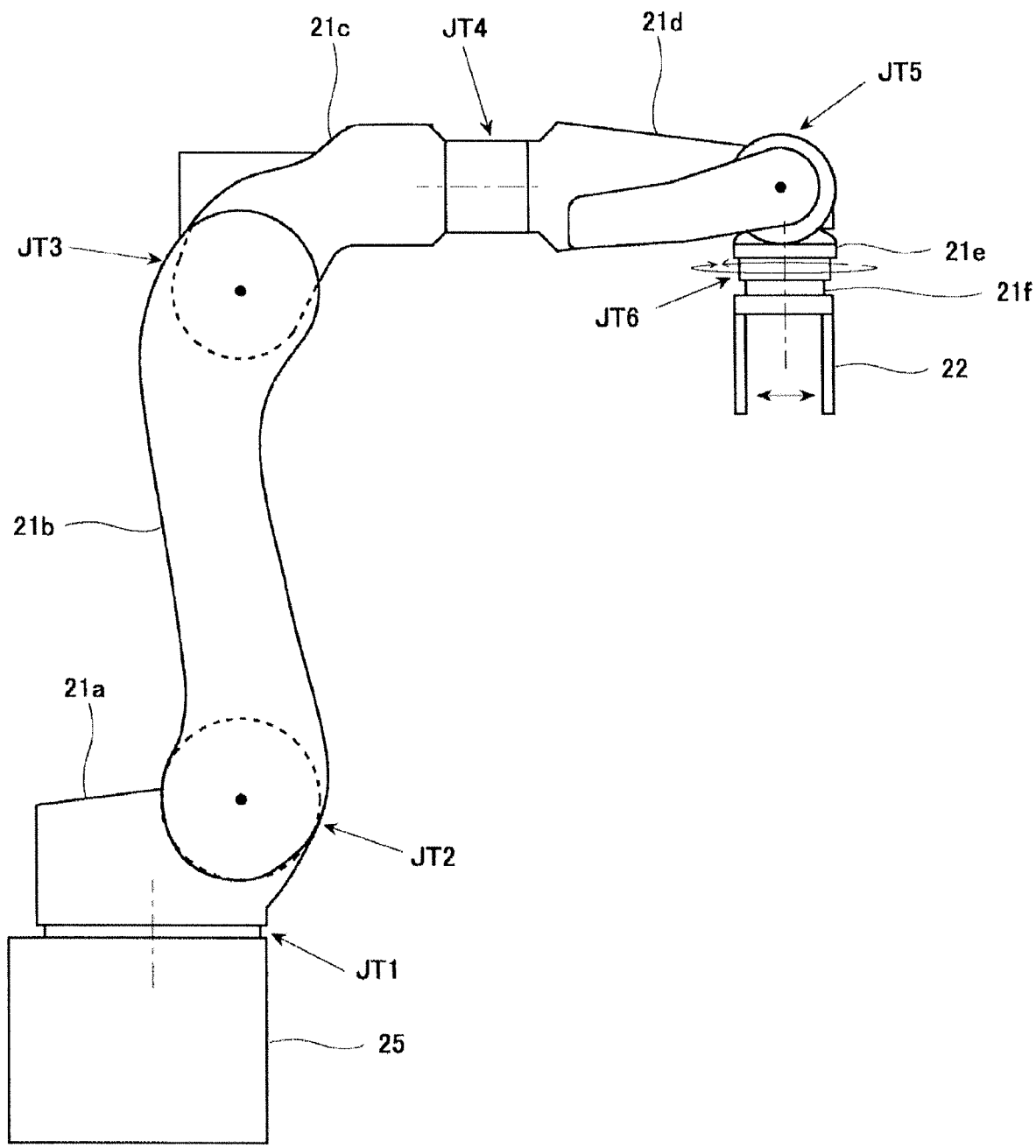
FIG. 6 is a schematic view illustrating an outline configuration of a robot in a double-action friction stir joining system of Modification 2 of Embodiment 1.

FIG. 6 is a schematic view illustrating an outline configuration of the robot in the double-action friction stir joining system of Modification 2 of Embodiment 1.

As illustrated in FIG. 6, the robot 120 in the double-action friction stir joining system 100 of Modification 2 is an articulated robotic arm having a serially-coupled body comprised of a plurality of links (here, a first link 21a to a sixth link 21f), a plurality of joints (here, a first joint JT1 to a sixth joint JT6), and a pedestal 25 which supports these.

In the first joint JT1, the pedestal 25 and a base-end part of the first link 21a are coupled to each other rotatably on an axis extending in the vertical direction. In the second joint JT2, a tip-end part of the first link 21a and a base-end part of the second link 21b are coupled to each other rotatably on an axis extending in the horizontal direction. In the third joint JT3, a tip-end part of the second link 21b and a base-end part of the third link 21c are coupled to each other rotatably on an axis extending in the horizontal direction.

Moreover, in the fourth joint JT4, a tip-end part of the third link 21c and a base-end part of the fourth link 21d are coupled to each other rotatably on an axis extending in the longitudinal direction of the fourth link 21d. In the fifth joint JT5, a tip-end part of the fourth link 21d and a base-end part of the fifth link 21e are coupled to each other rotatably on an axis perpendicular to the longitudinal direction of the fourth link 21d. In the sixth joint JT6, a tip-end part of the fifth link 21e and a base-end part of the sixth link 21f are coupled to each other rotatably in a twistable fashion. Thus, the robot 120 can operate so as to be pivotably or rotatably on the axis Xr, while holding the double-action friction stir joining device 101.

A mechanical interface is provided to a tip-end part of the sixth link 21f An end effector 22 corresponding to the content of work is detachably attached to the mechanical interface. Note that, in Embodiment 1, as the end effector 22, a hand for holding (grasping) the double-action friction stir joining device 101 is provided.

Moreover, the first to sixth joints JT1-JT6 are each provided with a drive motor (not illustrated) as one example of an actuator which relatively rotates two members coupled through the joint. The drive motor may be a servomotor which is servo-controlled by the control device 130, for example. Moreover, the first to sixth joints JT1-JT6 are each provided with a rotation sensor (not illustrated) which detects a rotational position of the drive motor, and a current sensor which detects current for controlling the rotation of the drive motor (not illustrated). The rotation sensor may be an encoder, for example.

Note that, although in Modification 2 the vertical articulated robot is adopted as the robot 120, it is not limited to this configuration. A horizontal articulated robot may be adopted, as long as it is configured to be pivotable or rotatable on the axis Xr, while the robot 120 holds the double-action friction stir joining device.

[Operation and Effects of Double-Action Friction Stir Joining System]

Figure 7:
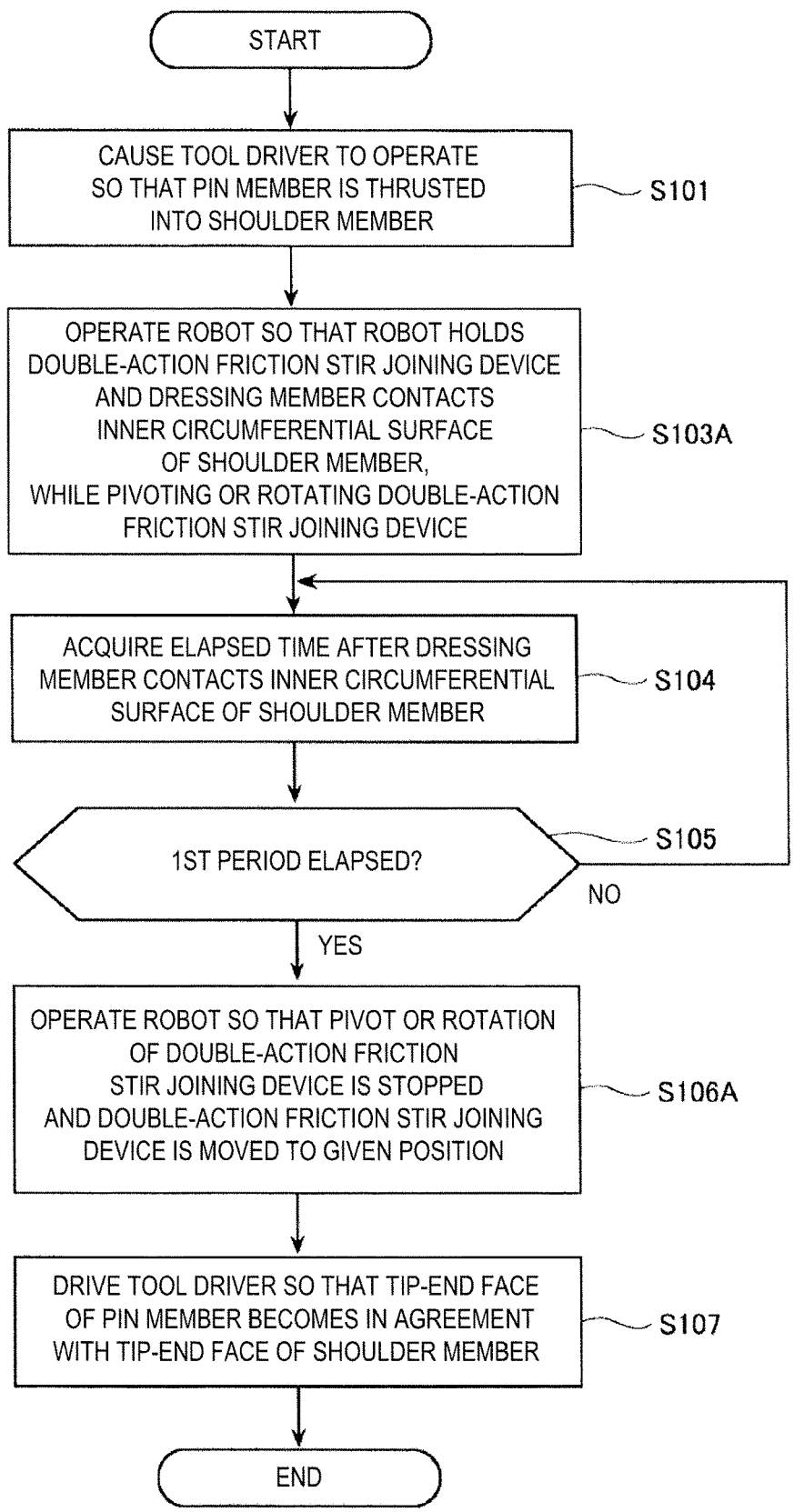
FIG. 7 is a flowchart illustrating one example of operation of the double-action friction stir joining system of Modification 2 of Embodiment 1.

FIG. 7 is a flowchart illustrating one example of operation of the double-action friction stir joining system of Modification 2 of Embodiment 1.

As illustrated in FIG. 7, although the operation of the double-action friction stir joining system 100 of Modification 2 of Embodiment 1 is fundamentally the same as that of the double-action friction stir joining system 100 according to Embodiment 1, it differs in that the operations (processings) of Steps S102 and S108 are not performed, and operations (processings) of Steps S103A and S106A are performed instead of Steps S103 and S106.

In detail, the control device 130 causes the tool driver 53 (pin driver 531) to drive (operate) so that the pin member 11 is thrusted into the shoulder member 12 (Step S101). Next, the control device 130 operates the robot 120 so that the robot 120 holds the double-action friction stir joining device 101 and the dressing member 111 of the cleaning mechanism 110 contacts the inner circumferential surface of the shoulder member 12, while pivoting or rotating the double-action friction stir joining device 101 (Step S103A).

Therefore, the material of the to-be-joined object 60 adhered to the inner circumferential surface of the shoulder member 12 can be removed (scraped) by the dressing member 111. Note that a cutting tool may be used as the dressing member 111.

Next, the control device 130 acquires, from the clock 134, the elapsed time after the dressing member 111 contacts the inner circumferential surface of the shoulder member 12 (Step S104). Next, the control device 130 determines whether the time acquired at Step S104 reaches the first period set in advance (Step S105).

If the control device 130 determines that the time acquired at Step S104 reaches the first period (Yes at Step S105), it performs processing of Step S106A.

At Step S106A, the control device 130 operates the robot 120 so that the pivot or rotation of the double-action friction stir joining device 101 is stopped, and the double-action friction stir joining device 101 is moved to the given position set in advance.

Next, the control device 130 drives the tool driver 53 (pin driver 531) so that the tip-end face 11a of the pin member 11 becomes in agreement with the tip-end face 12a of the shoulder member 12 (Step S107), and ends this program.

Also according to the double-action friction stir joining system 100 of Modification 2 of Embodiment 1 configured in this way, similar operation and effects to the double-action friction stir joining system 100 according to Embodiment 1 can be acquired.

[Modification 3]

In a double-action friction stir joining system of Modification 3 of Embodiment 1, the dressing member is comprised of a cutting tool and/or a wire brush.

Moreover, in the double-action friction stir joining system of Modification 3 of Embodiment 1, the control device may operate the robot in (C) so that (C1) the cutting tool contacts the inner circumferential surface of the shoulder member, and (C2) the wire brush contacts the inner circumferential surface of the shoulder member.

Moreover, in the double-action friction stir joining system of Modification 3 of Embodiment 1, the cleaning mechanism may further have an air blow device, and, in (C), the control device may operate the air blow device (C0) so that air is blown toward the cutting tool before (C1).

Below, one example of the double-action friction stir joining system of Modification 3 of Embodiment 1 is described with reference to FIGS. 8, 9A, and 9B.

[Configuration of Double-Action Friction Stir Joining System]

Figure 8:
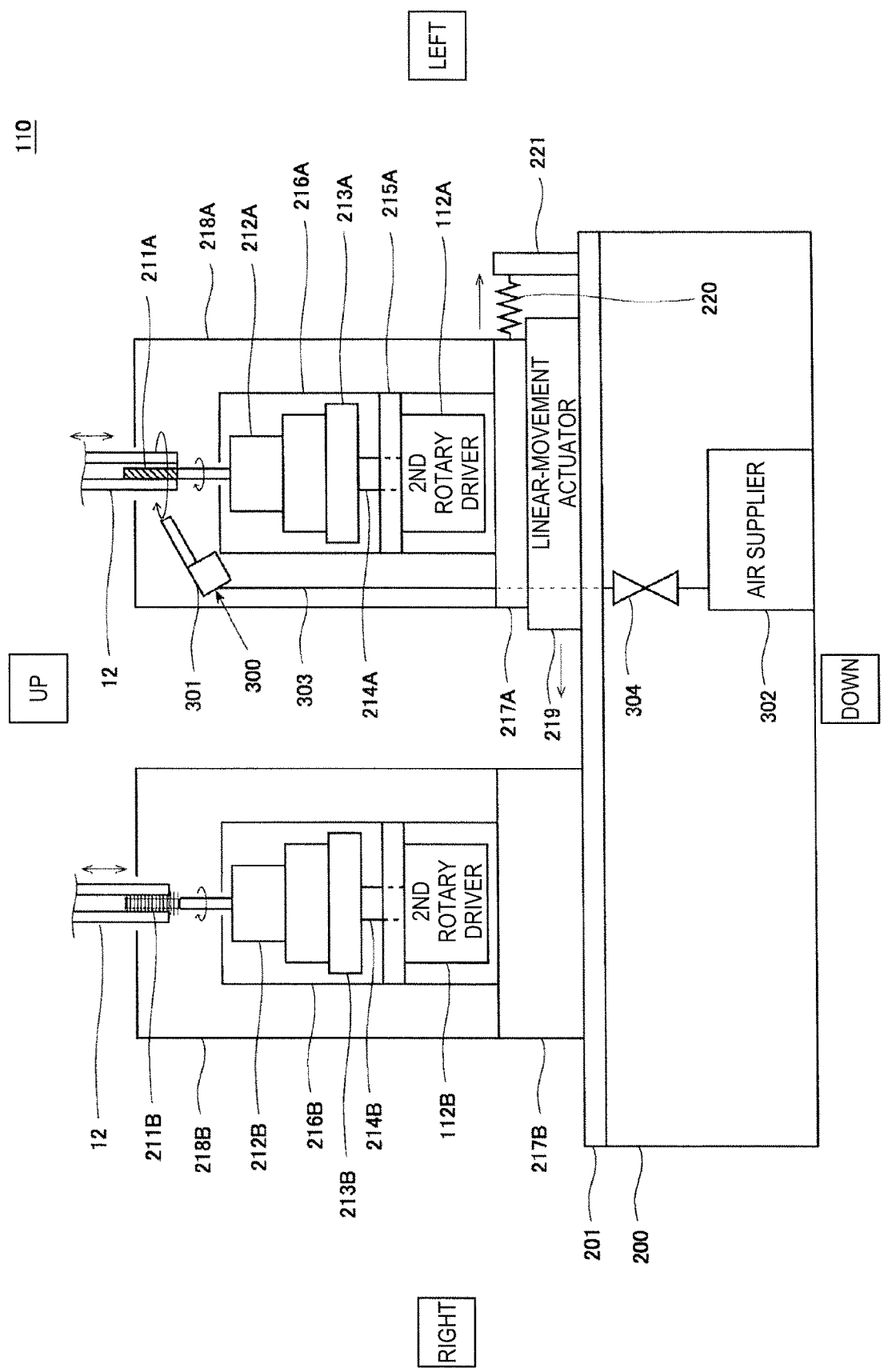
FIG. 8 is a schematic view illustrating an outline configuration of a cleaning mechanism of a double-action friction stir joining system of Modification 3 of Embodiment 1.

FIG. 8 is a schematic view illustrating an outline configuration of a cleaning mechanism of the double-action friction stir joining system of Modification 3 of Embodiment 1. Note that, in FIG. 8, an up-and-down direction and a left-and-right direction of the cleaning mechanism are expressed as an up-and-down direction and a left-and-right direction in this drawing.

As illustrated in FIG. 8, although the double-action friction stir joining system 100 of Modification 3 of Embodiment 1 is the same in the fundamental configuration as the double-action friction stir joining system 100 according to Embodiment 1, it differs in the configuration of the cleaning mechanism 110. In detail, the cleaning mechanism 110 has a box-shaped pedestal 200, a plate-shaped base member 201, and the dressing member 111. The base member 201 is disposed in an upper part of the pedestal 200, and the dressing member 111 is provided so as to stand from the base member 201.

In Modification 3, the dressing member 111 is comprised of a cutting tool 211A and a wire brush 211B. The cutting tool 211A may be a tool where cutting blade(s) and groove(s) are formed. Here, a carbide bar is used as the cutting tool 211A. The carbide bar may be made of material harder than the material of the to-be-joined object 60 which is joined by the double-action friction stir joining device 101. If the material of the to-be-joined object 60 is aluminum, a carbide bar for aluminum may be used.

The cutting tool 211A is disposed so that its axial center direction is oriented in the vertical direction, and it is fixed by a chuck device 212A. The chuck device 212A is connected with a second rotary driver 112A through a gear 213A and a shaft member 214A. Therefore, the cutting tool 211A is rotatable.

The second rotary driver 112A, the chuck device 212A, the gear 213A, and the shaft member 214A are covered with an inner cover member 216A. Therefore, when the material of the to-be-joined object 60 adhered to the inner circumferential surface of the shoulder member 12 is scraped by the cutting tool 211A, it can be suppressed that chips enter into the inner cover member 216A.

Moreover, the second rotary driver 112A is fixed to a fixing member 217A through a plate member 215A and the inner cover member 216A.

The fixing member 217A is reciprocatable in the left-and-right direction by a linear-movement actuator 219 and a linear guide (not illustrated). As the linear-movement actuator 219, an air cylinder may be used, for example. Moreover, an elastic member 220 is connected to the fixing member 217A. Here, as the elastic member 220, a tensile spring is used. The elastic member 220 is connected to a fixing member 221 provided so as to stand from the base member 201.

Moreover, an outer cover member 218A is provided to the fixing member 217A so as to cover the inner cover member 216A. An air blow device 300 (air blow gun 301) is disposed in a space between the outer cover member 218A and the inner cover member 216A.

The air blow gun 301 is configured to blow away the material of the to-be-joined object 60 adhered to a cutting part of the cutting tool 211A by air. The air blow gun 301 is connected with an air supplier 302 through piping 303.

Moreover, an on-off valve (electromagnetic valve) 304 is disposed at an intermediate location of the piping 303. The opening-and-closing operation of the on-off valve 304 is controlled by the control device 130. Note that the air blow device 300 may be configured so that the pressure of air blown from the air blow gun 301 becomes 0.2 to 0.4 MPa.

The wire brush 211B is disposed so that its axial center direction is oriented in the vertical direction, and it is fixed by a chuck device 212B. The chuck device 212B is connected with a second rotary driver 112B through a gear 213B and a shaft member 214B. Therefore, the wire brush 211B is rotatable.

The second rotary driver 112B, the chuck device 212B, the gear 213B, and the shaft member 214B are covered with an inner cover member 216B. Moreover, the second rotary driver 112B is fixed to a fixing member 217B through a plate member 215B and the inner cover member 216B. Moreover, an outer cover member 218B is provided to the fixing member 217B so as to cover the inner cover member 216B.

[Operation of Double-Action Friction Stir Joining System]

Next, operation and effects of the double-action friction stir joining system 100 of Modification 3 are described with reference to FIGS. 8 to 9B.

Figure 9A:
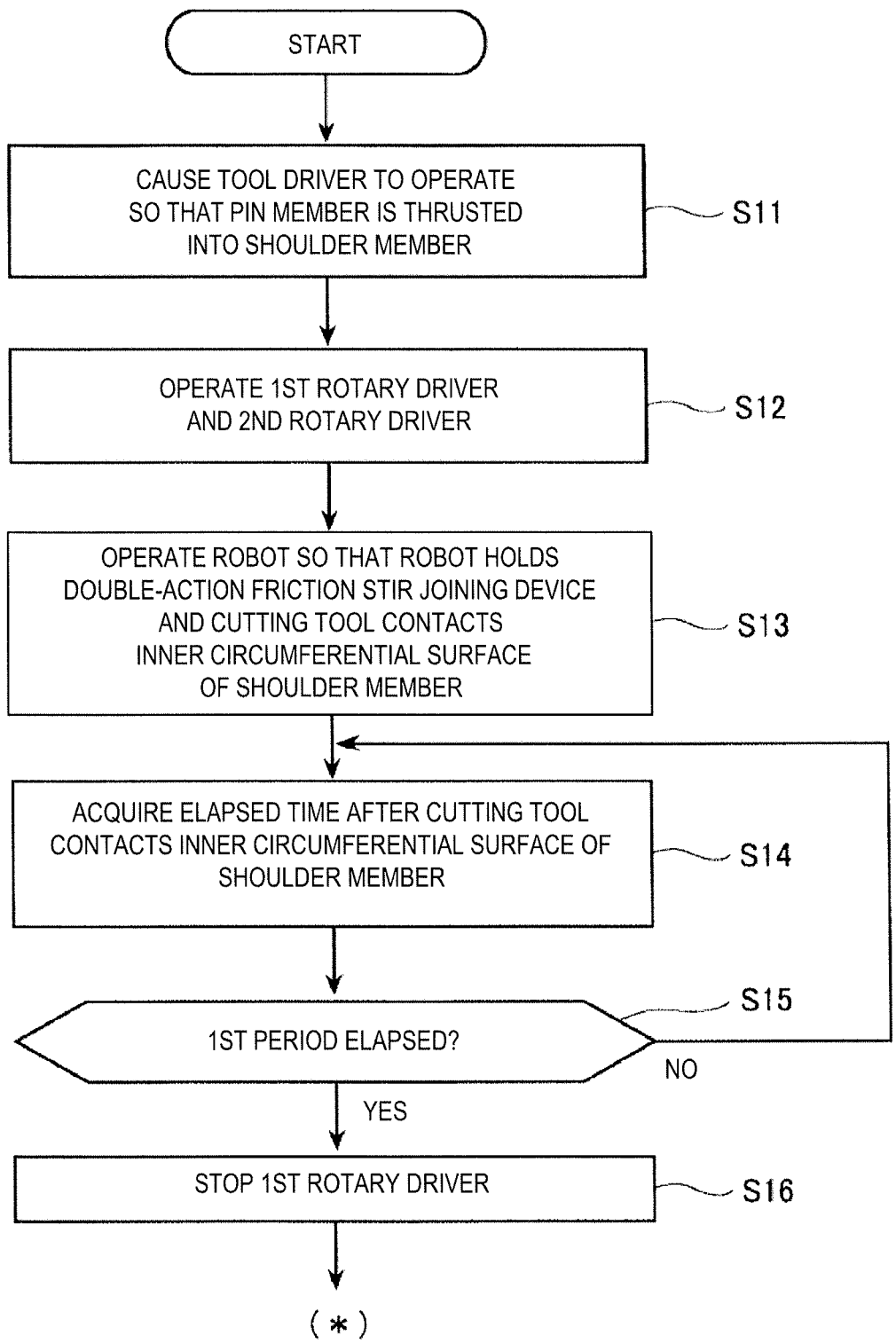
FIG. 9A is a flowchart illustrating one example of operation of the double-action friction stir joining system of Modification 3.
Figure 9B:
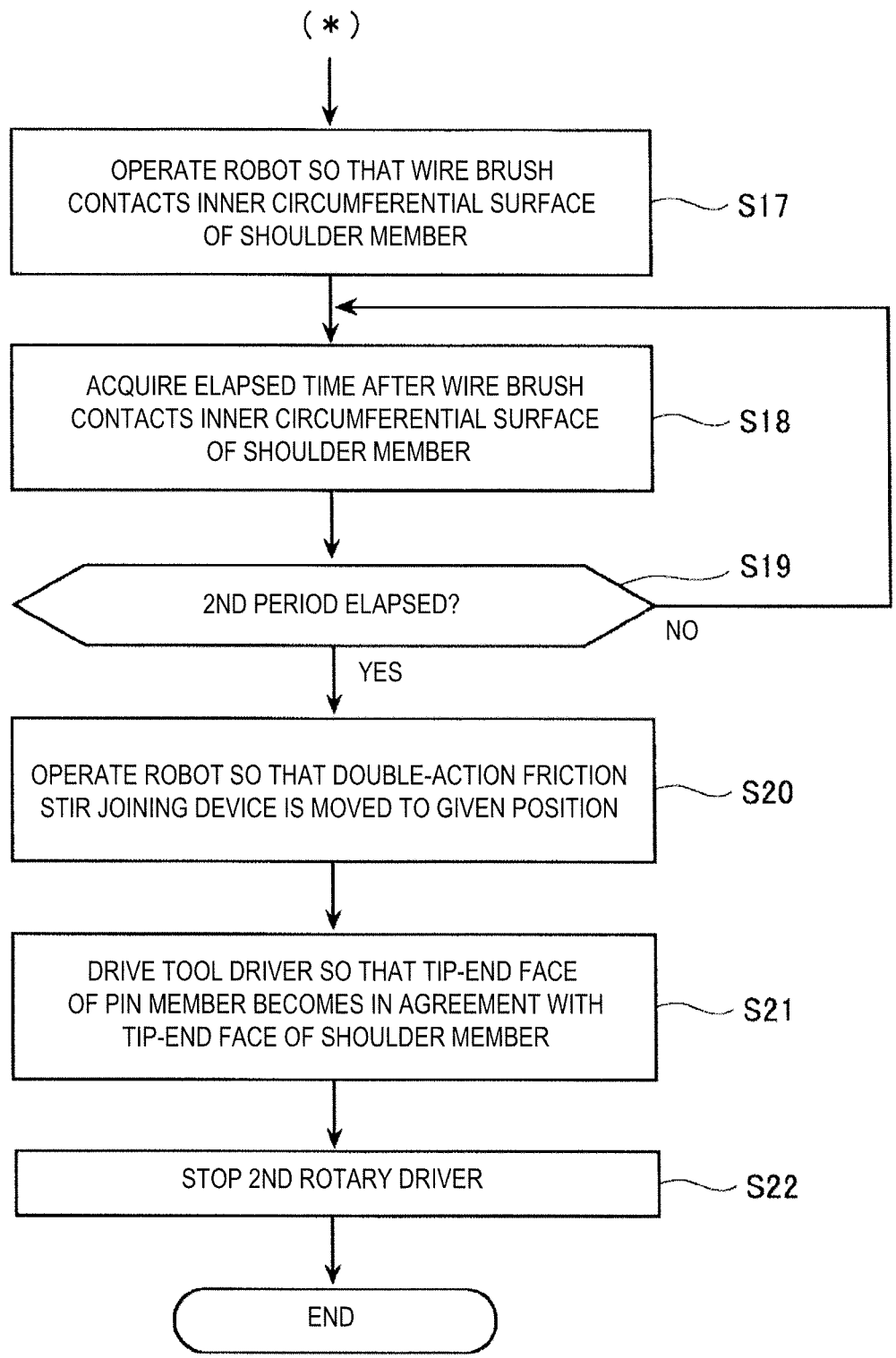
FIG. 9B is a flowchart illustrating one example of the operation of the double-action friction stir joining system of Modification 3.

FIGS. 9A and 9B are flowcharts illustrating one example of the operation of the double-action friction stir joining system of Modification 3.

First, when the worker (operator) operates the input device 132 to input instruction information into the processor 131 so that the cleaning (maintenance) of the shoulder member 12 is performed, or when the double-action friction stir joining device 101 carries out the given number of friction stir joinings set in advance, the processor 131 of the control device 130 performs the following operation (processing) by reading the program stored in the memory 133.

The control device 130 causes the tool driver 53 (pin driver 531) to drive (operate) so that the pin member 11 is thrusted into the shoulder member 12 (Step S11). Next, the control device 130 operates the first rotary driver 57 and the second rotary drivers 112A and 112B (Step S12) to rotate the shoulder member 12 and the dressing member 111 (the cutting tool 211A and the wire brush 211B).

Note that the control device 130 may operate the first rotary driver 57 and the second rotary driver 112A so as to rotate the shoulder member 12 and the cutting tool 211A. Moreover, the control device 130 may cause the tool driver 53 (pin driver 531) to drive so that the pin member 11 is thrusted into the shoulder member 12, after the first rotary driver 57 and/or the second rotary drivers 112A and 112B are operated. That is, after performing the processing of Step S12, the control device 130 may perform the processing of Step S11.

Next, the control device 130 operates the robot 120 so that the robot 120 holds the double-action friction stir joining device 101 and the cutting tool 211A contacts the inner circumferential surface of the shoulder member 12 (Step S13). Therefore, the material of the to-be-joined object 60 adhered to the inner circumferential surface of the shoulder member 12 can be removed (scraped) by the cutting tool 211A.

In detail, the control device 130 operates the linear-movement actuator 219 so that the fixing member 217A etc. advances to the right. Therefore, the elastic member 220 is extended to the right.

Next, the control device 130 operates the robot 120 so that the robot 120 holds the double-action friction stir joining device 101, and the cutting tool 211A is located in the interior space of the shoulder member 12. Then, the control device 130 stops operation of the linear-movement actuator 219 so that the fixing member 217A becomes freely movable.

Therefore, the fixing member 217A etc. is returned to the left by the elastic deformation of the elastic member 220. In connection with this, the inner circumferential surface of the shoulder member 12 and the cutting tool 211A can carry out a line contact, and therefore, the cleaning range can be extended.

Note that the control device 130 operates the air supplier 302 and opens a valve body of the on-off valve 304 to blow air from the air blow gun 301 so as to remove the material of the to-be-joined object 60 adhered to the cutting part of the cutting tool 211A, before operating the linear-movement actuator 219. At this time, the control device 130 may control the air supplier 302 and the on-off valve 304 so that a blowing time of air becomes a given period of time set in advance (e.g., 1 to 5 seconds).

Moreover, when operating the robot 120 so that the cutting tool 211A is located in the inward space of the shoulder member 12, the control device 130 may operate the robot 120 so that the axis of the shoulder member 12 is oriented in the vertical direction, or may operate the robot 120 so that the axis inclines from the vertical direction. The inclination angle may be 0.1 to 3°, for example.

Moreover, the control device 130 may operate the robot 120 so that the shoulder member 12 reciprocates along the axis Xr.

Next, the control device 130 acquires an elapsed time, from the clock 134, after the cutting tool 211A contacts the inner circumferential surface of the shoulder member 12 (Step S14). Next, the control device 130 determines whether the time acquired at Step S14 reaches the first period set in advance (Step S15).

When the control device 130 determines that the time acquired at Step S14 does not reach the first period (No at Step S15), it repeats the processings of Steps S14 and S15 until the time acquired at Step S14 reaches the first period. On the other hand, if the control device 130 determines that the time acquired at Step S14 reaches the first period (Yes at Step S15), it performs processing of Step S16.

At Step S16, the control device 130 stops the first rotary driver 57. Note that the control device 130 may also stop the second rotary driver 112A. Moreover, if the second rotary driver 112B is not activated at Step S12, the control device 130 may activate the second rotary driver 112B at this time.

Next, the control device 130 operates the robot 120 so that the wire brush 211B contacts the inner circumferential surface of the shoulder member 12 (Step S17). Therefore, the material of the to-be-joined object 60 adhered to the inner circumferential surface of the shoulder member 12 can be removed (scraped) by the wire brush 211B.

Note that the control device 130 may stop the first rotary driver 57 at Step S22 (described later), without stopping the first rotary driver 57 at Step S16. That is, the control device 130 may operate the robot 120 so that the circumferential surface of the shoulder member 12 contacts the wire brush 211B, while the shoulder member 12 rotates.

Next, the control device 130 acquires, from the clock 134, an elapsed time after the wire brush 211B contacts the inner circumferential surface of the shoulder member 12 (Step S18). Next, the control device 130 determines whether the time acquired at Step S18 reaches a second period set in advance (Step S19).

Here, the second period can be obtained in advance by an experiment etc., and, for example, it may be a time required for fully removing the material of the to-be-joined object 60 adhered to the inner circumferential surface of the shoulder member 12. For example, the second period may be 30 seconds or longer in terms of fully removing the material of the to-be-joined object 60 adhered to the inner circumferential surface of the shoulder member 12, or may be 60 seconds or shorter in terms of shortening the cleaning time. Moreover, the second period may be the same as or may be different from the first period in the length of time.

If the control device 130 determines that the time acquired at Step S18 does not reach the second period (No at Step S19), it repeats the processings of Step S18 and S19 until the time acquired at Step S18 reaches the second period. On the other hand, if the control device 130 determines that the time acquired at Step S18 reaches the second period (Yes at Step S19), it performs processing of Step S20.

At Step S20, the control device 130 operates the robot 120 so that the double-action friction stir joining device 101 is moved to the given position set in advance (the initial position at which the double-action friction stir joining device 101 is installed).

Next, the control device 130 drives the tool driver 53 (pin driver 531) so that the tip-end face 11a of the pin member 11 becomes in agreement with the tip-end face 12a of the shoulder member 12 (Step S21). Next, the control device 130 stops the second rotary driver 112A and the second rotary driver 112B (Step S22), and ends this program.

Also according to the double-action friction stir joining system 100 of Modification 3 configured in this way, similar operation and effects to the double-action friction stir joining system 100 according to Embodiment 1 can be acquired.

Note that, although in the double-action friction stir joining system 100 of Modification 3 the control device 130 activates the first rotary driver 57, and the second rotary drivers 112A and 112B (Step S12), then causes the robot 120 to hold the double-action friction stir joining device 101 and operates the robot 120 so that the cutting tool 211A contacts the inner circumferential surface of the shoulder member 12 (Step S13), the present disclosure is not limited to this configuration.

The control device 130 may operate the robot 120 so that the robot 120 holds the double-action friction stir joining device 101 and the cutting tool 211A contacts the inner circumferential surface of the shoulder member 12, and may then operate the first rotary driver 57 and the second rotary drivers 112A and 112B.

Embodiment 2

In a double-action friction stir joining system according to Embodiment 2, the cleaning mechanism in the double-action friction stir joining system according to Embodiment 1 (including the modifications) further includes a second rotary driver which rotates the dressing member. The control device (A) operates the tool driver so that the pin member is thrusted into the shoulder member, (B1) operates the second rotary driver so that the dressing member rotates, and (C) operates the robot so that the robot holds the double-action friction stir joining device and the dressing member contacts the inner circumferential surface of the shoulder member.

Below, one example of the double-action friction stir joining system according to Embodiment 2 is described with reference to FIGS. 10 and 11.

[Configuration of Double-Action Friction Stir Joining System]

Figure 10:
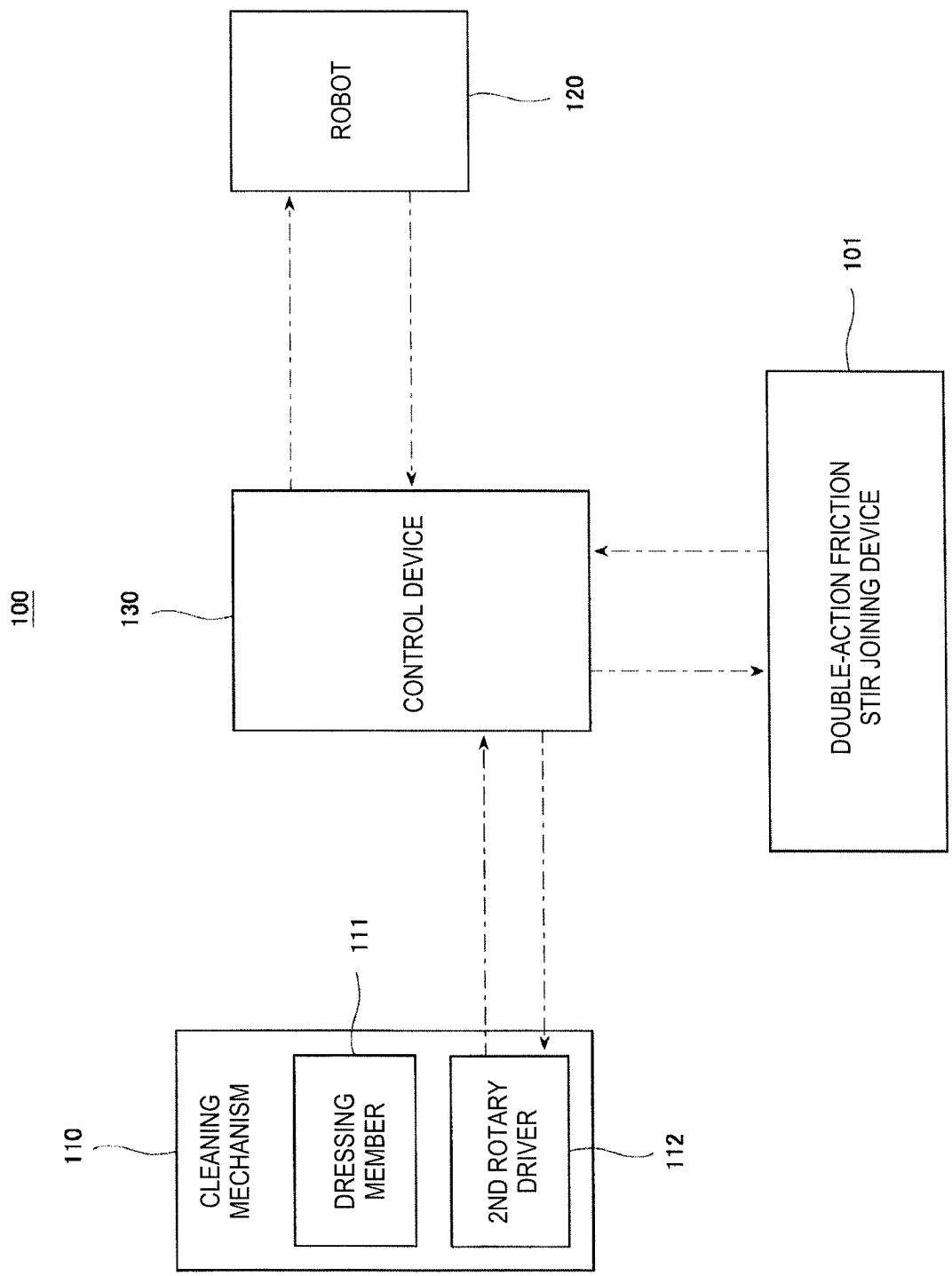
FIG. 10 is a block diagram illustrating an outline configuration of a double-action friction stir joining system according to Embodiment 2.

FIG. 10 is a block diagram illustrating an outline configuration of the double-action friction stir joining system according to Embodiment 2.

As illustrated in FIG. 10, although the double-action friction stir joining system 100 according to Embodiment 2 is the same in the fundamental configuration as the double-action friction stir joining system 100 according to Embodiment 1, it differs in that the cleaning mechanism 110 further has a second rotary driver 112. The second rotary driver 112 is configured to rotate the dressing member 111, and, for example, it may be a motor, such as an electric motor.

Note that a sensor (not illustrated), such as a rotary encoder, may detect a rotational speed of the second rotary driver 112, and output the detected rotational speed to the control device 130.

[Operation and Effects of Double-Action Friction Stir Joining System]

Figure 11:
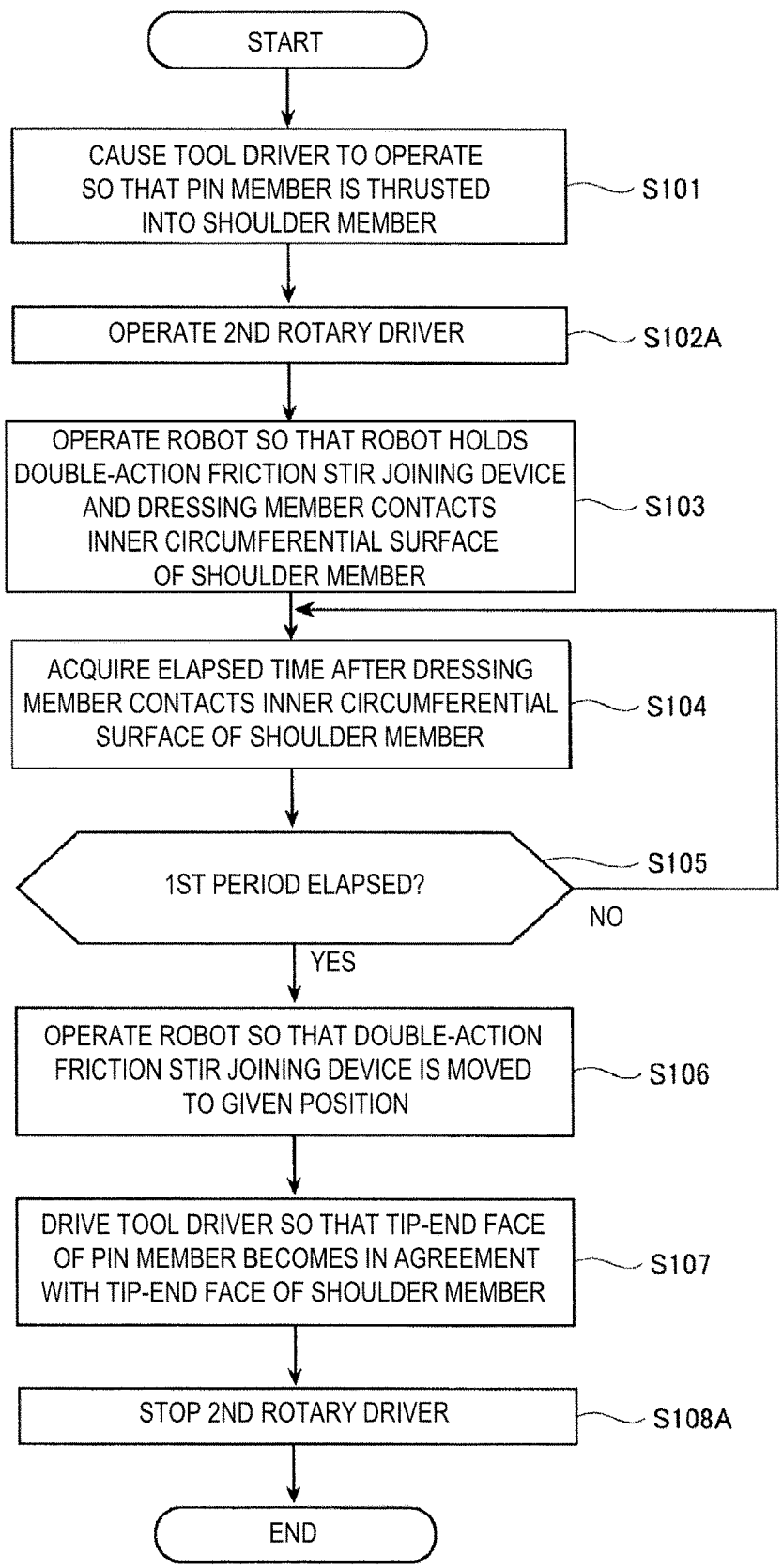
FIG. 11 is a flowchart illustrating one example of operation of the double-action friction stir joining system according to Embodiment 2.

FIG. 11 is a flowchart illustrating one example of operation of the double-action friction stir joining system according to Embodiment 2.

As illustrated in FIG. 11, although the operation of the double-action friction stir joining system 100 according to Embodiment 2 is fundamentally the same as that of the double-action friction stir joining system 100 according to Embodiment 1, it differs in that processings of Steps S102A and S108A are performed, instead of Steps S102 and S108.

In detail, at Step S102A, the control device 130 operates the second rotary driver 112 to rotate the dressing member 111. Next, the control device 130 operates the robot 120 so that the robot 120 holds the double-action friction stir joining device 101 and the dressing member 111 of the cleaning mechanism 110 contacts the inner circumferential surface of the shoulder member 12 (Step S103).

Therefore, the material of the to-be-joined object 60 adhered to the inner circumferential surface of the shoulder member 12 can be removed by the dressing member 111.

Moreover, at Step S108A, the control device 130 stops the second rotary driver 112 and stops the rotation of the dressing member 111, and ends this program.

Also according to the double-action friction stir joining system 100 according to Embodiment 2 configured in this way, similar operation and effects to the double-action friction stir joining system 100 according to Embodiment 1 can be acquired.

Note that, although in the double-action friction stir joining system 100 according to Embodiment 2 the cleaning mechanism 110 has the second rotary driver 112 which rotates the dressing member 111, it is not limited to this configuration. For example, a rotary driver may be provided to a tip-end part of the robot 120 to rotate the dressing member 111.

[Modification 1]

Next, a modification of the double-action friction stir joining system 100 according to Embodiment 2 is described.

In a double-action friction stir joining system of Modification 1 of Embodiment 2, the control device operates the robot in (C) so that the robot holds the cleaning mechanism and the dressing member contacts the inner circumferential surface of the shoulder member.

Below, one example of the double-action friction stir joining system of Modification 1 is described with reference to FIG. 12. Note that, since the configuration of the double-action friction stir joining system of Modification 1 is the same as that of the double-action friction stir joining system according to Embodiment 1, the detailed description is omitted.

Figure 12:
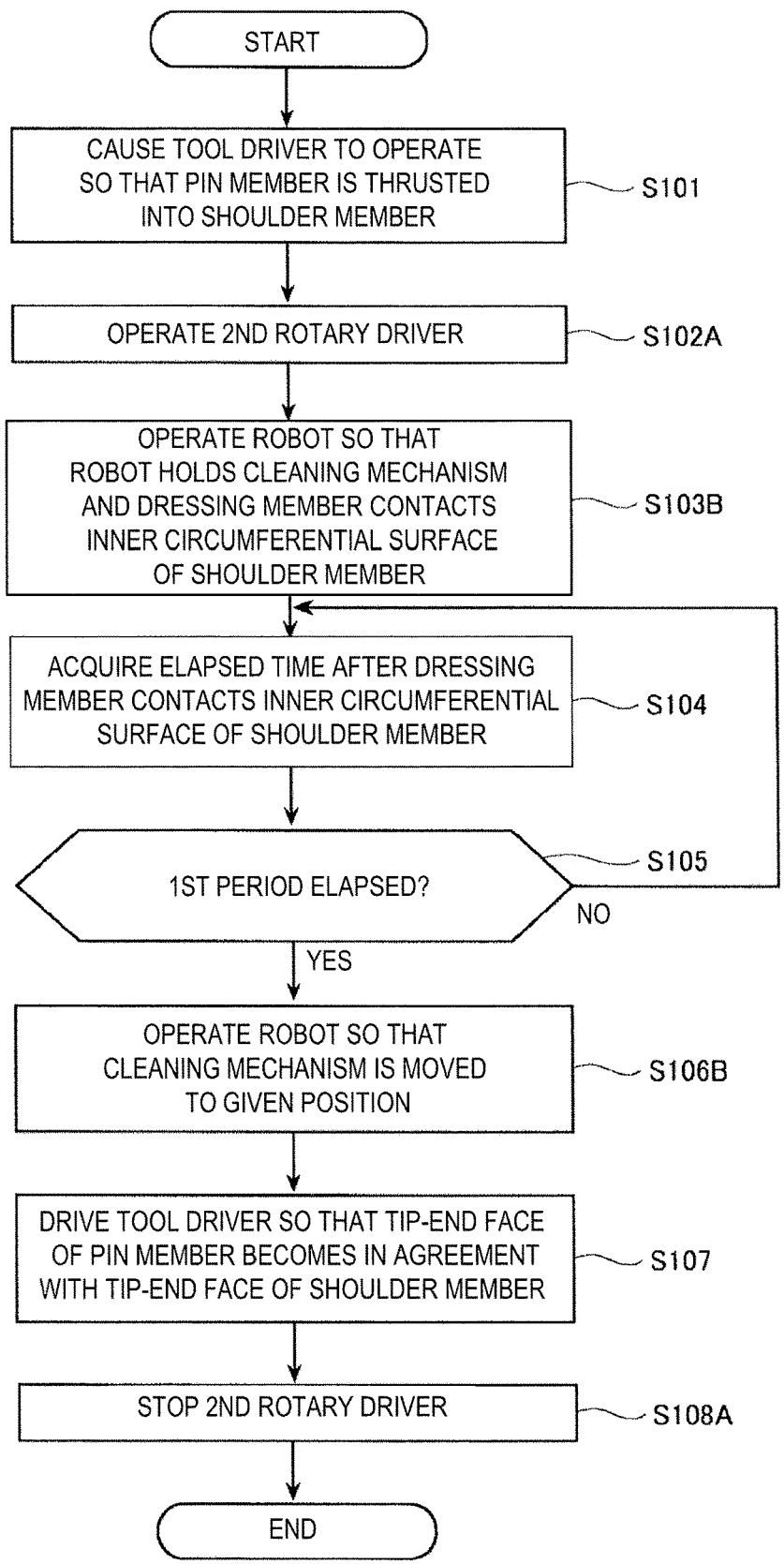
FIG. 12 is a flowchart illustrating one example of operation of a double-action friction stir joining system of Modification 1 of Embodiment 2.

FIG. 12 is a flowchart illustrating one example of operation of the double-action friction stir joining system of Modification 1 of Embodiment 2.

As illustrated in FIG. 12, although the operation of the double-action friction stir joining system 100 of Modification 1 of Embodiment 2 is fundamentally the same as the operation of the double-action friction stir joining system 100 according to Embodiment 2, it differs in that Steps S103B and S106B are performed, instead of Steps S103 and S106.

In detail, the control device 130 operates the robot 120 so that the robot 120 holds the cleaning mechanism 110 (dressing member 111) and the dressing member 111 of the cleaning mechanism 110 contacts the inner circumferential surface of the shoulder member 12 (Step S103B). At this time, the double-action friction stir joining device 101 may be fixedly installed, or may be grasped by a robot other than the robot 120.

Note that, similarly to the double-action friction stir joining system 100 of Modification 3 in Embodiment 1, the control device 130 may cause the robot 120 to hold a plurality of types of dressing members 111 to clean the inner circumferential surface of the shoulder member 12.

Next, the control device 130 acquires, from the clock 134, the elapsed time after the dressing member 111 contacts the inner circumferential surface of the shoulder member 12 (Step S104). Next, the control device 130 determines whether the time acquired at Step S104 reaches the first period set in advance (Step S105).

Next, if the control device 130 determines that the time acquired at Step S104 reaches the first period (Yes at Step S105), it operates the robot 120 so that the cleaning mechanism 110 is moved to the given position set in advance (the initial position where the cleaning mechanism 110 is installed) (Step S106B).

Also according to the double-action friction stir joining system 100 of Modification 1 of Embodiment 2 configured in this way, similar operation and effects to the double-action friction stir joining system 100 according to Embodiment 2 can be acquired.

[Modification 2]

In a double-action friction stir joining system of Modification 2 of Embodiment 2, the robot is configured to be pivotable or rotatable on the axis while holding the double-action friction stir joining device. The control device operates the robot in (C) so that the robot holds the double-action friction stir joining device, and the dressing member contacts the inner circumferential surface of the shoulder member while pivoting the double-action friction stir joining device.

Below, one example of the double-action friction stir joining system of Modification 2 of Embodiment 2 is described with reference to FIG. 13. Note that, since the double-action friction stir joining system 100 of Modification 2 of Embodiment 2 is the same in the fundamental configuration as the double-action friction stir joining system 100 of Modification 2 of Embodiment 1, the detailed description is omitted.

[Operation and Effects of Double-Action Friction Stir Joining System]

Figure 13:
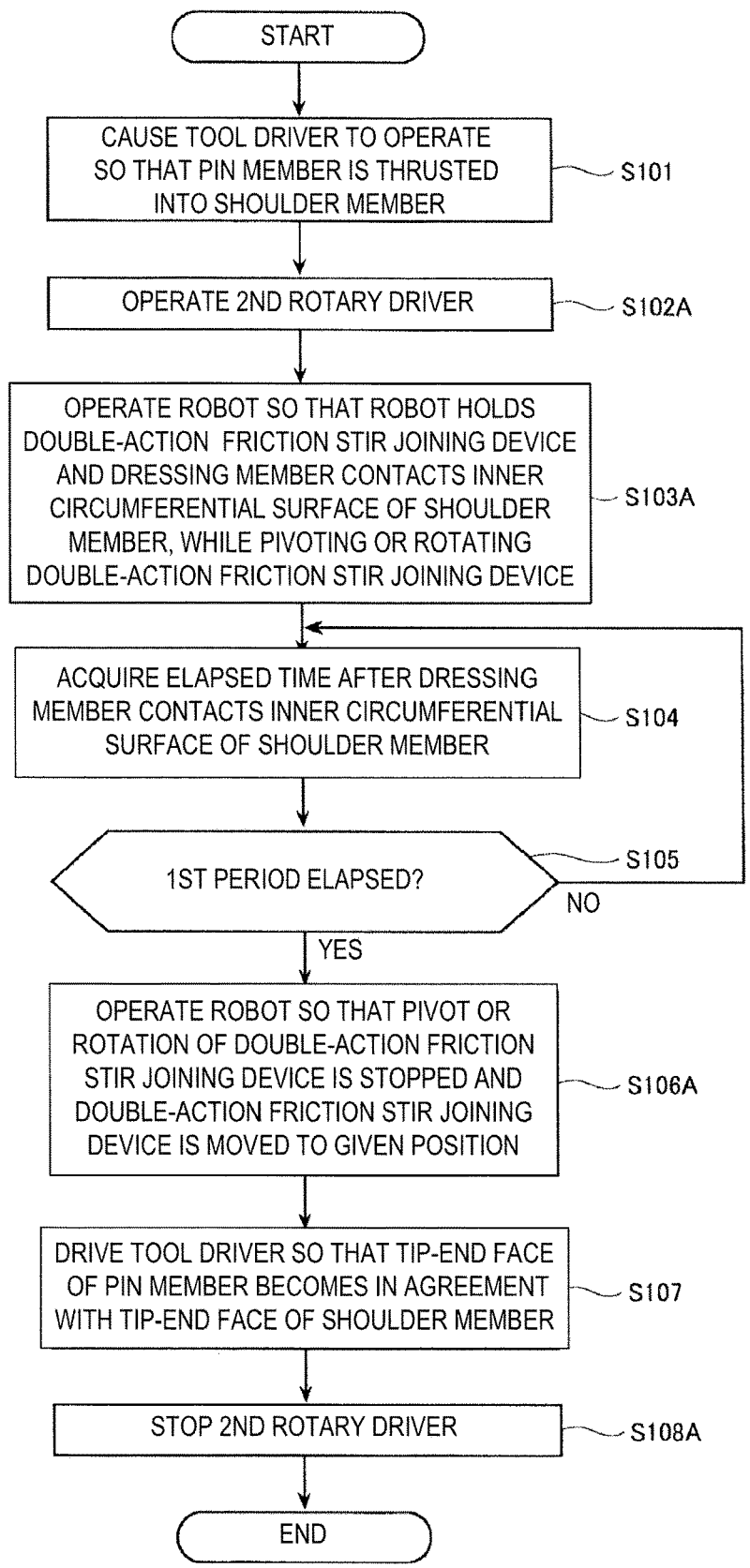
FIG. 13 is a flowchart illustrating one example of operation of a double-action friction stir joining system of Modification 2 of Embodiment 2.

FIG. 13 is a flowchart illustrating one example of operation of the double-action friction stir joining system of Modification 2 of Embodiment 2.

As illustrated in FIG. 13, although the operation of the double-action friction stir joining system 100 of Modification 2 of Embodiment 2 is fundamentally the same as that of the double-action friction stir joining system 100 according to Embodiment 2, it differs in that operations (processings) of Steps S103A and S106A are performed, instead of Steps S103 and S106.

In detail, the control device 130 operates the second rotary driver 112 to rotate the dressing member 111 (Step S102A). Next, the control device 130 operates the robot 120 so that the robot 120 holds the double-action friction stir joining device 101 and the dressing member 111 of the cleaning mechanism 110 contacts the inner circumferential surface of the shoulder member 12 while pivoting or rotating the double-action friction stir joining device 101 (Step S103A).

Therefore, the material of the to-be-joined object 60 adhered to the inner circumferential surface of the shoulder member 12 can be removed (scraped) by the dressing member 111.

Next, the control device 130 acquires, from the clock 134, the elapsed time after the dressing member 111 contacts the inner circumferential surface of the shoulder member 12 (Step S104). Next, the control device 130 determines whether the time acquired at Step S104 reaches the first period set in advance (Step S105).

If the control device 130 determines that the time acquired at Step S104 reaches the first period (Yes at Step S105), it performs processing of Step S106A.

At Step S106A, the control device 130 operates the robot 120 so that the pivot or rotation of the double-action friction stir joining device 101 is stopped, and the double-action friction stir joining device 101 is moved to the given position set in advance.

Next, the control device 130 drives the tool driver 53 (pin driver 531) so that the tip-end face 11a of the pin member 11 becomes in agreement with the tip-end face 12a of the shoulder member 12 (Step S107). Next, the control device 130 stops the first rotary driver 57 (Step S108), and ends this program.

Also according to the double-action friction stir joining system 100 of Modification 2 of Embodiment 2 configured in this way, similar operation and effects to the double-action friction stir joining system 100 according to Embodiment 2 can be acquired.

Embodiment 3

In a double-action friction stir joining system according to Embodiment 3, the double-action friction stir joining system according to Embodiment 1 or 2 (including the modifications) is configured in (A) so that the control device (A1) operates the tool driver so that the tip-end face of the pin member is moved to a first position set in advance, and, after (A1), (A2) operates the tool driver so that the tip-end face of the pin member is moved to a second position set in advance at a speed faster than in (A1).

Below, one example of the double-action friction stir joining system according to Embodiment 3 is described with reference to FIGS. 14 and 15.

[Configuration of Double-Action Friction Stir Joining System]

Figure 14:
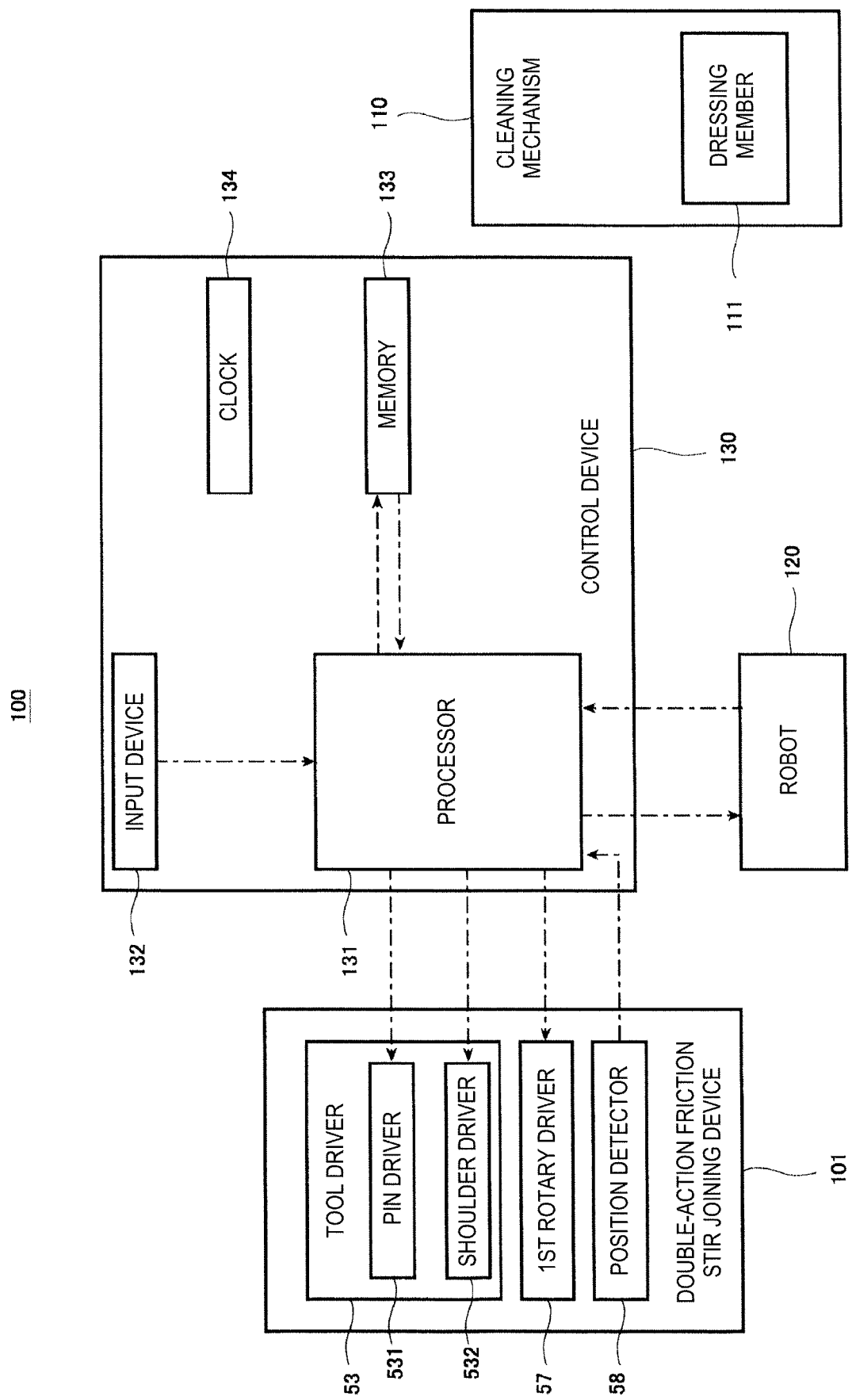
FIG. 14 is a block diagram illustrating an outline configuration of a double-action friction stir joining system according to Embodiment 3.

FIG. 14 is a block diagram illustrating an outline configuration of the double-action friction stir joining system according to Embodiment 3.

As illustrated in FIG. 14, although the double-action friction stir joining system 100 according to Embodiment 3 is the same in the fundamental configuration as the double-action friction stir joining system 100 according to Embodiment 1, it differs in that the double-action friction stir joining device 101 is provided with a position detector 58 which detects a position of the tip-end face 11a of the pin member 11 in the axis Xr direction and outputs the detected positional information to the control device 130.

As the position detector 58, various known position sensors can be used, and, for example, an LVDT, an encoder, etc. can be used.

[Operation and Effects of Double-Action Friction Stir Joining System]

Figure 15:
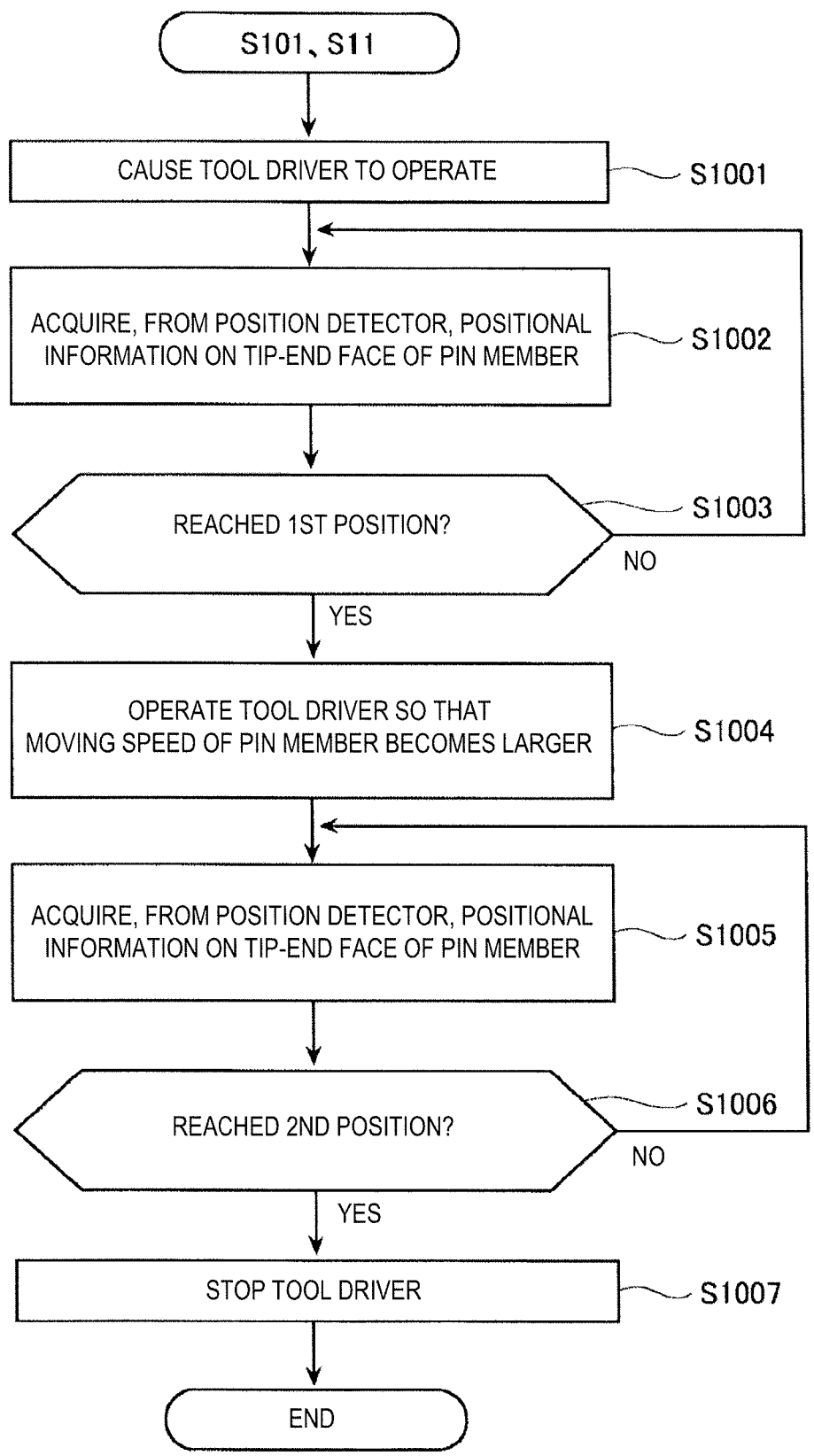
FIG. 15 is a flowchart illustrating one example of operation of the double-action friction stir joining system according to Embodiment 3.

Although operation of the double-action friction stir joining system 100 according to Embodiment 3 is fundamentally the same as that of the double-action friction stir joining system 100 according to Embodiment 1 or 2, it differs in that the operation of Step S101 or S11 is performed according to a flow illustrated in FIG. 15.

FIG. 15 is a flowchart illustrating one example of the operation of the double-action friction stir joining system according to Embodiment 3.

As illustrated in FIG. 15, at Step S101 or S11, the control device 130 first causes the tool driver 53 (pin driver 531) to drive (operate) so that the pin member 11 is thrusted into the shoulder member 12 (Step S1001).

At this time, the control device 130 may operate the tool driver 53 (pin driver 531) so that the pin member 11 is pulled up at a fixed load. Moreover, the control device 130 may operate the tool driver 53 so that a value of current supplied to a servomotor which constitutes the tool driver 53 does not become larger than a given value set in advance (e.g., 5A).

Next, the control device 130 acquires, from the position detector 58, positional information on the tip-end face 11a of the pin member 11 in the axis Xr direction which is detected by the position detector 58 (Step S1002). Next, the control device 130 determines whether the position of the tip-end face 11a of the pin member 11 in the axis Xr direction acquired at Step S1002 reaches the first position (Step S1003).

Here, the first position can be set in advance by an experiment etc., and it is a part of the outer circumferential surface of the pin member 11 and/or the inner circumferential surface of the shoulder member 12 with a larger amount of agglutination (adhesion) of the material of the to-be-joined object 60 than other parts. For example, the first position may be a position where the tip-end face 11a of the pin member 11 is located innermost (a position moved uppermost) with respect to the shoulder member 12, when joining the to-be-joined object 60.

If the control device 130 determines that the position of the tip-end face 11a of the pin member 11 in the axis Xr direction acquired at Step S1002 does not reach the first position (No at Step S1003), it repeats the processings of Steps S1002 and S1003 until it determines that the position of the tip-end face 11a of the pin member 11 in the axis Xr direction reaches the first position.

On the other hand, if the control device 130 determines that the position of the tip-end face 11a of the pin member 11 in the axis Xr direction acquired at Step S1002 reaches the first position (Yes at Step S1003), it performs processing of Step S1004.

At Step S1004, the control device 130 operates the tool driver 53 (pin driver 531) so that the moving speed of the pin member 11 becomes larger. In detail, the control device 130 operates the tool driver 53 (pin driver 531) so that the moving speed after the pin member 11 reaches the first position becomes faster than the moving speed before the pin member 11 reaches the first position. In detail, the control device 130 increases the rotating speed of the servomotor which constitutes the tool driver 53.

Next, the control device 130 acquires, from the position detector 58, the positional information on the tip-end face 11a of the pin member 11 in the axis Xr direction which is detected by the position detector 58 (Step S1005). Next, the control device 130 determines whether the position of the tip-end face 11a of the pin member 11 in the axis Xr direction acquired at Step S1005 reaches the second position (Step S1006).

Here, the second position can be set in advance by an experiment etc., and, for example, it may be a position at which the tip-end face 11a of the pin member 11 can be located innermost with respect to the shoulder member 12 (position movable uppermost as the device).

If the control device 130 determines that the position of the tip-end face 11a of the pin member 11 in the axis Xr direction acquired at Step S1005 does not reach the second position (No at Step S1006), it repeats the processings of Steps S1005 and S1006 until it determines that the position of the tip-end face 11a of the pin member 11 in the axis Xr direction reaches the second position.

On the other hand, if the control device 130 determines that the position of the tip-end face 11a of the pin member 11 in the axis Xr direction acquired at Step S1005 reaches the second position (Yes at Step S1006), it stops the tool driver 53 (pin driver 531) (Step S1007), and performs the processing of Step S102 or S12 etc.

Also according to the double-action friction stir joining system 100 according to Embodiment 3 configured in this way, similar operation and effects to the double-action friction stir joining system 100 according to Embodiment 1 can be acquired.

Moreover, in the double-action friction stir joining system 100 according to Embodiment 3, the control device 130 operates the tool driver 53 (pin driver 531) so that the moving speed after the pin member 11 reaches the first position becomes faster than the moving speed before the pin member 11 reaches the first position.

In other words, the control device 130 operates the tool driver 53 (pin driver 531) so that the moving speed of the pin member 11 becomes slower until the pin member 11 reaches the first position. Thus, it can be suppressed that a large load is applied to the pin member 11 to damage the pin member 11.

Moreover, when the pin member 11 reaches the first position, the control device 130 can shorten a time required for the processing of Step S101 or S11 by increasing the moving speed of the pin member 11, and, as the result, a time required for the cleaning of the shoulder member 12 can be shortened.

Embodiment 4

In a double-action friction stir joining system according to Embodiment 4, the cleaning mechanism in any of the double-action friction stir joining systems of Embodiments 1 to 3 (including their modifications) further includes an assisting member having an assisting part configured to be insertable into the interior space of the shoulder member, and an operating part configured to reciprocate the assisting part along the axis. In (A), the control device operates the robot so that the tip-end face of the pin member contacts a tip end of the assisting part, operates the operating part so as to be synchronized with the tool driver, and thrusts the pin member into the shoulder member, while the movement of the pin member being assisted by the assisting part.

Below, one example of the double-action friction stir joining system according to Embodiment 4 is described with reference to FIGS. 16 to 18.

[Configuration of Double-Action Friction Stir Joining System]

Figure 16:
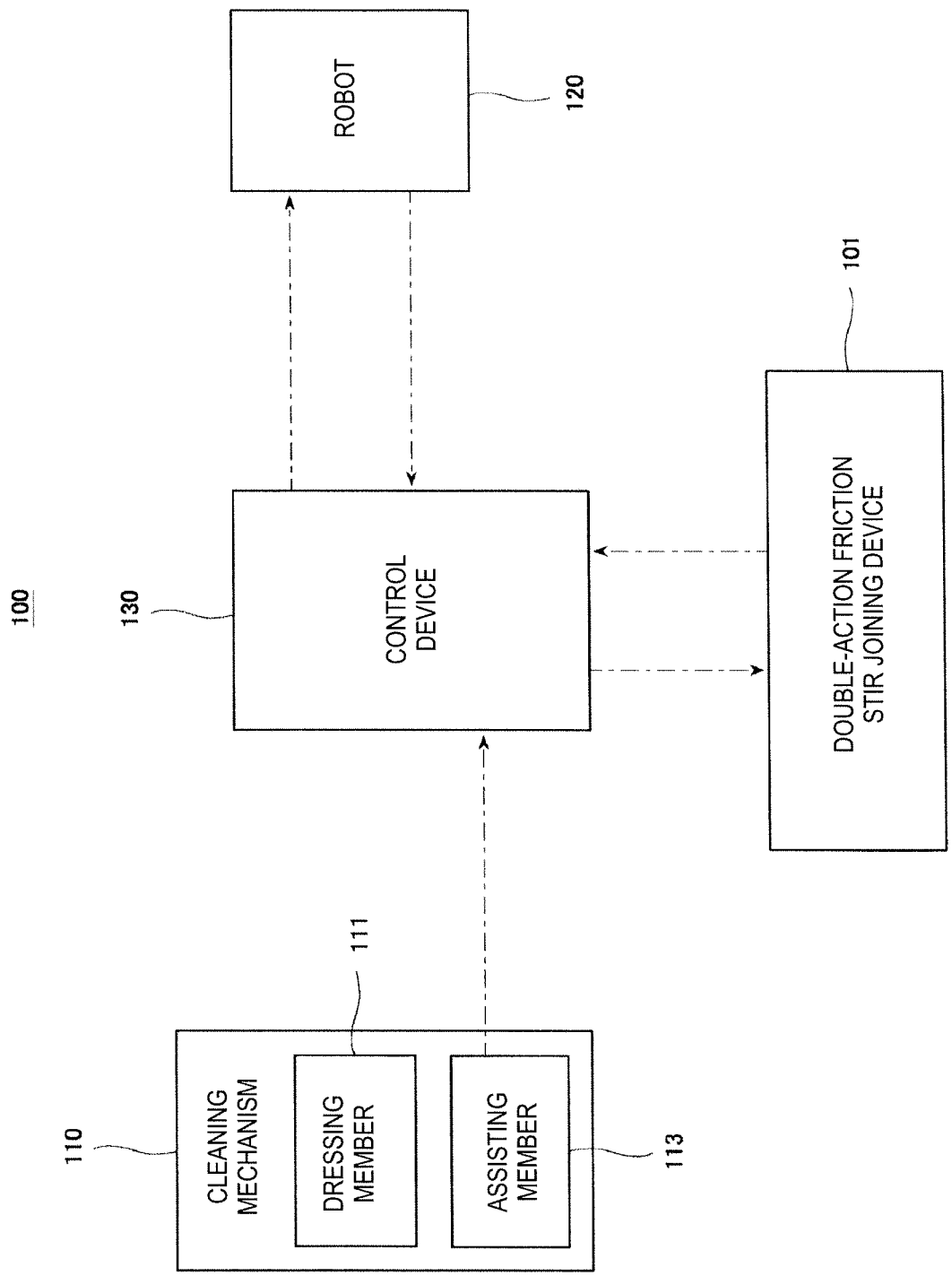
FIG. 16 is a block diagram illustrating an outline configuration of a double-action friction stir joining system according to Embodiment 4.

FIG. 16 is a block diagram illustrating an outline configuration of the double-action friction stir joining system according to Embodiment 4.

As illustrated in FIG. 16, although the double-action friction stir joining system 100 according to Embodiment 4 is the same in the fundamental configuration as the double-action friction stir joining system 100 according to Embodiment 1, it differs in that the cleaning mechanism 110 further has an assisting member 113. Here, a configuration of the assisting member 113 is described with reference to FIG. 17.

Figure 17:
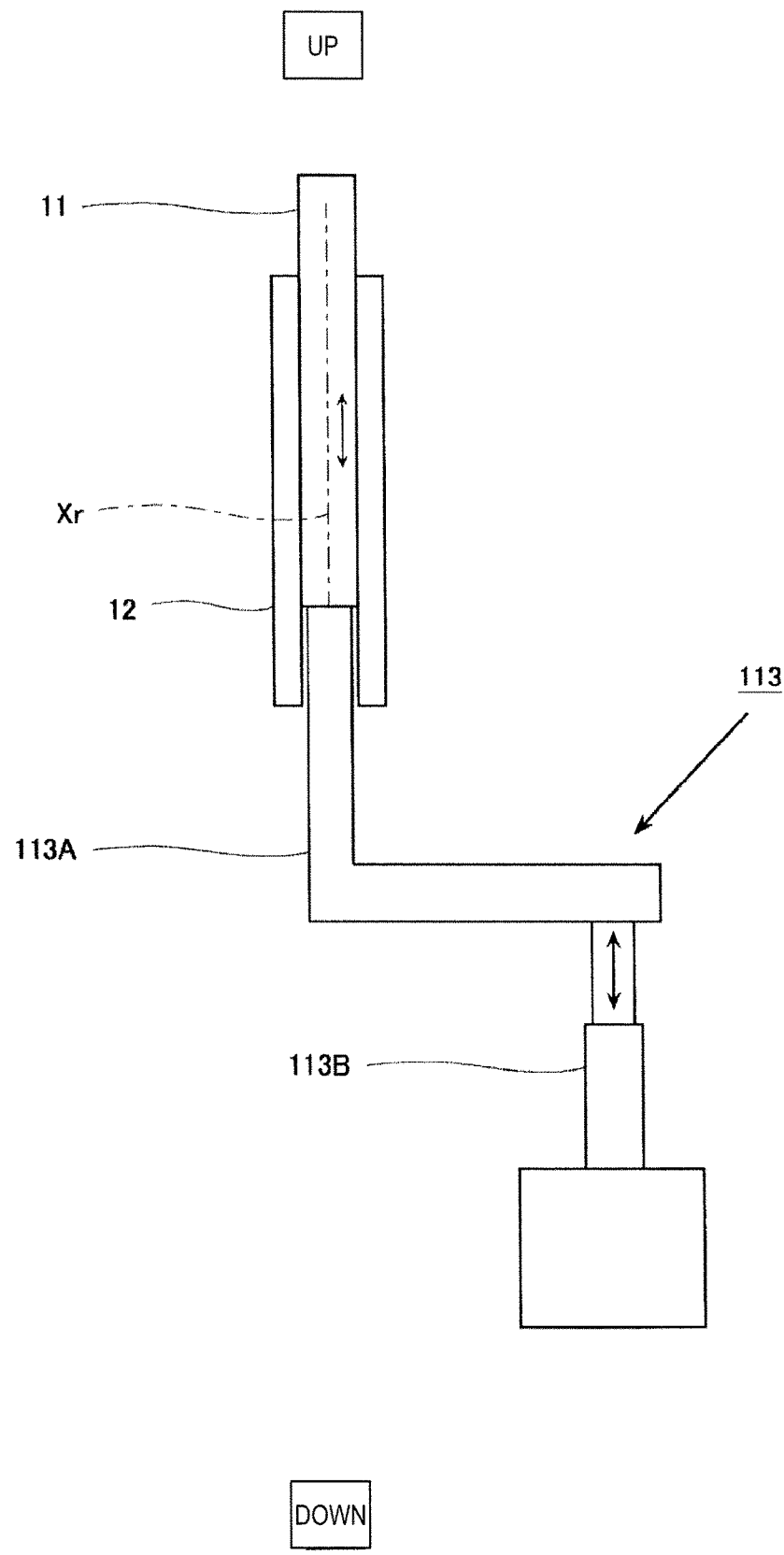
FIG. 17 is a schematic view illustrating an outline configuration of an assisting member in the double-action friction stir joining system illustrated in FIG. 16.

FIG. 17 is a schematic view illustrating the outline configuration of the assisting member in the double-action friction stir joining system illustrated in FIG. 16. Note that, in FIG. 17, only a part of the double-action friction stir joining device 101 (the pin member 11 and the shoulder member 12) is illustrated. Moreover, in FIG. 17, an up-and-down direction of the double-action friction stir joining device 101 is expressed as an up-and-down direction in this drawing.

As illustrated in FIG. 17, the assisting member 113 has an assisting part 113A configured to be insertable into the interior space of the shoulder member 12, and an operating part 113B configured to reciprocate the assisting part 113A along the axis Xr.

Here, the assisting part 113A is formed in an L-shape, and a rod part extending in the up-and-down direction is configured to be insertable into the interior space of the shoulder member 12. Moreover, the operating part 113B is comprised of a linear-movement actuator, for example. As the linear-movement actuator, an air cylinder etc. may be used, for example.

[Operation and Effects of Double-Action Friction Stir Joining System]

Figure 18:
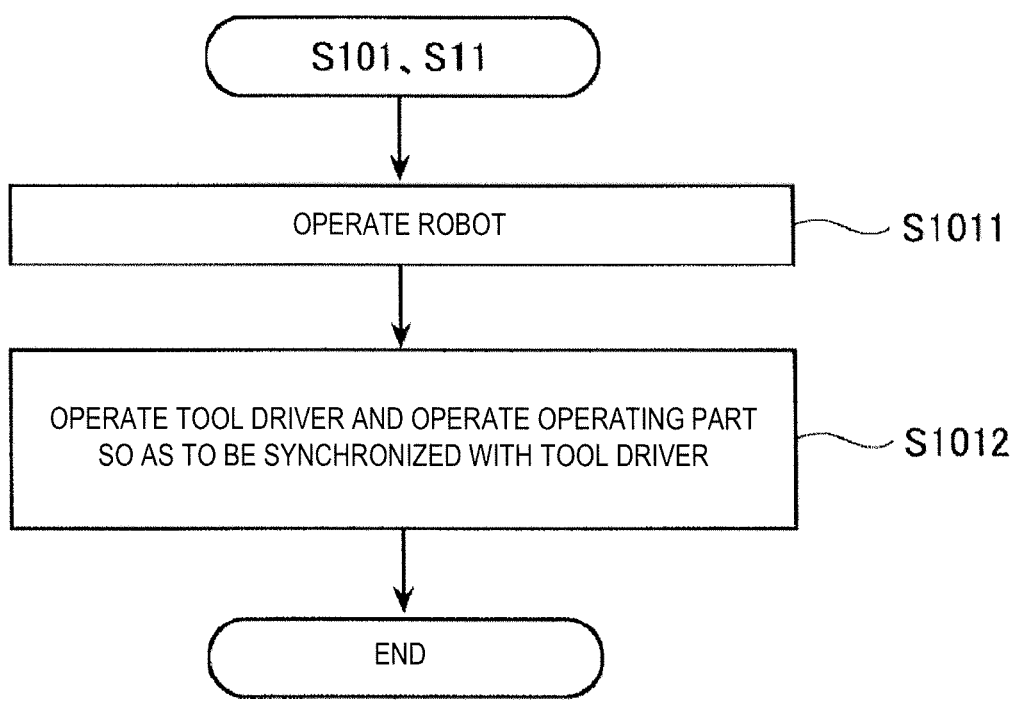
FIG. 18 is a flowchart illustrating one example of operation of the double-action friction stir joining system according to Embodiment 4.

Although operation of the double-action friction stir joining system 100 according to Embodiment 4 is fundamentally the same as that of the double-action friction stir joining system 100 according to Embodiment 1 or 2, it differs in that the operation of Step S101 or S11 is performed according to a flow illustrated in FIG. 18.

FIG. 18 is a flowchart illustrating one example of the operation of the double-action friction stir joining system according to Embodiment 4.

As illustrated in FIG. 18, at Step S101 or S11, the control device 130 first operates the robot 120 so that the robot 120 holds the double-action friction stir joining device 101, and the tip-end face (lower-end surface) 11a of the pin member 11 of the double-action friction stir joining device 101 contacts the tip-end face (upper-end surface) of the assisting part 113A of the assisting member 113 (Step S1011).

Note that the worker and/or another robot may dispose the assisting member 113 so that the tip-end face of the assisting part 113A contacts the tip-end face 11a of the pin member 11.

Next, the control device 130 operates the tool driver 53 (pin driver 531) so that the pin member 11 is thrusted into the shoulder member 12, and operates the operating part 113B so as to be synchronized with the tool driver 53 (Step S1012), and performs the processing of Step S102 or S12 etc.

Thus, the movement of the pin member 11 can be assisted by the assisting part 113A.

Also according to the double-action friction stir joining system 100 according to Embodiment 4 configured in this way, similar operation and effects to the double-action friction stir joining system 100 according to Embodiment 1 can be acquired.

Moreover, in the double-action friction stir joining system 100 according to Embodiment 4, the control device 130 operates the tool driver 53 (pin driver 531) so that the pin member 11 is thrusted into the shoulder member 12, and operates the operating part 113B so as to be synchronized with the tool driver 53.

Therefore, by the assisting part 113A, the movement of the pin member 11 can be assisted, and the damage to the pin member 11 can be suppressed. Moreover, by assisting the movement of the pin member 11, the moving speed of the pin member 11 can be increased, and, as the result, the time required for cleaning the shoulder member 12 can be shortened.

Note that, similarly to the double-action friction stir joining system 100 according to Embodiment 3, the control device 130 may operate the tool driver 53 (pin driver 531) so that the moving speed after the pin member 11 reaches the first position becomes faster than the moving speed before the pin member 11 reaches the first position. At this time, the control device 130 may operate the operating part 113B so as to be synchronized with the moving speed of the pin member 11.

Embodiment 5

In a double-action friction stir joining system according to Embodiment 5, the cleaning mechanism in any of the double-action friction stir joining systems of Embodiments 1 to 3 (including their modifications) further includes an assisting member having an assisting part configured to be insertable into the interior space of the shoulder member, an operating part configured to reciprocate the assisting part along the axis, and a controller which controls the operating part. The control device operates the robot in (A) so that the tip-end face of the pin member contacts a tip end of the assisting part, and operates the tool driver so that the pin member is thrusted into the shoulder member. The controller operates the operating part in (A) so as to be synchronized with the tool driver to assist the movement of the pin member.

Below, one example of the double-action friction stir joining system according to Embodiment 5 is described with reference to FIGS. 19 and 20.

[Configuration of Double-Action Friction Stir Joining System]

Figure 19:
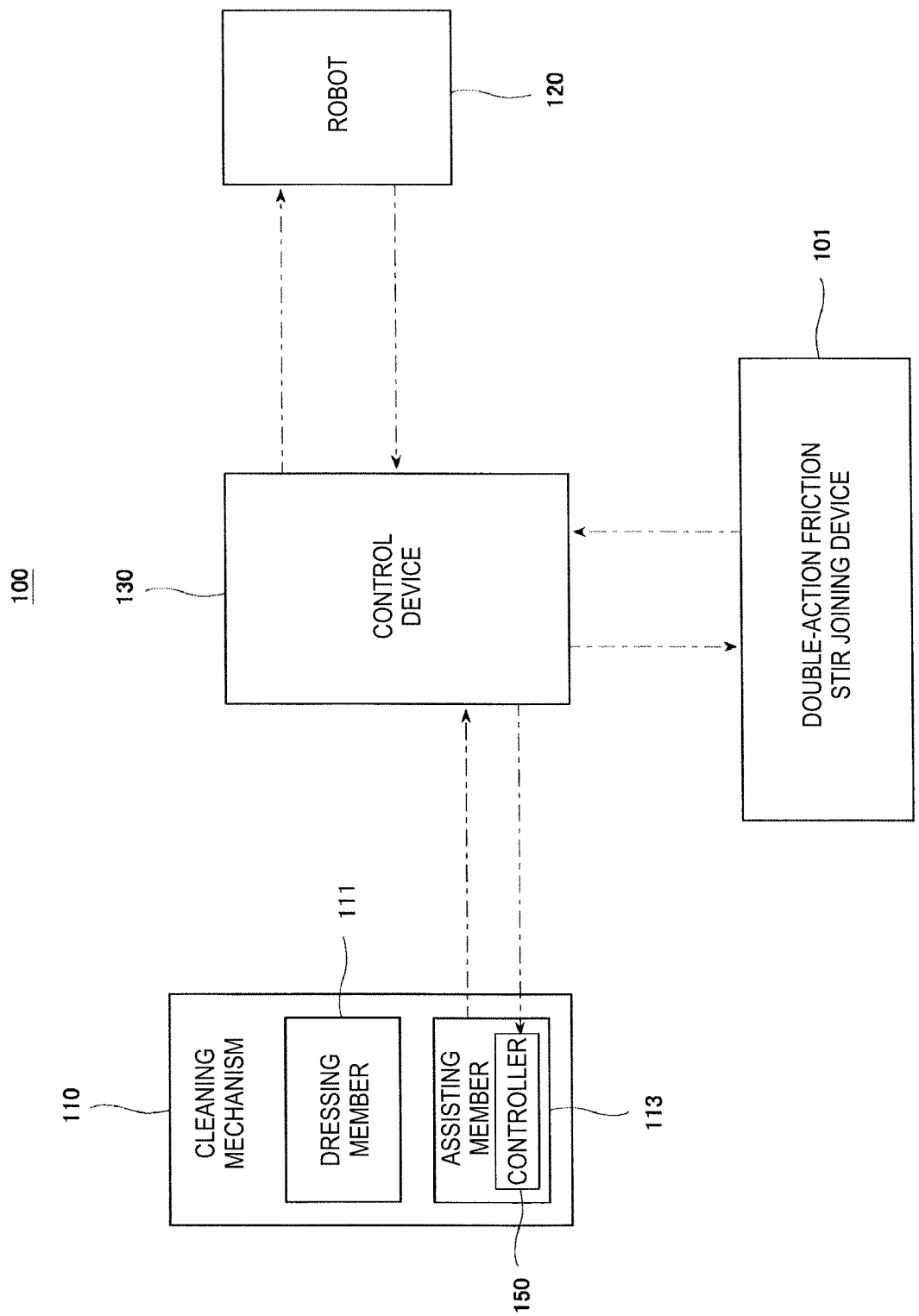
FIG. 19 is a block diagram illustrating an outline configuration of a double-action friction stir joining system according to Embodiment 5.

FIG. 19 is a block diagram illustrating an outline configuration of the double-action friction stir joining system according to Embodiment 5.

As illustrated in FIG. 19, although the double-action friction stir joining system 100 according to Embodiment 5 is the same in the fundamental configuration as the double-action friction stir joining system 100 according to Embodiment 1, it differs in that the cleaning mechanism 110 further includes the assisting member 113 having a controller 150. Note that, since the configuration of the assisting member 113 is configured similarly to the assisting member 113 of the double-action friction stir joining system 100 according to Embodiment 4 except that it has the controller 150, the detailed description is omitted.

The controller 150 includes a processor such as a microprocessor and a CPU, and a memory such as a ROM and a RAM. The memory stores information on a basic program, various fixed data, etc. The processor controls various operations of the assisting member 113 by reading and executing software, such as the basic program stored in the memory.

Moreover, the controller 150 is configured to be communicatable with the control device 110 through a suitable network (e.g., wireless LAN etc.).

Note that the controller 150 may be comprised of a sole controller 150 which carries out a centralized control, or may be comprised of a plurality of controllers 150 which collaboratively carry out a distributed control. Moreover, the controller 150 may be comprised of a microcomputer, or may be comprised of an MPU, a PLC (Programmable Logic Controller), a logic circuit, etc.

[Operation and Effects of Double-Action Friction Stir Joining System]

Figure 20:
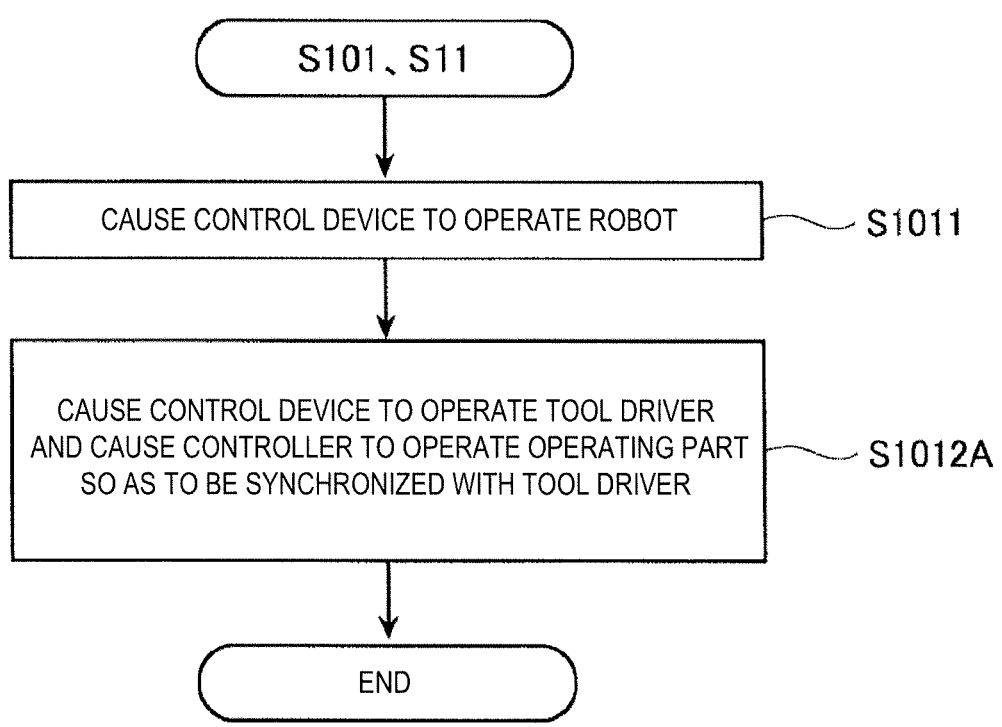
FIG. 20 is a flowchart illustrating one example of operation of the double-action friction stir joining system according to Embodiment 5.

Although operation of the double-action friction stir joining system 100 according to Embodiment 5 is fundamentally the same as that of the double-action friction stir joining system 100 according to Embodiment 1 or 2, it differs in that the operation of Step S101 or S11 is performed according to a flow illustrated in FIG. 20.

FIG. 20 is a flowchart illustrating one example of the operation of the double-action friction stir joining system according to Embodiment 5.

As illustrated in FIG. 20, at Step S101 or S11, the control device 130 first operates the robot 120 so that the robot 120 holds the double-action friction stir joining device 101, and the tip-end face (lower-end surface) 11a of the pin member 11 of the double-action friction stir joining device 101 contacts the tip-end face (upper-end surface) of the assisting part 113A of the assisting member 113 (Step S1011).

Note that the worker and/or another robot may dispose the assisting member 113 so that the tip-end face of the assisting part 113A contacts the tip-end face 11a of the pin member 11.

Next, the control device 130 operates the tool driver 53 (pin driver 531) so that the pin member 11 is thrusted into the shoulder member 12. The controller 150 operates the operating part 113B so as to be synchronized with the tool driver 53 (Step S1012A), and performs processing of Step S102 or S12 etc.

Thus, the movement of the pin member 11 can be assisted by the assisting part 113A.

Also according to the double-action friction stir joining system 100 according to Embodiment 5 configured in this way, similar operation and effects to the double-action friction stir joining system 100 according to Embodiment 1 can be acquired.

Moreover, in the double-action friction stir joining system 100 according to Embodiment 5, the control device 130 operates the tool driver 53 (pin driver 531) so that the pin member 11 is thrusted into the shoulder member 12, and the controller 150 operates the operating part 113B so as to be synchronized with the tool driver 53.

Therefore, by the assisting part 113A, the movement of the pin member 11 can be assisted, and the damage to the pin member 11 can be suppressed. Moreover, by assisting the movement of the pin member 11, the moving speed of the pin member 11 can be increased, and, as the result, the time required for cleaning the shoulder member 12 can be shortened.

Embodiment 6

In the control device of the double-action friction stir joining system according to Embodiment 6, the double-action friction stir joining system according to Embodiments 1 to 5 (including the modifications) is further configured to (D) operate the tool driver so that the pin member protrudes with respect to the tip-end part of the shoulder member, and (E) operate the robot so that the robot holds the double-action friction stir joining device and the outer circumferential surface of the pin member and/or the outer circumferential surface of the shoulder member contacts the dressing member.

Below, one example of the double-action friction stir joining system according to Embodiment 6 is described with reference to FIG. 21. Note that, since a configuration of the double-action friction stir joining system according to Embodiment 6 is the same as that of the double-action friction stir joining system according to Embodiment 1, the detailed description is omitted.

[Operation and Effects of Double-Action Friction Stir Joining System]

Figure 21:
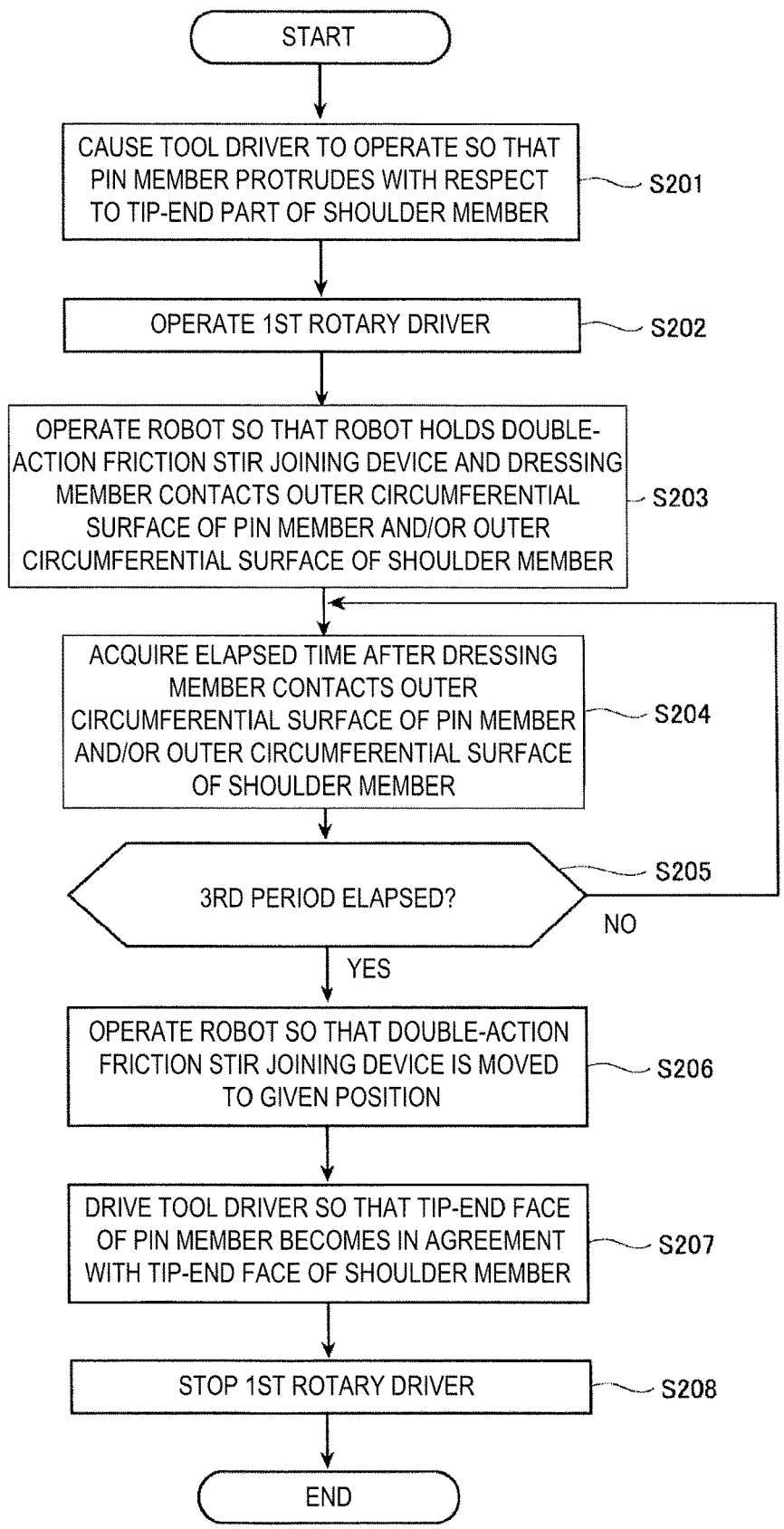
FIG. 21 is a flowchart illustrating one example of operation of a double-action friction stir joining system according to Embodiment 6.

FIG. 21 is a flowchart illustrating one example of operation of the double-action friction stir joining system according to Embodiment 6.

First, when the worker (operator) operates the input device 132 and input instruction information into the processor 131 so that a cleaning (maintenance) of the pin member 11 and/or the shoulder member 12 is performed, or when the double-action friction stir joining device 101 carries out the given number of friction stir joinings set in advance, the processor 131 of the control device 130 performs the following operation (processing) by reading the program stored in the memory 133.

Note that the worker etc. may remove the clamp member 54 from the double-action friction stir joining device 101 in advance.

The control device 130 causes the tool driver 53 (pin driver 531) to drive (operate) so that the pin member 11 protrudes with respect to the tip-end part of the shoulder member 12 (Step S201). Next, the control device 130 operates the first rotary driver 57 (Step S202) to rotate the pin member 11 and the shoulder member 12.

Next, the control device 130 operates the robot 120 so that the robot 120 holds the double-action friction stir joining device 101 and the dressing member 111 of the cleaning mechanism 110 contacts the outer circumferential surface of the pin member 11 and/or the outer circumferential surface of the shoulder member 12 (Step S203).

At this time, the control device 130 may operate the robot 120 so that the dressing member 111 reciprocates along the axis Xr. Moreover, the control device 130 may operate the robot 120 so that the dressing member 111 may turn or circle along the outer circumferential surface of the pin member 11 and/or the outer circumferential surface of the shoulder member 12.

Moreover, the control device 130 may operate the robot 120 so that the dressing member 111 contacts one of the outer circumferential surface of the pin member 11 and the outer circumferential surface of the shoulder member 12, and then contacts the other.

Therefore, the material of the to-be-joined object 60 adhered to the outer circumferential surface of the pin member 11 and/or the outer circumferential surface of the shoulder member 12 can be removed by the dressing member 111.

Next, the control device 130 acquires, from the clock 134, an elapsed time after the dressing member 111 contacts the outer circumferential surface of the pin member 11 and/or the outer circumferential surface of the shoulder member 12 (Step S204). Next, the control device 130 determines whether the time acquired at Step S204 reaches a third period set in advance (Step S205).

Here, the third period can be obtained in advance by an experiment etc., and, for example, it may be a time required for fully removing the material of the to-be-joined object 60 adhered to the outer circumferential surface of the pin member 11 and/or the outer circumferential surface of the shoulder member 12.

If the control device 130 determines that the time acquired at Step S204 does not reach the third period (No at Step S205), it repeats the processings of Steps S204 and S205 until the time acquired at Step S204 reaches the third period. On the other hand, if the control device 130 determines that the time acquired at Step S204 reaches the third period (Yes at Step S205), it performs processing of Step S206.

At Step S206, the control device 130 operates the robot 120 so that the double-action friction stir joining device 101 is moved to the given position set in advance (the initial position at which the double-action friction stir joining device 101 is installed).

Next, the control device 130 drives the tool driver 53 (pin driver 531) so that the tip-end face 11a of the pin member 11 becomes in agreement with the tip-end face 12a of the shoulder member 12 (Step S207). Next, the control device 130 stops the first rotary driver 57 (Step S208), and ends this program.

In the double-action friction stir joining system 100 according to

Embodiment 6 configured in this way, the control device 130 operates the robot 120 so that the dressing member 111 contacts the outer circumferential surface of the pin member 11 and/or the outer circumferential surface of the shoulder member 12, while rotating the pin member 11 and the shoulder member 12.

Therefore, the material of the to-be-joined object 60 adhered to the outer circumferential surface of the pin member 11 and/or the outer circumferential surface of the shoulder member 12 can be removed by the dressing member 111.

Note that, although in the double-action friction stir joining system 100 according to Embodiment 6 the cleaning of the outer circumferential surface of the pin member 11 and/or the outer circumferential surface of the shoulder member 12 is performed by the control of the control device 130, it is not limited to this configuration. The control device 130 may perform the cleaning of the outer circumferential surface of the pin member 11 and/or the outer circumferential surface of the shoulder member 12, before performing the cleaning of the inner circumferential surface of the shoulder member 12, or after performing the cleaning of the inner circumferential surface of the shoulder member 12.

In detail, the control device 130 may perform the processings of Step S201 and S203-S205 between the processings of Steps S102 and S103, or between the processings of Steps S105 and S106.

Moreover, although in the double-action friction stir joining system 100 according to Embodiment 6 the control device 130 rotates the first rotary driver 57 to rotate the pin member 11 and the shoulder member 12, it is not limited to this configuration. Similarly to Embodiment 2, the cleaning mechanism 110 may have the second rotary driver 112, and the control device 130 may operate the second rotary driver 112 to rotate the dressing member 111.

Moreover, the dressing member 111 may be formed so as to contact the outer circumferential surface of the pin member 11 and the outer circumferential surface of the shoulder member 12. Here, FIG. 22 is a schematic view illustrating one example of the dressing member.

Figure 22:
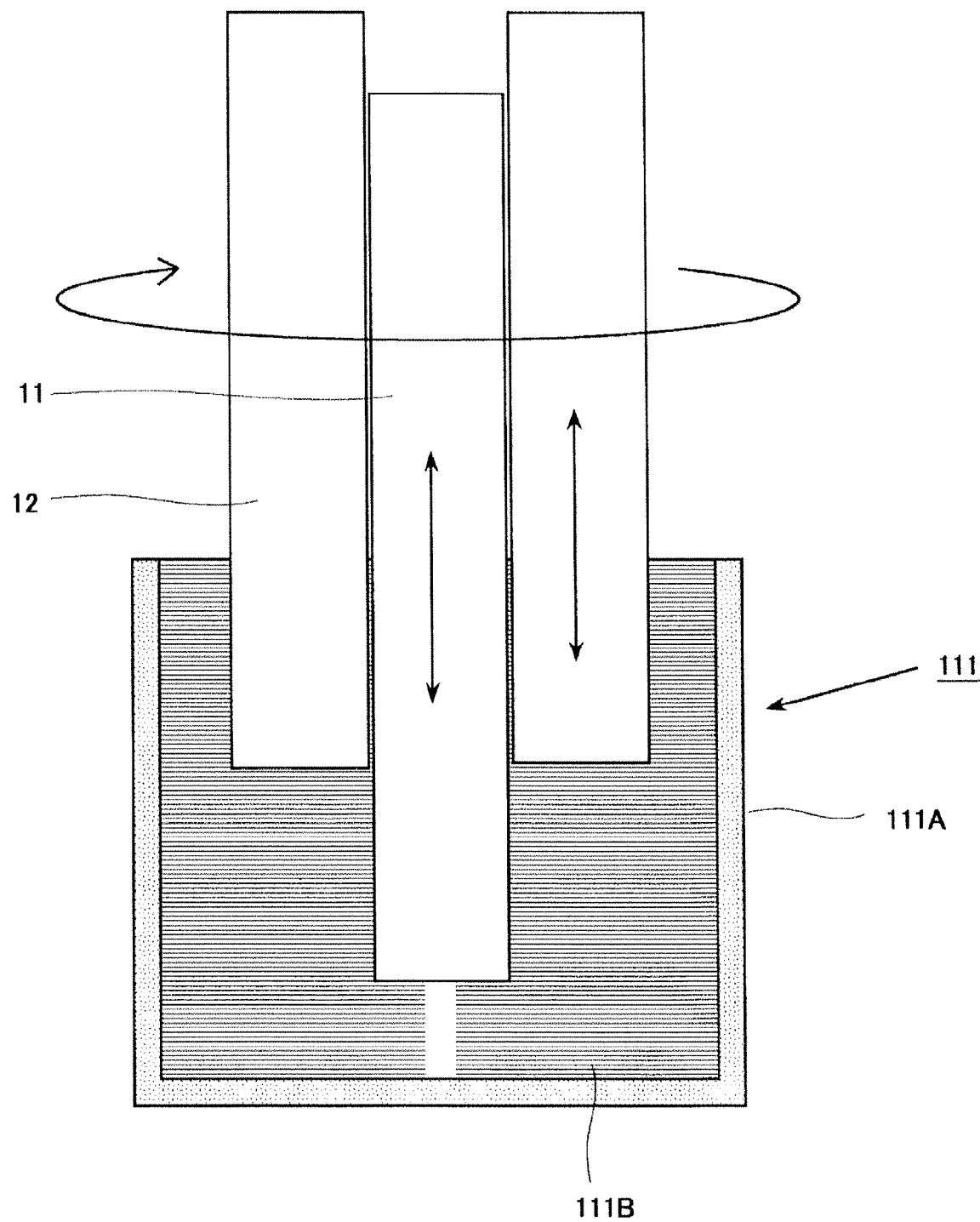
FIG. 22 is a schematic view illustrating one example of a dressing member.

As illustrated in FIG. 22, the dressing member 111 has a cylinder member 111A and a brush member 111B, which are formed in a cylindrical shape. The brush member 111B is disposed in the inner circumferential surface of the cylinder member 111A so as to extend in a radial direction toward the center axis. Note that, although here the cylinder member 111A is formed in a cylindrical shape, it is not limited to this configuration. An aperture shape of the cylinder member 111A is arbitrary, as long as it is formed in a cylindrical shape.

[Modification 1]

Next, a modification of the double-action friction stir joining system 100 according to Embodiment 6 is described with reference to FIG. 23.

In a double-action friction stir joining system of Modification 1 of Embodiment 6, the control device operates the robot in (E) so that the robot holds the cleaning mechanism and the dressing member contacts the outer circumferential surface of the pin member and/or the outer circumferential surface of the shoulder member.

Below, one example of the double-action friction stir joining system of Modification 1 of Embodiment 6 is described. Note that, since a configuration of the double-action friction stir joining system of Modification 1 of Embodiment 6 is the same as that of the double-action friction stir joining system according to Embodiment 1, the detailed description is omitted.

Figure 23:
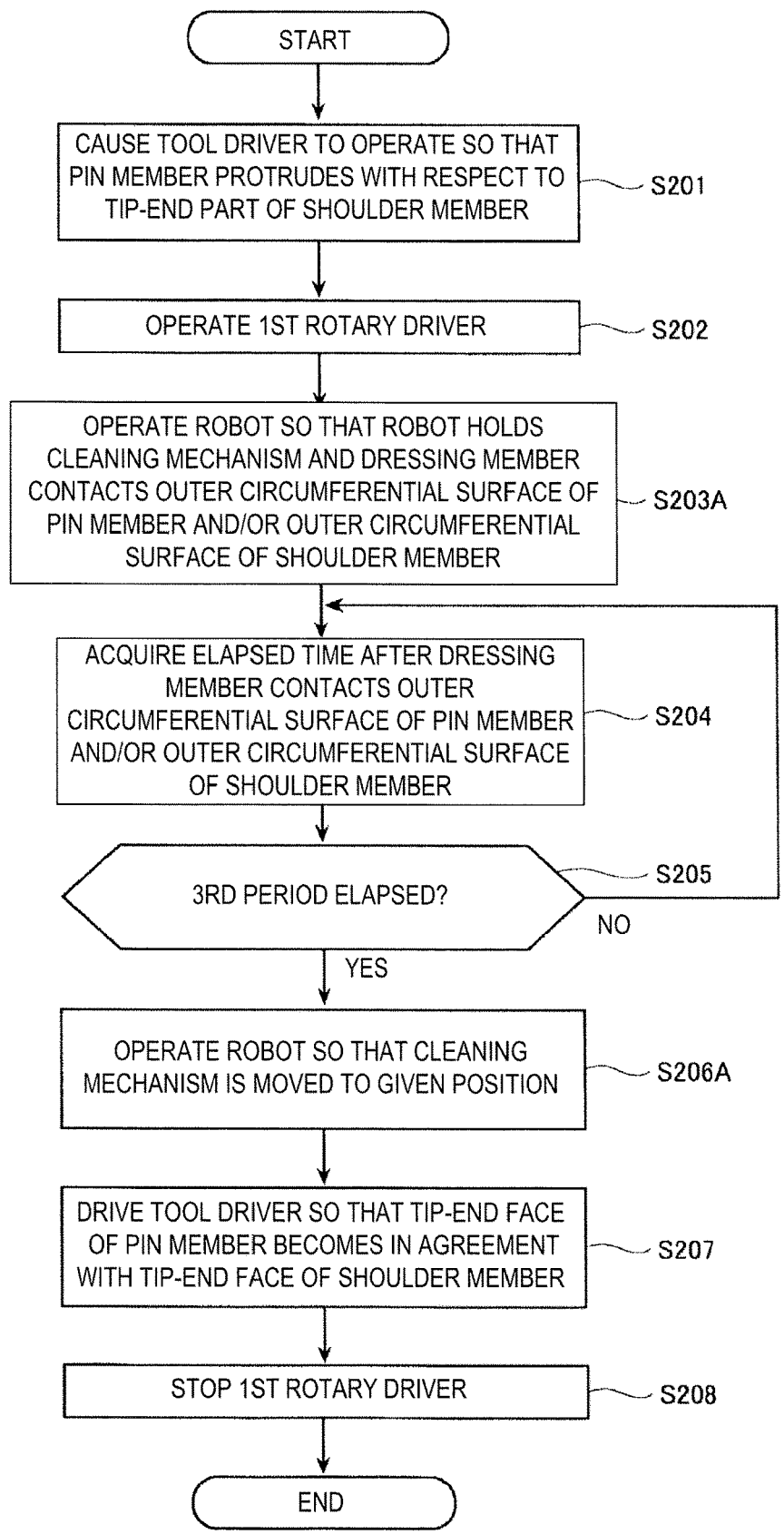
FIG. 23 is a flowchart illustrating one example of operation of a double-action friction stir joining system of Modification 1 of Embodiment 6.

FIG. 23 is a flowchart illustrating one example of operation of the double-action friction stir joining system of Modification 1 of Embodiment 6.

As illustrated in FIG. 23, although the operation of the double-action friction stir joining system 100 of Modification 1 of Embodiment 6 is fundamentally the same as that of the double-action friction stir joining system 100 according to Embodiment 6, it differs in that Steps S203A and 5206A are performed, instead of Steps S203 and S206.

In detail, the control device 130 operates the robot 120 so that the robot 120 holds the cleaning mechanism 110 (dressing member 111) and the dressing member 111 of the cleaning mechanism 110 contacts the outer circumferential surface of the pin member 11 and/or the outer circumferential surface of the shoulder member 12 (Step S203A). At this time, the double-action friction stir joining device 101 may be fixedly installed, or may be grasped by a robot other than the robot 120.

Next, the control device 130 acquires, from the clock 134, the elapsed time after the dressing member 111 contacts the outer circumferential surface of the pin member 11 and/or the outer circumferential surface of the shoulder member 12 (Step S204). Next, the control device 130 determines whether the time acquired at Step S204 reaches the third period set in advance (Step S205).

Next, if the control device 130 determines that the time acquired at Step S204 reaches the third period (Yes at Step S205), it operates the robot 120 so that the cleaning mechanism 110 is moved to the given position set in advance (the initial position where the cleaning mechanism 110 is installed) (Step S206A).

Also according to the double-action friction stir joining system 100 of Modification 1 of Embodiment 6 configured in this way, similar operation and effects to the double-action friction stir joining system 100 according to Embodiment 6 can be acquired.

Note that, although in the double-action friction stir joining system 100 of Modification 1 of Embodiment 6 the control device 130 rotates the first rotary driver 57 to rotate the pin member 11 and the shoulder member 12, it is not limited to this configuration. Similarly to Embodiment 2, the cleaning mechanism 110 may have the second rotary driver 112, and the control device 130 may operate the second rotary driver 112 to rotate the dressing member 111.

[Modification 2]

In a double-action friction stir joining system of Modification 2 of Embodiment 6, the robot is configured to be pivotable or rotatable on the axis, while holding the double-action friction stir joining device. The control device operates the robot in (E) so that the robot holds the double-action friction stir joining device, and the outer circumferential surface of the pin member and/or the outer circumferential surface of the shoulder member contacts the dressing member, while pivoting the double-action friction stir joining device.

Below, one example of the double-action friction stir joining system of Modification 2 of Embodiment 6 is described with reference to FIG. 24. Note that, since the double-action friction stir joining system 100 of Modification 2 of Embodiment 6 is the same in the fundamental configuration as the double-action friction stir joining system 100 of Modification 2 of Embodiment 1, the detailed description is omitted.

[Operation and Effects of Double-Action Friction Stir Joining System]

Figure 24:
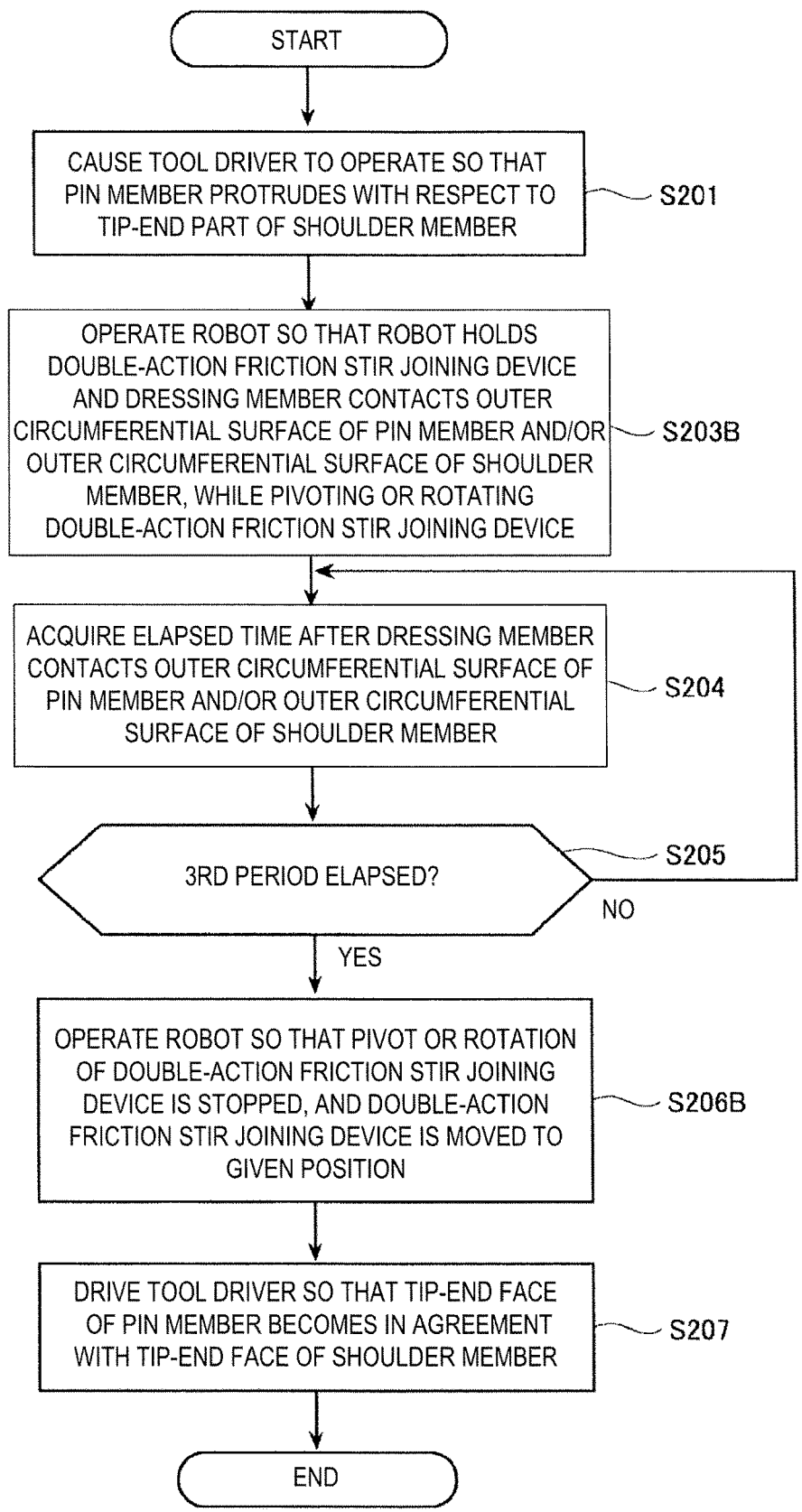
FIG. 24 is a flowchart illustrating one example of operation of a double-action friction stir joining system of Modification 2 of Embodiment 6.

FIG. 24 is a flowchart illustrating one example of operation of the double-action friction stir joining system of Modification 2 of Embodiment 6.

As illustrated in FIG. 24, although the operation of the double-action friction stir joining system 100 of Modification 2 of Embodiment 6 is fundamentally the same as that of the double-action friction stir joining system 100 according to Embodiment 6, it differs in that the operations (processings) of Steps S202 and S208 are not performed, and operations (processings) of Steps S203B and 5206B are performed, instead of Steps S203 and S206.

In detail, the control device 130 causes the tool driver 53 (pin driver 531) to drive (operate) so that the pin member 11 protrudes with respect to the tip-end part of the shoulder member 12 (Step S201). Next, the control device 130 operates the robot 120 so that the robot 120 holds the double-action friction stir joining device 101, and the dressing member 111 of the cleaning mechanism 110 contacts the outer circumferential surface of the pin member and/or the shoulder member 12, while pivoting or rotating the double-action friction stir joining device 101 (Step S103B).

Therefore, the material of the to-be-joined object 60 adhered to the outer circumferential surface of the pin member 11 and/or the shoulder member 12 can be removed (scraped) by the dressing member 111. Note that a cutting tool may be used as the dressing member 111.

Next, the control device 130 acquires, from the clock 134, the elapsed time after the dressing member 111 contacts the outer circumferential surface of the pin member 11 and/or the shoulder member 12 (Step S204). Next, the control device 130 determines whether the time acquired at Step S204 reaches the third period set in advance (Step S205).

If the control device 130 determines that the time acquired at Step S204 reaches the third period (Yes at Step S205), it performs processing of Step S206B.

At Step S206B, the control device 130 operates the robot 120 so that the pivot or rotation of the double-action friction stir joining device 101 is stopped, and the double-action friction stir joining device 101 is moved to the given position set in advance.

Next, the control device 130 drives the tool driver 53 (pin driver 531) so that the tip-end face 11a of the pin member 11 becomes in agreement with the tip-end face 12a of the shoulder member 12 (Step S207), and ends this program.

Also according to the double-action friction stir joining system 100 of Modification 2 of Embodiment 6 configured in this way, similar operation and effects to the double-action friction stir joining system 100 according to Embodiment 6 can be acquired.

Embodiment 7

In a double-action friction stir joining device of a double-action friction stir joining system according to Embodiment 7, any of the double-action friction stir joining systems of Embodiments 1 to 6 (including the modifications) is formed in a cylindrical shape, and further includes a clamp member into which the pin member and the shoulder member are inserted. The cleaning mechanism further includes a second rotary driver which rotates the dressing member. The control device is further configured to (F) operate the tool driver so that the pin member and the shoulder member are thrusted into the clamp member, and (G) operate the robot so that the robot holds the double-action friction stir joining device, and the dressing member contacts the inner circumferential surface of the clamp member.

Below, one example of the double-action friction stir joining system according to Embodiment 7 is described with reference to FIGS. 25 and 26. Note that, although the double-action friction stir joining system according to Embodiment 7 is the same in the fundamental configuration as the double-action friction stir joining system 100 according to Embodiment 2, it differs in the configuration of the double-action friction stir joining device 101.

[Configuration of Double-Action Friction Stir Joining Device]

Figure 25:
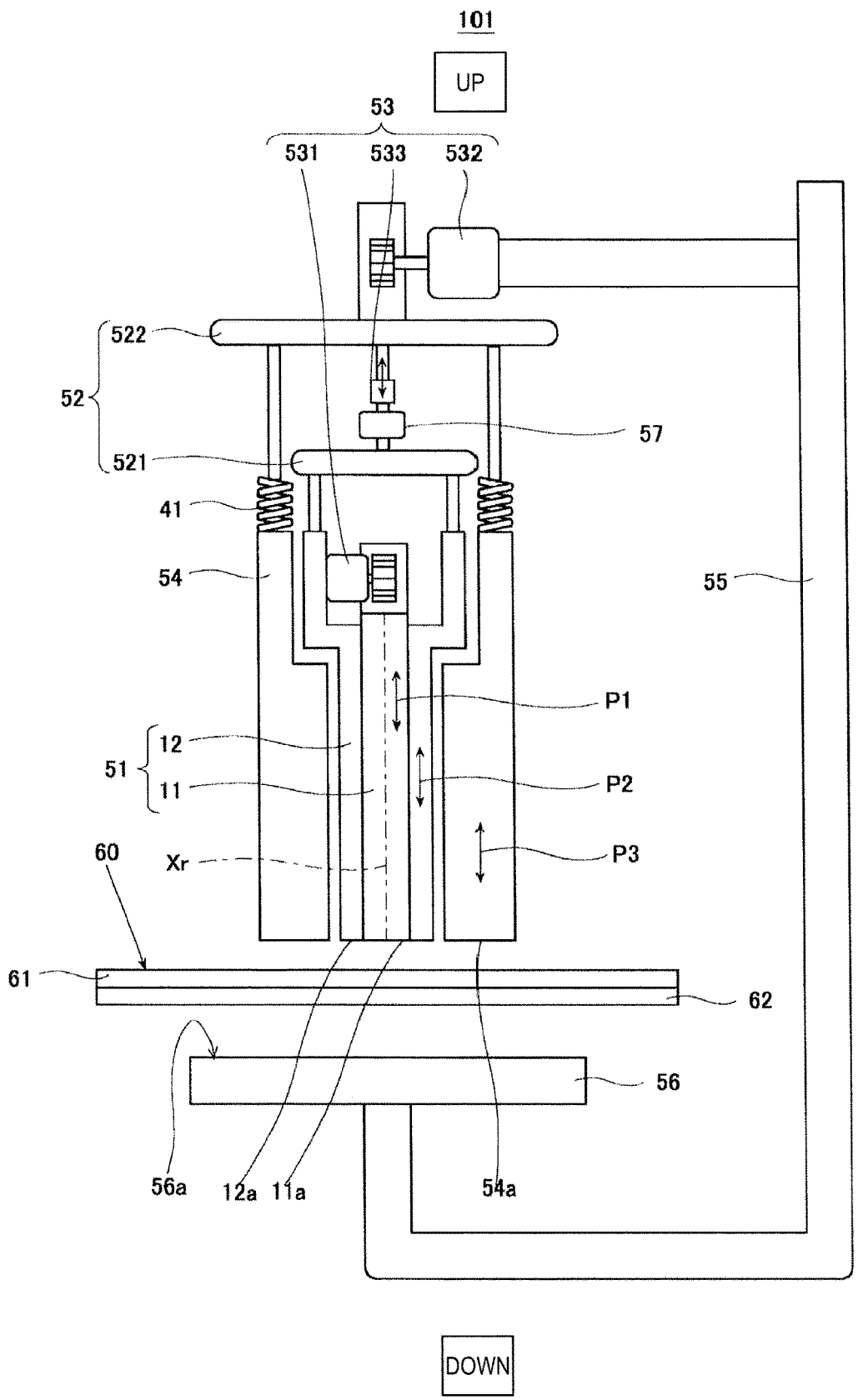
FIG. 25 is a schematic view illustrating an outline configuration of a double-action friction stir joining system according to Embodiment 7.

FIG. 25 is a schematic view illustrating an outline configuration of the double-action friction stir joining system according to Embodiment 7. Note that, in FIG. 25, an up-and-down direction in this drawing is expressed as an up-and-down direction of the double-action friction stir joining device.

As illustrated in FIG. 25, although the double-action friction stir joining device 101 in the double-action friction stir joining system 100 according to Embodiment 7 is the same in the fundamental configuration as the double-action friction stir joining device 101 of the double-action friction stir joining system 100 according to Embodiment 1, it differs in that the tool driver 53 further includes a telescopic mechanism 533 which can thrust the pin member 11 and the shoulder member 12 out of and into the clamp member 54.

In detail, the telescopic mechanism 533 is disposed so that the movable body 522 is connected with the first rotary driver 57, and it is comprised of a linear-movement actuator. The linear-movement actuator may be comprised of a servomotor and a rack and a pinion, a servomotor and a ball screw, or an air cylinder, for example.

Therefore, by operating the telescopic mechanism 533, the pin member 11 and the shoulder member 12 can appear and disappear (advance and retreat) from and into the clamp member 54.

[Operation and Effects of Double-Action Friction Stir Joining System]

Figure 26:
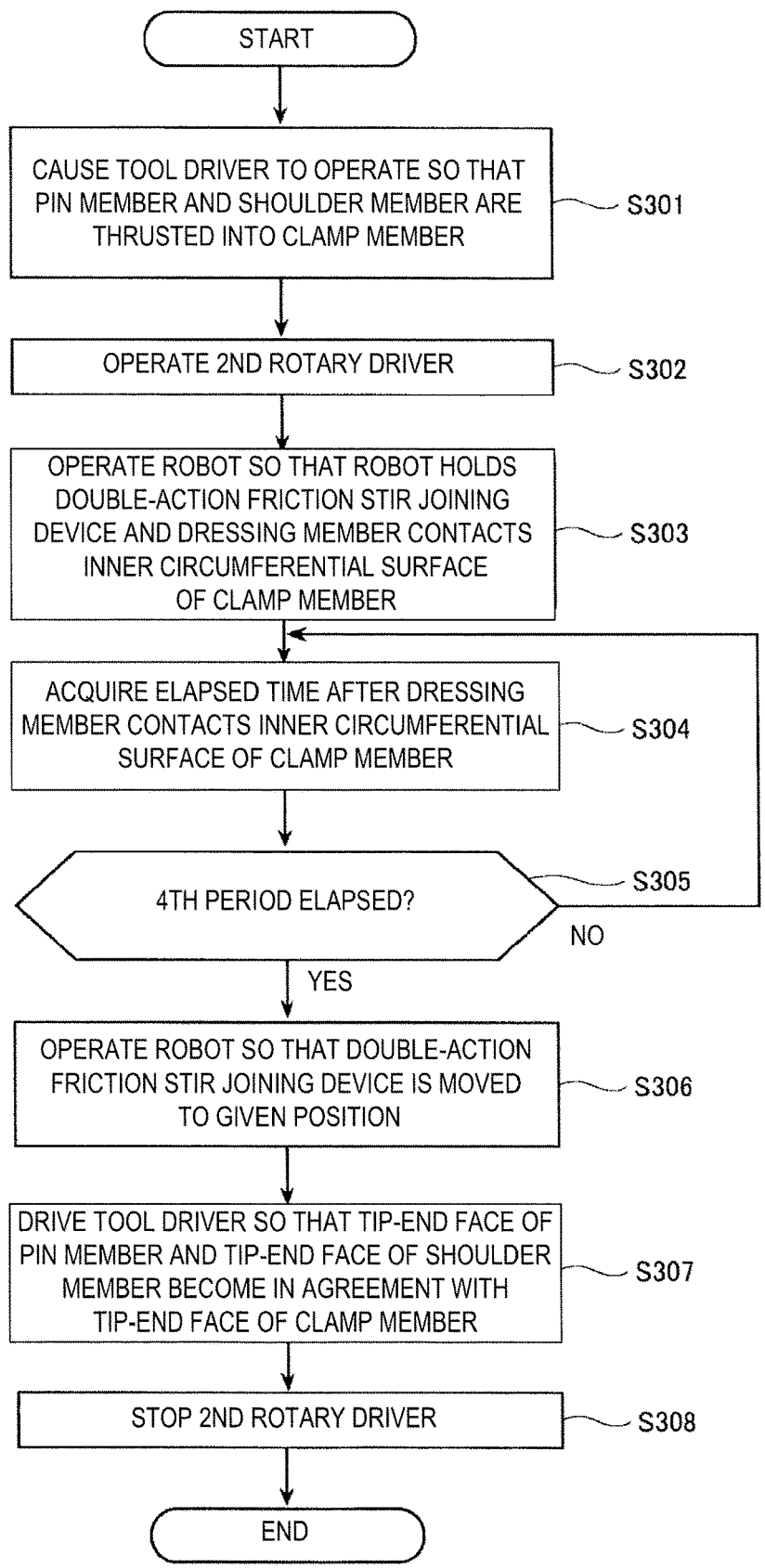
FIG. 26 is a flowchart illustrating one example of operation of the double-action friction stir joining system according to Embodiment 7.

FIG. 26 is a flowchart illustrating one example of operation of the double-action friction stir joining system according to Embodiment 7.

First, when the worker (operator) operates the input device 132 to input instruction information into the processor 131 so that a cleaning (maintenance) of the clamp member 54 is performed, or when the double-action friction stir joining device 101 carries out the given number of friction stir joinings set in advance, the processor 131 of the control device 130 performs the following operation (processing) by reading the program stored in the memory 133.

The control device 130 causes the tool driver 53 (telescopic mechanism 533) to drive (operate) so that the pin member 11 and the shoulder member 12 are thrusted into the clamp member 54 (Step S301). Next, the control device 130 operates the second rotary driver 112 (Step S302) to rotate the dressing member 111.

Next, the control device 130 operates the robot 120 so that the robot 120 holds the double-action friction stir joining device 101 and the dressing member 111 of the cleaning mechanism 110 contacts the inner circumferential surface of the clamp member 54 (Step S303).

At this time, the control device 130 may operate the robot 120 so that the dressing member 111 reciprocates along the axis Xr in the inward space of the clamp member 54. Note that, when the robot 120 has already held the double-action friction stir joining device 101, the control device 130 operates the robot 120 so that the dressing member 111 of the cleaning mechanism 110 contacts the inner circumferential surface of the clamp member 54.

Therefore, the material of the to-be-joined object 60 adhered to the inner circumferential surface of the clamp member 54 can be removed by the dressing member 111.

Next, the control device 130 acquires, from the clock 134, an elapsed time after the dressing member 111 contacts the inner circumferential surface of the clamp member 54 (Step S304). Next, the control device 130 determines whether the time acquired at Step S304 reaches a fourth period set in advance (Step S305).

Here, the fourth period can be obtained in advance by an experiment etc., and, for example, it may be a time required for fully removing the material of the to-be-joined object 60 adhered to the inner circumferential surface of the clamp member 54.

If the control device 130 determines that the time acquired at Step S304 does not reach the fourth period (No at Step S305), it repeats the processings of Steps S304 and S305 until the time acquired at Step S304 reaches the fourth period. On the other hand, if the control device 130 determines that the time acquired at Step S304 reaches the fourth period (Yes at Step S305), it performs processing of Step S306.

At Step S306, the control device 130 operates the robot 120 so that the double-action friction stir joining device 101 is moved to the given position set in advance (the initial position at which the double-action friction stir joining device 101 is installed).

Next, the control device 130 drives the tool driver 53 (telescopic mechanism 533) so that the tip-end face 11a of the pin member 11 and the tip-end face 12a of the shoulder member 12 become in agreement with the tip-end face 54a of the clamp member 54 (Step S307). Next, the control device 130 stops the second rotary driver 112 (Step S308), and ends this program.

In the double-action friction stir joining system 100 according to Embodiment 7 configured in this way, the control device 130 operates the robot 120 so that the dressing member 111 contacts the inner circumferential surface of the clamp member 54, while rotating the dressing member 111.

Therefore, the material of the to-be-joined object 60 adhered to the inner circumferential surface of the clamp member 54 can be removed by the dressing member 111.

Note that, although in the double-action friction stir joining system 100 according to Embodiment 7 the cleaning of the inner circumferential surface of the clamp member 54 is performed by the control of the control device 130, it is not limited to this configuration. The control device 130 may perform the cleaning of the inner circumferential surface of the clamp member 54, before or after performing the cleaning of the inner circumferential surface of the shoulder member 12.

Moreover the control device 130 may perform the cleaning of the inner circumferential surface of the clamp member 54, before or after performing the cleaning of the outer circumferential surface of the pin member 11 and/or the outer circumferential surface of the shoulder member 12. In this case, the control device 130 may perform the cleaning of the outer circumferential surface of the pin member 11 and/or the outer circumferential surface of the shoulder member 12, before or after performing the cleaning of the inner circumferential surface of the shoulder member 12, and may then perform the cleaning of the inner circumferential surface of the clamp member 54.

That is, the control device 130 may perform the cleaning of the inner circumferential surface of the shoulder member 12, the cleaning of the outer circumferential surface of the pin member 11 and/or the outer circumferential surface of the shoulder member 12, and the cleaning of the inner circumferential surface of the clamp member 54, and may perform the cleanings in an arbitrary order.

[Modification 1]

Next, a modification of the double-action friction stir joining system 100 according to Embodiment 7 is described with reference to FIG. 27.

In a double-action friction stir joining system of Modification 1 of Embodiment 7, the double-action friction stir joining device is formed in a cylindrical shape, and further includes a clamp member into which the pin member and the shoulder member are inserted. The cleaning mechanism further includes a second rotary driver which rotates the dressing member. The control device is further configured to (B1) operate the second rotary driver so that the dressing member rotates, (F) operate the tool driver so that the pin member and the shoulder member are thrusted into the clamp member, and (G1) operate the robot so that the robot holds the cleaning mechanism and the dressing member contacts the inner circumferential surface of the clamp member.

Below, one example of the double-action friction stir joining system of Modification 1 of Embodiment 7 is described. Note that, since a configuration of the double-action friction stir joining system of Modification 1 of Embodiment 7 is the same as that of the double-action friction stir joining system according to Embodiment 7, the detailed description is omitted.

Figure 27:
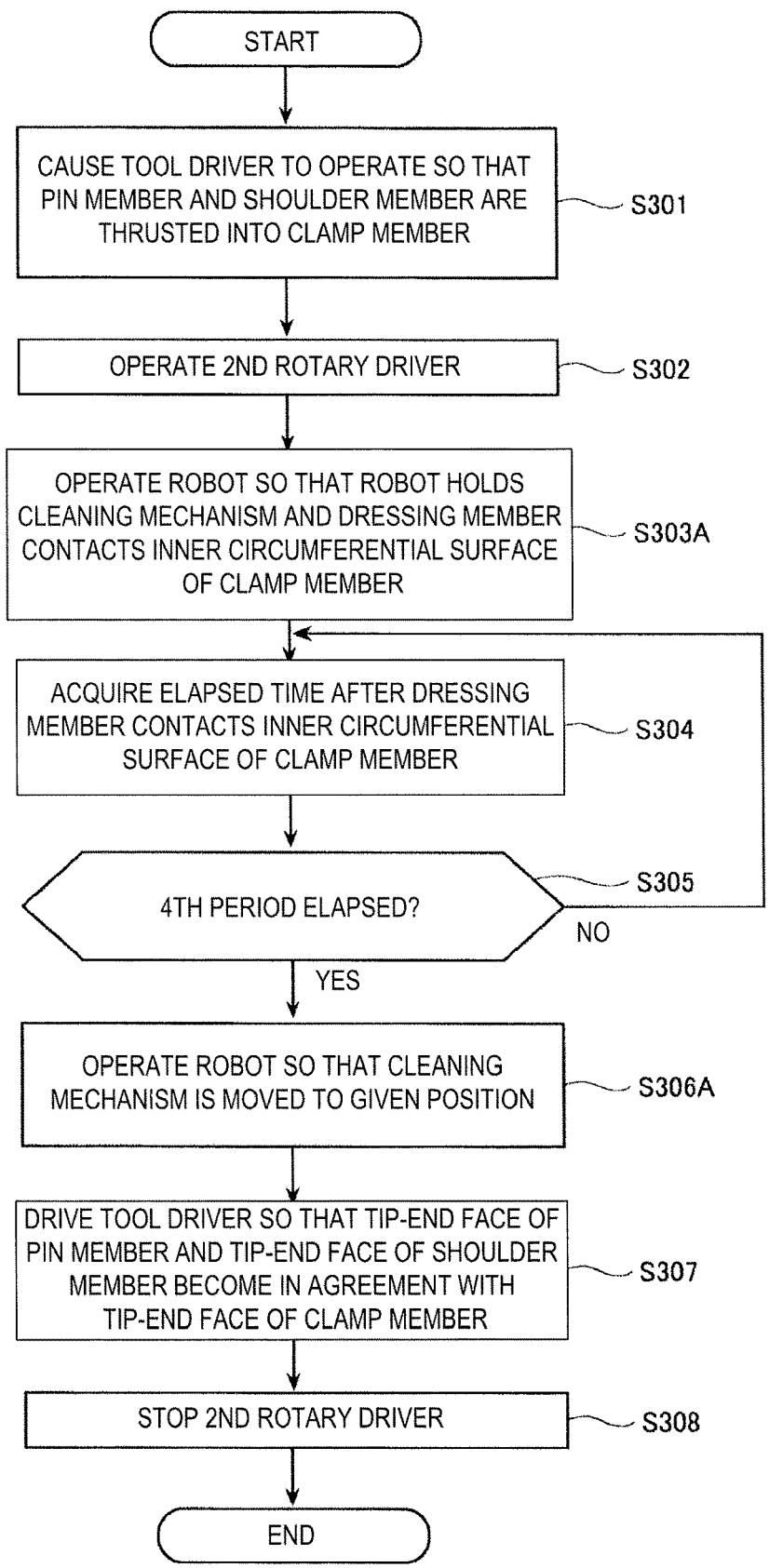
FIG. 27 is a flowchart illustrating one example of operation of a double-action friction stir joining system of Modification 1 of Embodiment 7.

FIG. 27 is a flowchart illustrating one example of operation of the double-action friction stir joining system of Modification 1 of Embodiment 7.

As illustrated in FIG. 27, although the operation of the double-action friction stir joining system 100 of Modification 1 of Embodiment 7 is fundamentally the same as that of the double-action friction stir joining system 100 according to Embodiment 7, it differs in that Steps S303A and S306A are performed, instead of Steps S303 and S306.

In detail, the control device 130 operates the robot 120 so that the robot 120 holds the cleaning mechanism 110 (dressing member 111) and the dressing member 111 of the cleaning mechanism 110 contacts the inner circumferential surface of the clamp member 54 (Step S303A).

Next, the control device 130 acquires, from the clock 134, the elapsed time after the dressing member 111 contacts the inner circumferential surface of the clamp member 54 (Step S304). Next, the control device 130 determines whether the time acquired at Step S304 reaches the fourth period set in advance (Step S305).

Next, if the control device 130 determines that the time acquired at Step S304 reaches the fourth period (Yes at Step S305), it operates the robot 120 so that the cleaning mechanism 110 is moved to the given position set in advance (the initial position where the cleaning mechanism 110 is installed) (Step S306A).

Also according to the double-action friction stir joining system 100 of Modification 1 of Embodiment 7 configured in this way, similar operation and effects to the double-action friction stir joining system 100 according to Embodiment 7 can be acquired.

[Modification 2]

In a double-action friction stir joining system of Modification 2 of Embodiment 7, the robot is configured to be pivotable or rotatable on the axis, while holding the double-action friction stir joining device. The control device operates the robot, in (G), so that the robot holds the double-action friction stir joining device, and the dressing member contacts the inner circumferential surface of the clamp member, while pivoting the double-action friction stir joining device.

Below, one example of the double-action friction stir joining system of Modification 2 of Embodiment 7 is described with reference to FIG. 28. Note that, since the double-action friction stir joining system 100 of Modification 2 of Embodiment 7 is the same in the fundamental configuration as the double-action friction stir joining system 100 of Modification 2 of Embodiment 1, the detailed description is omitted.

[Operation and Effects of Double-Action Friction Stir Joining System]

Figure 28:
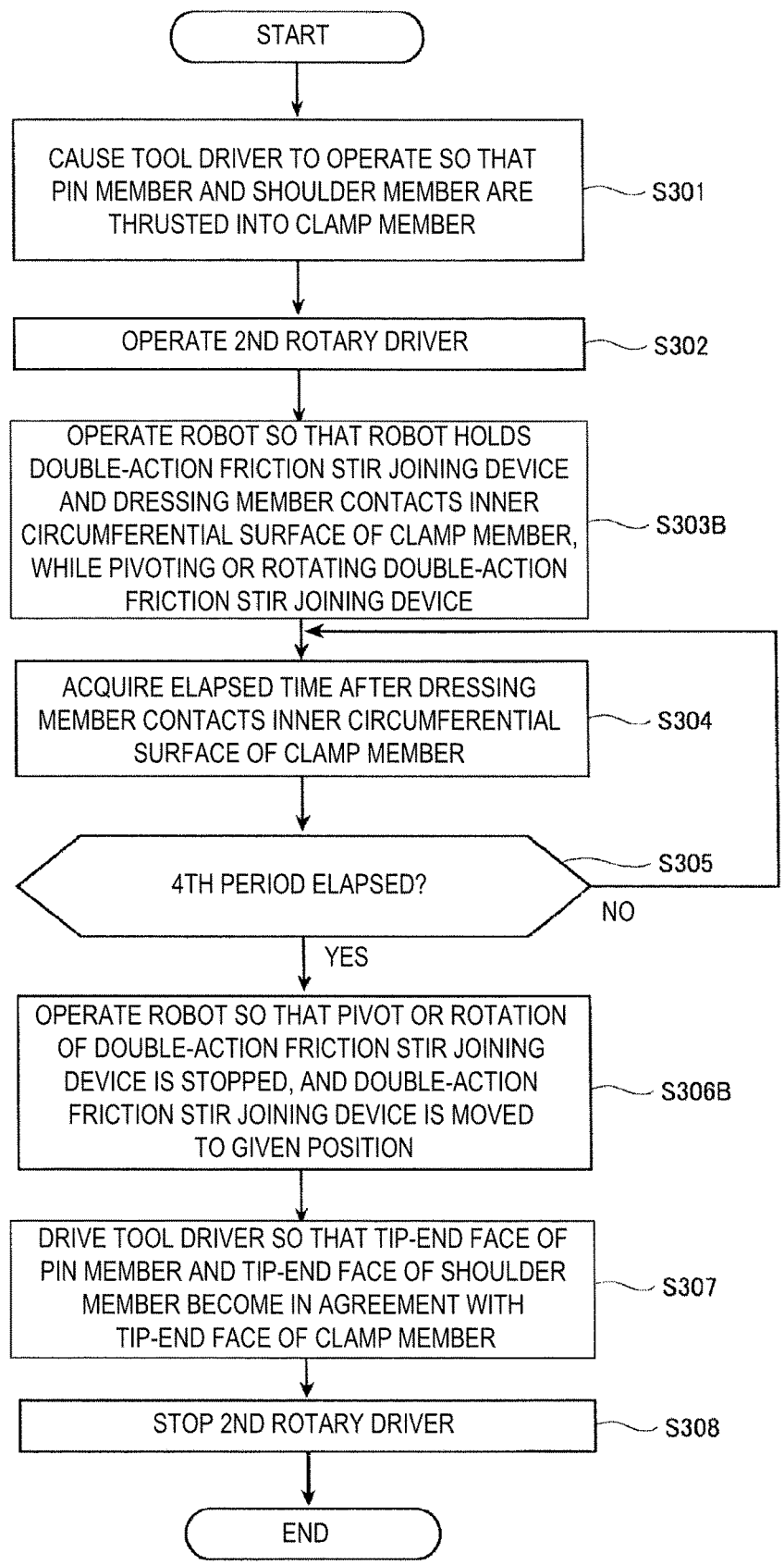
FIG. 28 is a flowchart illustrating one example of operation of a double-action friction stir joining system of Modification 2 of Embodiment 7.

FIG. 28 is a flowchart illustrating one example of operation of the double-action friction stir joining system of Modification 2 of Embodiment 7.

As illustrated in FIG. 28, although the operation of the double-action friction stir joining system 100 of Modification 2 of Embodiment 7 is fundamentally the same as that of the double-action friction stir joining system 100 according to Embodiment 7, it differs in that operations (processings) of Steps S303B and S306B are performed, instead of Steps S303 and S306.

In detail, the control device 130 operates the robot 120 so that the robot holds the double-action friction stir joining device 101 and the dressing member 111 of the cleaning mechanism 110 contacts the inner circumferential surface of the clamp member 54, while pivoting or rotating the double-action friction stir joining device 101 (Step S30B).

Therefore, the material of the to-be-joined object 60 adhered to the inner circumferential surface of the clamp member 54 can be removed (scraped) by the dressing member 111.

Next, the control device 130 acquires, from the clock 134, the elapsed time after the dressing member 111 contacts the inner circumferential surface of the clamp member 54 (Step S304). Next, the control device 130 determines whether the time acquired at Step S304 reaches the fourth period set in advance (Step S305).

If the control device 130 determines that the time acquired at Step S304 reaches the fourth period (Yes at Step S305), it performs processing of Step S306B.

At Step S306B, the control device 130 operates the robot 120 so that the pivot or rotation of the double-action friction stir joining device 101 is stopped, and the double-action friction stir joining device 101 is moved to the given position set in advance.

Next, the control device 130 drives the tool driver 53 (telescopic mechanism 533) so that the tip-end face 11a of the pin member 11 and the tip-end face 12a of the shoulder member 12 become in agreement with the tip-end face 54a of the clamp member 54 (Step S307). Next, the control device 130 stops the second rotary driver 112 (Step S308), and ends this program.

Also according to the double-action friction stir joining system 100 of Modification 2 of Embodiment 7 configured in this way, similar operation and effects to the double-action friction stir joining system 100 according to Embodiment 7 can be acquired.

Embodiment 8

A double-action friction stir joining system according to Embodiment 8 includes a double-action friction stir joining device, a cleaning mechanism having a dressing member, a robot, a stock mechanism, and a control device. The double-action friction stir joining device includes a pin member which is formed in a cylindrical shape and is configured to be rotatable on its axis and reciprocatable in a direction along the axis, a shoulder member which is formed in a cylindrical shape, into which the pin member is inserted, and is configured to be rotatable on its axis and reciprocatable in a direction along the axis, a first rotary driver which rotates the pin member and the shoulder member on the axis, and a tool driver which reciprocates the pin member and the shoulder member along the axis, respectively. The cleaning mechanism further has a second rotary driver which rotates the dressing member. The control device is configured to (H) operate the robot so that the pin member and/or shoulder member is removed, and the pin member and/or shoulder member is disposed at the stock mechanism so that the axis is oriented in the vertical direction, (I) operate the second rotary driver so that the dressing member rotates, and (J) operate the robot so that the robot holds the cleaning mechanism, and the cleaning mechanism contacts at least one of the outer circumferential surface of the pin member, the inner circumferential surface of the shoulder member, and the outer circumferential surface of the shoulder member.

Below, one example of the double-action friction stir joining system according to Embodiment 8 is described in detail with reference to FIGS. 29 to 31.

[Configuration of Double-Action Friction Stir Joining System]

Figure 29:
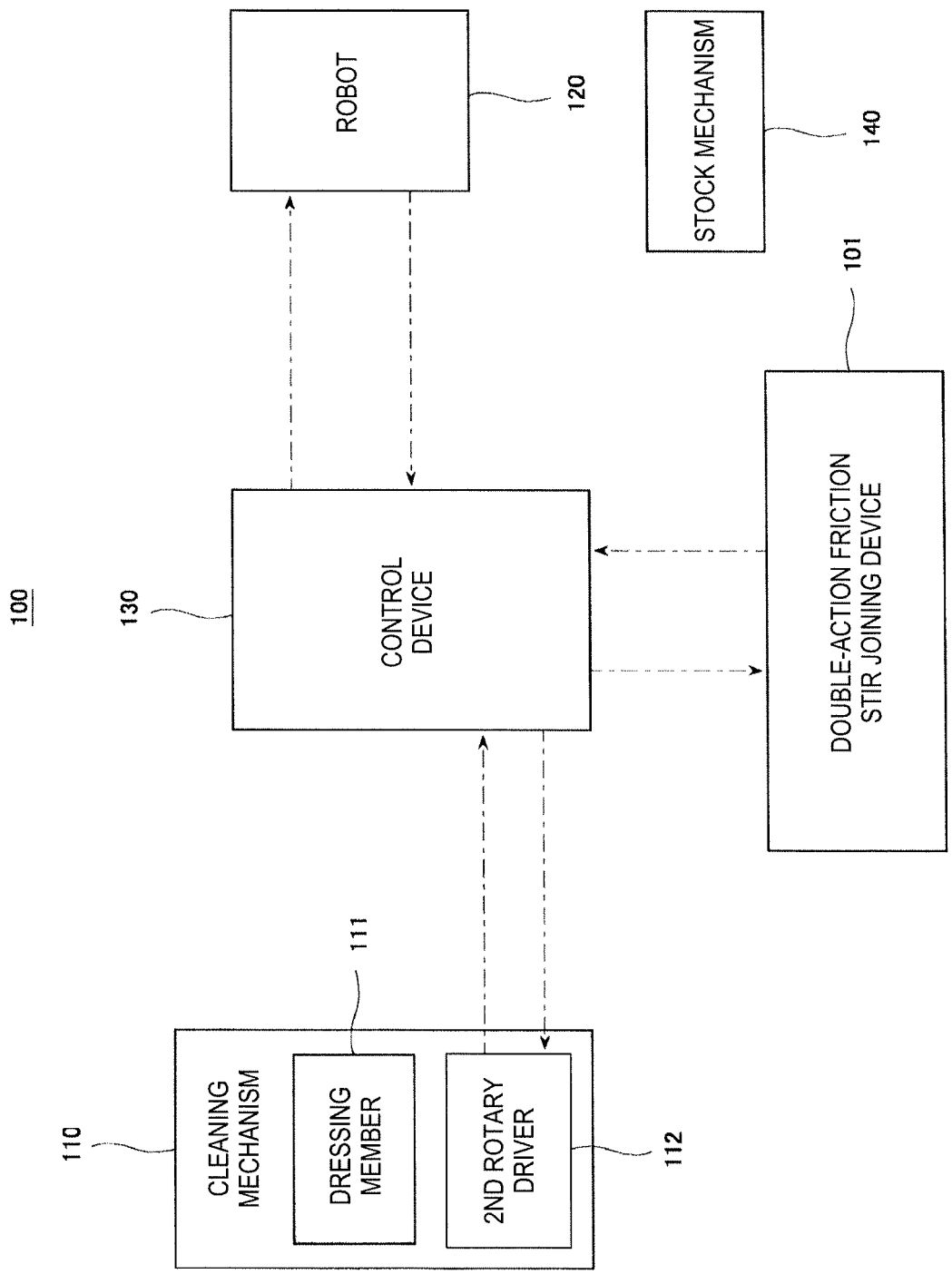
FIG. 29 is a block diagram illustrating an outline configuration of a double-action friction stir joining system according to Embodiment 8.

FIG. 29 is a block diagram illustrating an outline configuration of the double-action friction stir joining system according to Embodiment 8.

As illustrated in FIG. 29, although the double-action friction stir joining system 100 according to Embodiment 8 is the same in the fundamental configuration as the double-action friction stir joining system 100 according to Embodiment 2, it differs in that it further includes a stock mechanism 140.

[Configuration of Stock Mechanism]

Figure 30:
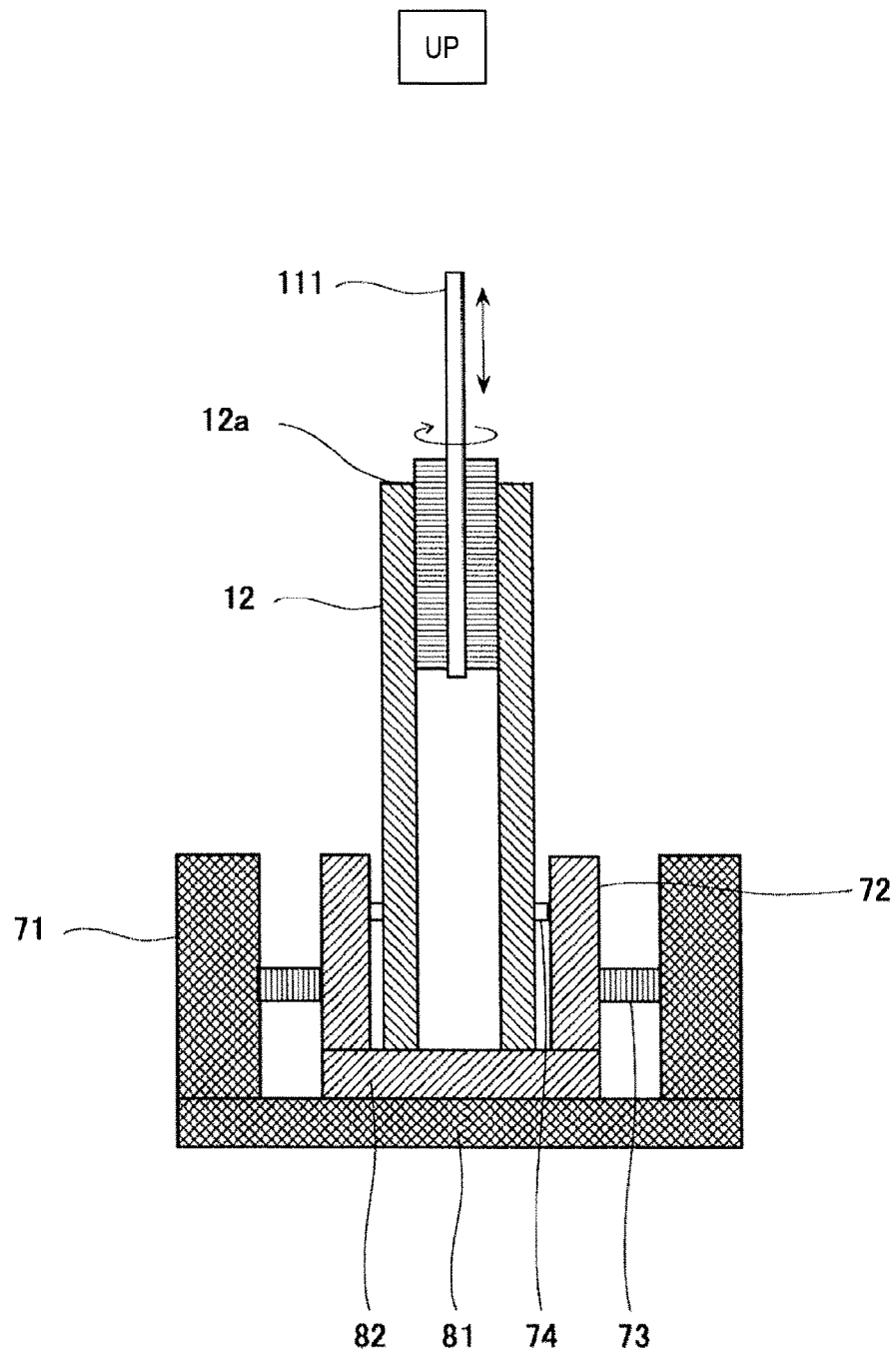
FIG. 30 is a schematic view illustrating an outline configuration of a stock mechanism illustrated in FIG. 29.

FIG. 30 is a schematic view illustrating an outline configuration of the stock mechanism illustrated in FIG. 29. Note that, in FIG. 30, an up-and-down direction of the stock mechanism is expressed as an up-and-down direction in this drawing.

As illustrated in FIG. 30, the stock mechanism 140 has an outer tube 71, an inner tube 72, a first lid member 81, and a second lid member 82.

The outer tube 71 and the inner tube 72 are formed in a cylindrical shape, and the first lid member 81 and the second lid member 82 are disposed in a lower end surface, respectively. The first lid member 81 is placed on a floor surface etc., and the second lid member 82 is placed on an upper surface of the first lid member 81.

An elastic member 73 is provided in a cylindrical space between the outer tube 71 and the inner tube 72. In detail, the elastic member 73 is disposed so as to connect the inner circumferential surface of the outer tube 71 with the outer circumferential surface of the inner tube 72. The elastic member 73 may be provided at a plurality of locations. As the elastic member 73, a spring, a rubber, etc. may be used, for example.

Therefore, when the dressing member 111 collides with the shoulder member 12, the elastic member 73 can absorb the impact.

Moreover, a positioning member 74 for positioning the shoulder member 12 is provided at a suitable location of the inner circumferential surface of the inner tube 72. Note that, although in FIG. 30 the shoulder member 12 is held, it is not limited to this configuration, and the pin member 11 or the clamp member 54 may be held.

[Operation and Effects of Double-Action Friction Stir Joining System]

Figure 31:
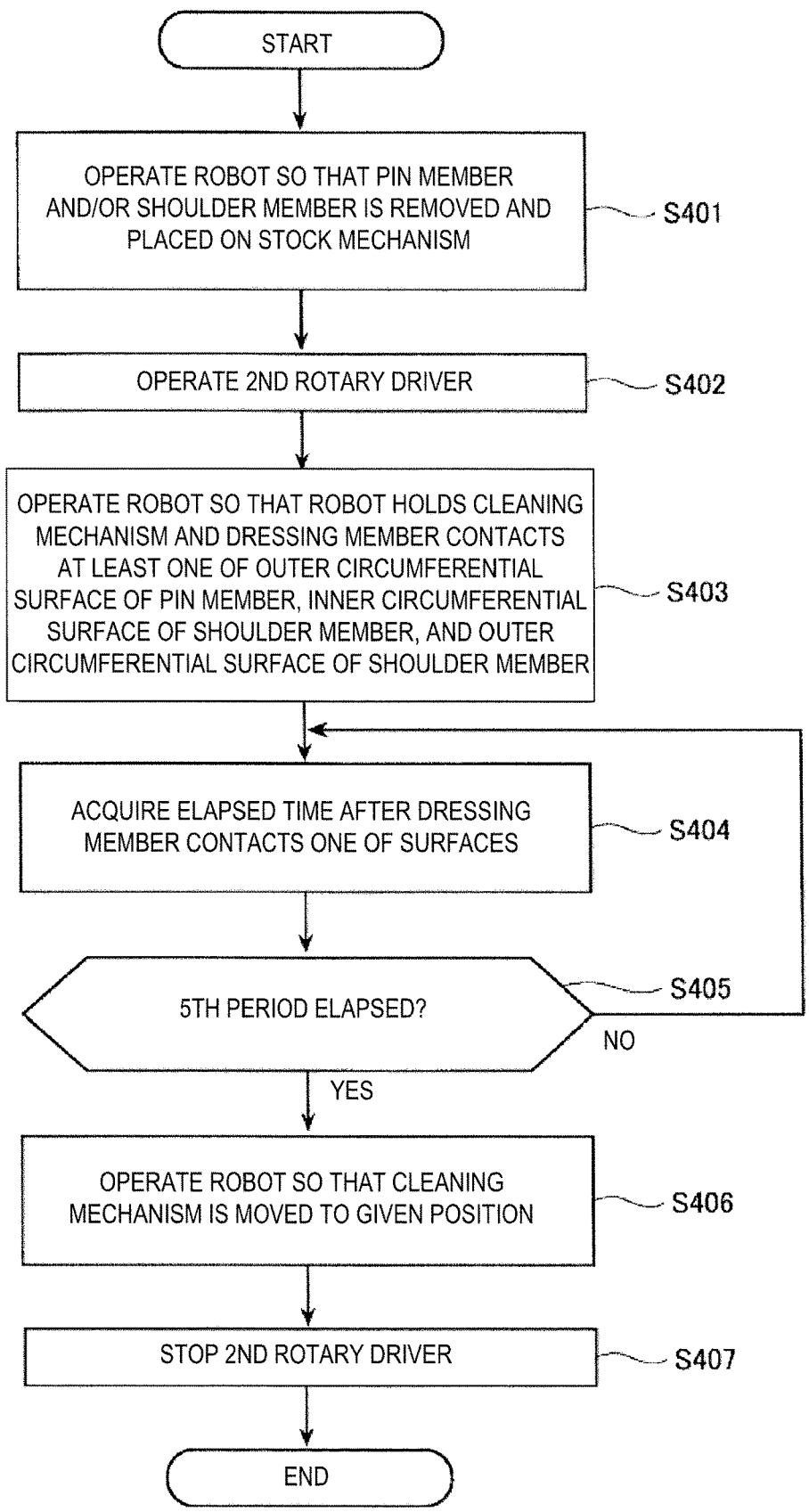
FIG. 31 is a flowchart illustrating one example of operation of the double-action friction stir joining system according to Embodiment 8.

FIG. 31 is a flowchart illustrating one example of operation of the double-action friction stir joining system according to Embodiment 8.

First, when the worker (operator) operates the input device 132 to input instruction information into the processor 131 so that the cleaning (maintenance) of the pin member 11 and/or the shoulder member 12 is performed, or when the double-action friction stir joining device 101 carries out the given number of friction stir joinings set in advance, the processor 131 of the control device 130 performs the following operation (processing) by reading the program stored in the memory 133.

The control device 130 operates the robot 120 so that the pin member 11 and/or the shoulder member 12 is removed from the double-action friction stir joining device 101 and the pin member 11 and/or the shoulder member 12 is placed on the stock mechanism 140 (Step S401). At this time, the control device 130 operates the robot 120 so that the tip-end face 11a of the pin member 11 and/or the tip-end face 12a of the shoulder member 12 is located upward.

Note that, when the worker removes the pin member 11 and/or the shoulder member 12 from the double-action friction stir joining device 101 and places them on the stock mechanism 140, the control device 130 does not perform the processing of the Step S401.

Next, the control device 130 operates the second rotary driver 112 (Step S402) to rotate the dressing member 111.

Next, the control device 130 operates the robot 120 so that the robot holds the cleaning mechanism 110, and the dressing member 111 of the cleaning mechanism 110 contacts at least one of the outer circumferential surface of the pin member 11, the inner circumferential surface of the shoulder member 12, and the outer circumferential surface of the shoulder member 12 (Step S403).

Therefore, the material of the to-be-joined object 60 adhered to the at least one of the outer circumferential surface of the pin member 11, the inner circumferential surface of the shoulder member 12, and the outer circumferential surface of the shoulder member 12 can be removed by the dressing member 111.

Next, the control device 130 acquires, from the clock 134, an elapsed time after the dressing member 111 contacts one of the surfaces (Step S404).

Next, the control device 130 determines whether the time acquired at Step S404 reaches a fifth period set in advance (Step S405).

Here, the fifth period can be obtained in advance by an experiment etc., and, for example, it may be a time required for fully removing the material of the to-be-joined object 60 adhered to one of the surfaces.

If the control device 130 determines that the time acquired at Step S404 does not reach the fifth period (No at Step S405), it repeats the processings of Steps S404 and S405 until the time acquired at Step S404 reaches the fifth period. On the other hand, if the control device 130 determines that the time acquired at Step S404 reaches the fifth period (Yes at Step S405), it performs processing of Step S406.

Note that, after the cleaning of one of the surfaces is finished (Yes at Step S405), the control device 130 may perform cleaning of other surfaces. That is, the control device 130 may perform cleaning of two of the outer circumferential surface of the pin member 11, the inner circumferential surface of the shoulder member 12, and the outer circumferential surface of the shoulder member 12, or may perform cleaning of the three surfaces.

At Step S406, the control device 130 operates the robot 120 so that the cleaning mechanism 110 is moved to the given position set in advance (the initial position where the cleaning mechanism 110 is installed).

Next, the control device 130 stops the second rotary driver 112 (Step S407), and ends this program.

In the double-action friction stir joining system 100 according to Embodiment 8 configured in this way, the control device 130 operates the robot 120 so that the dressing member 111 contacts at least any one of the outer circumferential surface of the pin member 11, the inner circumferential surface of the shoulder member 12, and the outer circumferential surface of the shoulder member 12, while rotating the dressing member 111.

Therefore, the material of the to-be-joined object 60 adhered to the at least any one of the outer circumferential surface of the pin member 11, the inner circumferential surface of the shoulder member 12, and the outer circumferential surface of the shoulder member 12 can be removed by the dressing member 111.

Note that, although in the double-action friction stir joining system 100 according to Embodiment 8 the cleaning mechanism 110 has the second rotary driver 112 which rotates the dressing member 111, it is not limited to this configuration. For example, a rotary driver which rotates the dressing member 111 may be provided in the tip-end part of the robot 120.

Moreover, although the double-action friction stir joining system 100 according to Embodiment 8 is provided with the clamp member 54, it is not limited to this configuration, and it may not be provided with the clamp member 54.

Embodiment 9

In a double-action friction stir joining system according to Embodiment 9, the double-action friction stir joining device in the double-action friction stir joining system according to Embodiment 8 is formed in a cylindrical shape, and further includes a clamp member into which the pin member and the shoulder member are inserted. The control device is configured to operate the robot in (H) so that the clamp member is removed and the clamp member is disposed at the stock mechanism so that its axis is oriented in the vertical direction, and operate the robot in (J) so that the robot holds the cleaning mechanism and the cleaning mechanism contacts the inner circumferential surface of the clamp member.

Below, one example of the double-action friction stir joining system according to Embodiment 9 is described with reference to FIG. 32. Note that, since a configuration of the double-action friction stir joining system according to Embodiment 9 is the same as that of the double-action friction stir joining system according to Embodiment 8, the detailed description is omitted.

Figure 32:
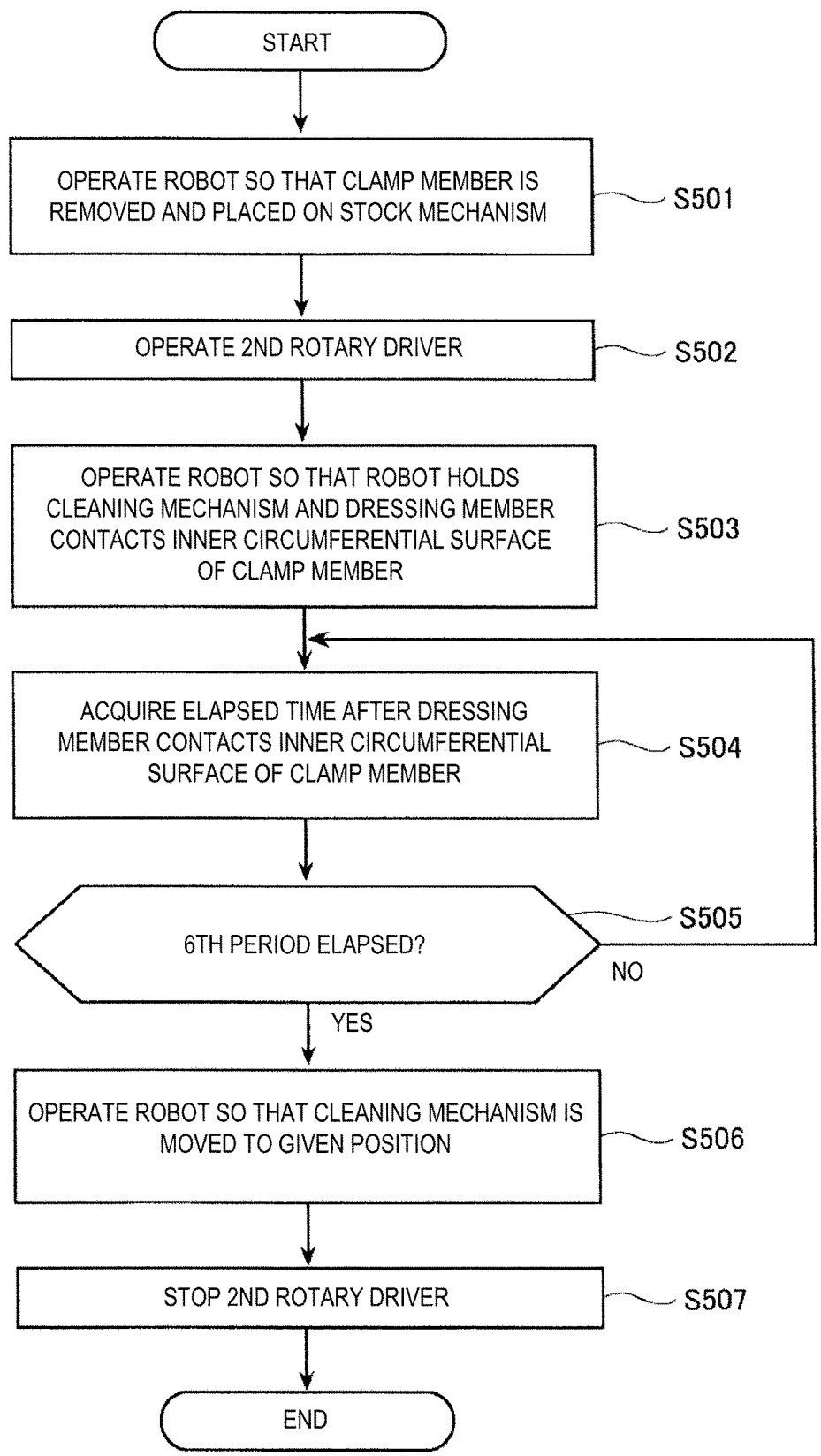
FIG. 32 is a flowchart illustrating one example of operation of a double-action friction stir joining system according to Embodiment 9.

FIG. 32 is a flowchart illustrating one example of operation of the double-action friction stir joining system according to Embodiment 9.

First, when the worker (operator) operates the input device 132 to input instruction information into the processor 131 so that the cleaning (maintenance) of the clamp member 54 is performed, or when the double-action friction stir joining device 101 carries out the given number of friction stir joinings set in advance, the processor 131 of the control device 130 performs the following operation (processing) by reading the program stored in the memory 133.

The control device 130 operates the robot 120 so that the clamp member 54 is removed from the double-action friction stir joining device 101 and the clamp member 54 is placed on the stock mechanism 140 (Step S501). At this time, the control device 130 operates the robot 120 so that the tip-end face 54a of the clamp member 54 is located upward.

Note that, when the worker removes the clamp member 54 from the double-action friction stir joining device 101 and places it on the stock mechanism 140, the control device 130 does not perform the processing of the Step S501.

Next, the control device 130 operates the second rotary driver 112 (Step S502) to rotate the dressing member 111.

Next, the control device 130 operates the robot 120 so that the robot 120 holds the cleaning mechanism 110 and the dressing member 111 of the cleaning mechanism 110 contacts the inner circumferential surface of the clamp member 54 (Step S503).

Therefore, the material of the to-be-joined object 60 adhered to the inner circumferential surface of the clamp member 54 can be removed by the dressing member 111.

Next, the control device 130 acquires, from the clock 134, the elapsed time after the dressing member 111 contacts the inner circumferential surface of the clamp member 54 (Step S504). Next, the control device 130 determines whether the time acquired at Step S504 reaches a sixth period set in advance (Step S505).

Here, the sixth period can be obtained in advance by an experiment etc., and, for example, it may be a time required for fully removing the material of the to-be-joined object 60 adhered to the inner circumferential surface of the clamp member 54.

If the control device 130 determines that the time acquired at Step S504 does not reach the sixth period (No at Step S505), it repeats the processings of Steps S504 and S505 until the time acquired at Step S504 reaches the sixth period. On the other hand, if the control device 130 determines that the time acquired at Step S504 reaches the sixth period (Yes at Step S505), it performs processing of Step S506.

At Step S506, the control device 130 operates the robot 120 so that the cleaning mechanism 110 is moved to the given position set in advance (the initial position where the cleaning mechanism 110 is installed).

Next, the control device 130 stops the second rotary driver 112 (Step S507), and ends this program.

In the double-action friction stir joining system 100 according to Embodiment 9 configured in this way, the control device 130 operates the robot 120 so that the dressing member 111 contacts the inner circumferential surface of the clamp member 54, while rotating the dressing member 111.

Therefore, the material of the to-be-joined object 60 adhered to the inner circumferential surface of the clamp member 54 can be removed by the dressing member 111.

Note that, although in the double-action friction stir joining system 100 according to Embodiment 9 the cleaning of the inner circumferential surface of the clamp member 54 is performed by the control of the control device 130, it is not limited to this configuration. The control device 130 may perform the cleaning of the inner circumferential surface of the clamp member 54, before or after performing the cleaning of the inner circumferential surface of the shoulder member 12.

Moreover, the control device 130 may perform the cleaning of the inner circumferential surface of the clamp member 54 before or after performing the cleaning of the outer circumferential surface of the pin member 11 and/or the outer circumferential surface of the shoulder member 12. In this case, the control device 130 may perform the cleaning of the outer circumferential surface of the pin member 11 and/or the outer circumferential surface of the shoulder member 12 before or after performing the cleaning of the inner circumferential surface of the shoulder member 12, and may then perform the cleaning of the inner circumferential surface of the clamp member 54.

That is, the control device 130 may perform the cleaning of the inner circumferential surface of the shoulder member 12, the cleaning of the outer circumferential surface of the pin member 11 and/or the outer circumferential surface of the shoulder member 12, and the cleaning of the inner circumferential surface of the clamp member 54, and may perform the cleanings in an arbitrary order.

It is apparent for the person skilled in the art that many improvements and other embodiments of the present disclosure are possible from the above description. Therefore, the above description is to be interpreted only as illustration, and it is provided in order to teach the person skilled in the art the best mode to implement the present disclosure. The details of the structures and/or the functions may be changed substantially without departing from the present disclosure.

INDUSTRIAL APPLICABILITY

Since the double-action friction stir joining system and the method of operating the same of the present disclosure can clean the double-action friction stir joining device with a simple configuration, they are useful.

DESCRIPTION OF REFERENCE CHARACTERS

11 Pin Member
11*a* Tip-end Face
12 Shoulder Member
12*a* Tip-end Face
21*a* First Link
21*b* Second Link
21*c* Third Link
21*d* Fourth Link
21*e* Fifth Link
21*f* Sixth Link
End Effector
Pedestal
41 Clamp Driver
51 Joining Tool
52 Joining Tool Fixing Part
53 Tool Driver
54 Clamp Member
54*a* Tip-end Face
55 C-shaped Frame
56 Backing Member
56*a* Support Surface
57 First Rotary Driver
58 Position Detector
60 Object To Be Joined (To-be-joined Object)
61 First Member
62 Second Member
71 Outer Tube
72 Inner Tube
73 Elastic Member
74 Positioning Member
81 First Lid Member
82 Second Lid Member
100 Double-action Friction Stir Joining System
101 Double-action Friction Stir Joining Device
110 Cleaning Mechanism
111 Dressing Member
111A Cylinder Member
111B Brush Member
112 Second Rotary Driver
112A Second Rotary Driver
112B Second Rotary Driver
113 Assisting Member
113A Assisting Part
113B Operating Part
120 Robot
130 Control Device
131 Processor
132 Input Device
133 Memory
134 Clock
140 Stock Mechanism
150 Controller
200 Pedestal
201 Base Member
211A Cutting Tool
211B Wire Brush
212A Chuck Device
212B Chuck Device
213A Gear
213B Gear
214A Shaft Member
214B Shaft Member
215A Plate Member
215B Plate Member
216A Inner Cover Member
216B Inner Cover Member
217A Fixing Member
217B Fixing Member
218A Outer Cover Member
218B Outer Cover Member
219 Linear-movement Actuator
220 Elastic Member
221 Fixing Member
300 Air Blow Device
301 Air Blow Gun
302 Air Supplier
303 Piping
304 On-off Valve
521 Rotor
522 Movable Body
531 Pin Driver
532 Shoulder Driver
533 Telescopic Mechanism
JT1 First Joint
JT2 Second Joint
JT3 Third Joint
JT4 Fourth Joint
JT5 Fifth Joint
JT6 Sixth Joint
P1 Arrow
P2 Arrow
P3 Arrow
Xr Axis

The invention claimed is:

1. A double-action friction stir joining system, comprising:
a double-action friction stir joining device;
a cleaning mechanism having a dressing member;
a robot; and
a control device, wherein the double-action friction stir joining device includes:
a pin member formed in a cylindrical shape and configured to be rotatable on an axis and reciprocatable in a direction along the axis;
a shoulder member formed in a cylindrical shape, into which the pin member is inserted, and configured to be rotatable on the axis and reciprocatable in a direction along the axis;
a first rotary driver configured to rotate the pin member and the shoulder member on the axis, respectively; and
a tool driver configured to reciprocate the pin member and the shoulder member along the axis, respectively,
wherein the control device is adapted to:
(A) operate the tool driver so that the pin member is thrusted into the shoulder member;
(B) operate the first rotary driver so that the shoulder member rotates; and
(C) operate the robot so that the robot holds the double-action friction stir joining device and the dressing member contacts an inner circumferential surface of the shoulder member, and
wherein the control device operates the tool driver in (A) during a cleaning process so that:
(A1) a tip-end face of the pin member is moved to a first position set in advance; and
(A2) the tip-end face of the pin member is moved to a second position set in advance, after (A1), at a larger speed than in (A1).

2. The double-action friction stir joining system of claim 1, wherein the cleaning mechanism further includes a second rotary driver configured to rotate the dressing member, and
wherein the control device is adapted to:
(A) operate the tool driver so that the pin member is thrusted into the shoulder member;
(B1) operate the second rotary driver so that the dressing member rotates; and
(C) operate the robot so that the robot holds the double-action friction stir joining device and the dressing member contacts the inner circumferential surface of the shoulder member.

3. The double-action friction stir joining system of claim 1, wherein the robot is configured to be pivotable or rotatable on the axis while holding the double-action friction stir joining device, and
wherein the control device operates the robot in (C) so that the robot holds the double-action friction stir joining device, and the dressing member contacts the inner circumferential surface of the shoulder member while pivoting the double-action friction stir joining device.

4. The double-action friction stir joining system of claim 1, wherein the dressing member is comprised of a cutting tool and/or a wire brush.

5. The double-action friction stir joining system of claim 4, wherein the control device operates the robot in (C) so that:
(C1) the cutting tool contacts the inner circumferential surface of the shoulder member; and
(C2) the wire brush contacts the inner circumferential surface of the shoulder member.

6. The double-action friction stir joining system of claim 5, wherein the cleaning mechanism further has an air blow device, and wherein the control device is adapted in (C) to:
(C0) activate the air blow device so that air is blown toward the cutting tool, before (C1).

7. The double-action friction stir joining system of claim 1, wherein the control device is further adapted to:
(D) operate the tool driver so that the pin member protrudes with respect to a tip-end part of the shoulder member;
(B2) operate the first rotary driver so that the pin member and/or the shoulder member rotate; and
(E) operate the robot so that the robot holds the double-action friction stir joining device, and an outer circumferential surface of the pin member and/or an outer circumferential surface of the shoulder member contacts the dressing member.

8. The double-action friction stir joining system of claim 7, wherein the robot is configured to be pivotable or rotatable on the axis while holding the double-action friction stir joining device, and
wherein the control device operates the robot in (E) so that the robot holds the double-action friction stir joining device, and the outer circumferential surface of the pin member and/or the outer circumferential surface of the shoulder member contacts the dressing member while pivoting the double-action friction stir joining device.

9. The double-action friction stir joining system of claim 1, wherein the double-action friction stir joining device is formed in a cylindrical shape, and further includes a clamp member into which the pin member and the shoulder member are inserted,
wherein the cleaning mechanism further includes a second rotary driver configured to rotate the dressing member, and
wherein the control device is configured to:
(B1) operate the second rotary driver so that the dressing member rotates;
(F) operate the tool driver so that the pin member and the shoulder member are thrusted into the clamp member; and
(G) operate the robot so that the robot holds the double-action friction stir joining device and the dressing member contacts the inner circumferential surface of the clamp member.

10. The double-action friction stir joining system of claim 1, wherein the cleaning mechanism further includes an assisting member having an assisting part configured to be insertable into an interior space of the shoulder member, and an operating part configured to reciprocate the assisting part along the axis, and
wherein the control device is adapted in (A) to operate the robot so that the tip-end face of the pin member contacts a tip end of the assisting part, and operate the operating part so as to be synchronized with the tool driver so that the pin member is thrusted into the shoulder member while a movement of the pin member being assisted by the assisting part during thrusting of the pin member into the shoulder member.

11. The double-action friction stir joining system of claim 1, wherein the cleaning mechanism further includes an assisting member having an assisting part configured to be insertable into an interior space of the shoulder member, an operating part configured to reciprocate the assisting part along the axis, and a controller configured to control the operating part,
wherein the control device is adapted in (A) to operate the robot so that the tip-end face of the pin member contacts a tip end of the assisting part, and operate the tool driver so that the pin member is thrusted into the shoulder member, and wherein the controller is adapted in (A) to operate the operating part so as to be synchronized with the tool driver to assist a movement of the pin member during thrusting of the pin member into the shoulder member.

12. A method of operating a double-action friction stir joining system provided with a double-action friction stir joining device, a cleaning mechanism having a dressing member, and a robot, wherein the double-action friction stir joining device includes:
 a pin member formed in a cylindrical shape and configured to be rotatable on an axis and reciprocatable in a direction along the axis;
 a shoulder member formed in a cylindrical shape, into which the pin member is inserted, and configured to be rotatable on the axis and reciprocatable in a direction along the axis;
 a first rotary driver configured to rotate the pin member and the shoulder member on the axis; and
 a tool driver configured to reciprocate the pin member and the shoulder member along the axis, respectively,
wherein the method comprises the steps of:
 (A) operating the tool driver so that the pin member is thrusted into the shoulder member;
 (B) operating the first rotary driver so that the shoulder member rotates;
 (C) operating the robot so that the robot holds the double-action friction stir joining device and the dressing member contacts an inner circumferential surface of the shoulder member, and
wherein (A) during a cleaning process includes:
 (A1) operating the tool driver so that a tip-end face of the pin member is moved to a first position set in advance; and
 (A2) operating the tool driver so that the tip-end face of the pin member is moved to a second position set in advance, after (A1), at a larger speed than in (A1).

13. The method of claim 12, wherein the cleaning mechanism further includes a second rotary driver configured to rotate the dressing member, and wherein the method comprises the steps of:
 (A) operating the tool driver so that the pin member is thrusted into the shoulder member;
 (B1) operating the second rotary driver so that the dressing member rotates; and
 (C) operating the robot so that the robot holds the double-action friction stir joining device and the dressing member contacts the inner circumferential surface of the shoulder member.

14. The method of claim 12, wherein the robot is configured to be pivotable or rotatable on the axis while holding the double-action friction stir joining device, and wherein (C) includes operating the robot so that the robot holds the double-action friction stir joining device, and the dressing member contacts the inner circumferential surface of the shoulder member while pivoting the double-action friction stir joining device.

15. The method of claim 12, wherein the dressing member is comprised of a cutting tool and/or a wire brush.

16. The method of claim 15, wherein (C) includes:
 (C1) operating the robot so that the cutting tool contacts the inner circumferential surface of the shoulder member; and (C2) operating the robot so that the wire brush contacts the inner circumferential surface of the shoulder member.

17. The method of claim 16, wherein the cleaning mechanism further has an air blow device, and wherein (C) further includes (C0) activating the air blow device so that air is brown toward the cutting tool, before (C1).

18. The method of claim 12, further comprising:
 (D) operating the tool driver so that the pin member protrudes with respect to a tip-end part of the shoulder member;
 (B2) operating the first rotary driver so that the pin member and/or the shoulder member rotates; and
 (E) operating the robot so that the robot holds the double-action friction stir joining device, and an outer circumferential surface of the pin member and/or an outer circumferential surface of the shoulder member contacts the dressing member.

19. The method of claim 18, wherein the robot is configured to be pivotable or rotatable on the axis while holding the double-action friction stir joining device, and wherein (E) includes operating the robot so that the robot holds the double-action friction stir joining device, the outer circumferential surface of the pin member and/or the outer circumferential surface of the shoulder member contacts the dressing member while pivoting the double-action friction stir joining device.

20. The method of claim 12, wherein the double-action friction stir joining device is formed in a cylindrical shape, and further includes a clamp member into which the pin member and the shoulder member are inserted, wherein the cleaning mechanism further includes a second rotary driver configured to rotate the dressing member, and
wherein the method further comprises the steps of:
 (B1) operating the second rotary driver so that the dressing member rotates;
 (F) operating the tool driver so that the pin member and the shoulder member are thrusted into the clamp member; and
 (G) operating the robot so that the robot holds the double-action friction stir joining device and the dressing member contacts an inner circumferential surface of the clamp member.

21. The method of claim 20, wherein the robot is configured to be pivotable or rotatable on the axis while holding the double-action friction stir joining device, and wherein (G) includes operating the robot so that the robot holds the double-action friction stir joining device and the dressing member contacts the inner circumferential surface of the clamp member while pivoting the double-action friction stir joining device.

22. The method of claim 12, wherein the cleaning mechanism further includes an assisting member having an assisting part configured to be insertable into an interior space of the shoulder member, and an operating part configured to reciprocate the assisting part along the axis, and wherein (A) includes operating the robot so that the tip-end face of the pin member contacts a tip end of the assisting part, and operating the operating part so as to be synchronized with the tool driver so that the pin member is thrusted into the shoulder member while a movement of the pin member being assisted by the assisting part during thrusting of the pin member into the shoulder member.

* * * * *